(12) United States Patent
Sanderson et al.

(10) Patent No.: US 12,458,472 B2
(45) Date of Patent: *Nov. 4, 2025

(54) ROOT-ANALOG DENTAL IMPLANTS AND SYSTEMS, DEVICES, AND METHODS FOR DESIGNING AND MANUFACTURING SAME

(71) Applicant: iDentical, Inc., Mountain View, CA (US)

(72) Inventors: David Sanderson, Burlingame, CA (US); Michael Collins, San Marcos, CA (US); Brian Bowman, Carlsbad, CA (US); Colin Murphy, San Diego, CA (US); Brandon Duquesnel, Temecula, CA (US)

(73) Assignee: iDentical, Inc., Mountain View, CA (US)

(*) Notice: Subject to any disclaimer, the term of this patent is extended or adjusted under 35 U.S.C. 154(b) by 186 days.

This patent is subject to a terminal disclaimer.

(21) Appl. No.: 18/566,628

(22) PCT Filed: Jun. 21, 2022

(86) PCT No.: PCT/US2022/034388
§ 371 (c)(1),
(2) Date: Dec. 1, 2023

(87) PCT Pub. No.: WO2022/271734
PCT Pub. Date: Dec. 29, 2022

(65) Prior Publication Data
US 2024/0261067 A1 Aug. 8, 2024

Related U.S. Application Data

(63) Continuation of application No. 17/573,606, filed on Jan. 11, 2022, now Pat. No. 11,484,396.
(Continued)

(51) Int. Cl.
*A61C 13/00* (2006.01)
*A61C 8/00* (2006.01)

(52) U.S. Cl.
CPC ........ *A61C 13/0004* (2013.01); *A61C 8/0036* (2013.01); *A61C 8/0037* (2013.01);
(Continued)

(58) Field of Classification Search
CPC ... A61C 8/0013; A61C 8/0016; A61C 8/0031; A61C 8/0068; A61C 8/0095;
(Continued)

(56) References Cited

U.S. PATENT DOCUMENTS 4,186,486 A * 2/1980 Gordon ............... A61C 8/0036
433/201.1
4,252,525 A * 2/1981 Child .................. A61C 8/0007
433/201.1
(Continued)

FOREIGN PATENT DOCUMENTS

CN 202724012 U * 2/2013 ........... A61C 8/0036
CN 106037965 A * 10/2016 ........... A61C 8/0013
(Continued)

OTHER PUBLICATIONS

Evans et al., "Anatomic Customization of Root-Analog Dental Implants With Cone-Beam CT and CAD/CAM Fabrication: A Cadaver-Based Pilot Evaluation", Journal of Oral Implantology, vol. XLIV/No. One, 2018, pp. 15-25.
(Continued)

*Primary Examiner* — Matthew M Nelson
(74) *Attorney, Agent, or Firm* — Resonance IP Law, PC

(57) ABSTRACT

A root portion of a root-analog dental implant may include a core positioned in an approximate center of the root portion of the dental implant. The core may provide mechanical strength and/or support for the dental implant
(Continued)

and may include one or more struts. The root-analog dental implant may further include a porous surface positioned on a portion of a vertically oriented exterior surface of the core. The struts may be configured and arranged to provide mechanical strength and/or support for the root-analog dental implant.

20 Claims, 44 Drawing Sheets

Related U.S. Application Data

(60) Provisional application No. 63/251,623, filed on Oct. 2, 2021, provisional application No. 63/213,192, filed on Jun. 21, 2021.

(52) U.S. Cl.
CPC ........ *A61C 8/0075* (2013.01); *A61C 13/0019* (2013.01); *A61C 2008/0046* (2013.01)

(58) Field of Classification Search
CPC ............. A61C 8/0006; A61C 8/0009; A61C 2008/0046; A61F 2/2803; A61F 2002/30011; A61F 2002/30014; A61F 2002/3092; A61L 27/54; A61L 2430/12; A61B 17/8071
USPC ........................................................ 433/175
See application file for complete search history.

(56) References Cited

U.S. PATENT DOCUMENTS

| | | | | |
|---|---|---|---|---|
| 4,492,577 | A * | 1/1985 | Farris | A61C 8/0012 433/201.1 |
| 5,199,873 | A | 4/1993 | Schulte et al. | |
| 5,449,370 | A | 9/1995 | Vaitekunas | |
| 5,527,182 | A | 6/1996 | Willoughby | |
| 6,039,568 | A | 3/2000 | Hinds | |
| 6,095,817 | A * | 8/2000 | Wagner | A61C 8/0012 433/173 |
| 6,168,633 | B1 * | 1/2001 | Shoher | A61L 27/306 433/173 |
| 6,273,722 | B1 | 8/2001 | Phillips | |
| 6,921,264 | B2 | 7/2005 | Mayer et al. | |
| 7,708,557 | B2 | 5/2010 | Rubbert | |
| 7,718,100 | B2 * | 5/2010 | Soler | A61C 8/0012 264/16 |
| 8,287,279 | B2 | 10/2012 | Pirker | |
| 8,430,668 | B2 | 4/2013 | Bassett et al. | |
| 8,454,362 | B2 | 6/2013 | Rubbert | |
| 8,457,930 | B2 | 6/2013 | Schroeder | |
| 8,562,346 | B2 * | 10/2013 | Collins | A61C 8/0022 433/173 |
| 8,602,780 | B2 | 12/2013 | Rubbert | |
| 8,684,734 | B1 * | 4/2014 | Lyren | A61C 8/0024 433/173 |
| 8,911,234 | B2 | 12/2014 | Mayer et al. | |
| 9,226,784 | B2 | 1/2016 | Lehmann et al. | |
| 9,433,480 | B2 * | 9/2016 | Pelote | A61C 8/0012 |
| 9,539,062 | B2 | 1/2017 | Rubbert et al. | |
| 9,707,058 | B2 | 7/2017 | Bassett et al. | |
| 9,730,771 | B2 | 8/2017 | Westover | |
| 9,801,697 | B2 | 10/2017 | Rubbert et al. | |
| 10,449,019 | B2 | 10/2019 | Nesbit et al. | |
| 2003/0235805 | A1 | 12/2003 | Lax | |
| 2004/0241621 | A1 | 12/2004 | Lax | |
| 2005/0079469 | A1 * | 4/2005 | Akagawa | A61C 8/0006 433/201.1 |
| 2005/0142517 | A1 | 6/2005 | Frysh et al. | |
| 2008/0020343 | A1 | 1/2008 | Mount | |
| 2008/0020349 | A1 * | 1/2008 | Dricot | A61C 8/0012 433/173 |
| 2008/0090208 | A1 | 4/2008 | Rubbert | |
| 2009/0092944 | A1 | 4/2009 | Pirker | |
| 2009/0215007 | A1 * | 8/2009 | Caterini | A61L 27/56 433/173 |
| 2010/0105009 | A1 | 4/2010 | Karkar et al. | |
| 2010/0203478 | A1 | 8/2010 | Rubbert | |
| 2010/0240009 | A1 | 9/2010 | Gogarnoiu | |
| 2010/0316970 | A1 | 12/2010 | Shih et al. | |
| 2011/0008754 | A1 * | 1/2011 | Bassett | A61C 8/0013 433/175 |
| 2011/0123951 | A1 * | 5/2011 | Lomicka | A61C 8/0006 433/201.1 |
| 2012/0129132 | A1 * | 5/2012 | Lomicka | A61C 8/0033 433/173 |
| 2012/0214128 | A1 * | 8/2012 | Collins | A61L 27/047 433/173 |
| 2012/0237898 | A1 | 9/2012 | Palti et al. | |
| 2013/0209961 | A1 * | 8/2013 | Rubbert | A61C 8/0036 433/175 |
| 2013/0323677 | A1 | 12/2013 | Pearson | |
| 2013/0344459 | A1 * | 12/2013 | Collins | A61C 8/0075 433/201.1 |
| 2014/0023992 | A1 * | 1/2014 | Willis | A61K 6/84 433/174 |
| 2014/0038134 | A1 | 2/2014 | Nguyen | |
| 2016/0015483 | A1 | 1/2016 | Kumar et al. | |
| 2016/0022332 | A1 | 1/2016 | Baehre et al. | |
| 2016/0166363 | A1 | 6/2016 | Varsano | |
| 2016/0270887 | A1 | 9/2016 | Pearson | |
| 2016/0361150 | A1 | 12/2016 | Berndt et al. | |
| 2017/0156824 | A1 | 6/2017 | Rubbert et al. | |
| 2017/0172712 | A1 | 6/2017 | Rubbert et al. | |
| 2018/0250102 | A1 | 9/2018 | Schulter et al. | |
| 2018/0280121 | A1 | 10/2018 | Zhang et al. | |
| 2018/0344894 | A1 | 12/2018 | Kay et al. | |
| 2022/0008172 | A1 * | 1/2022 | Wedeking | A61C 8/0075 |

FOREIGN PATENT DOCUMENTS

| | | | | |
|---|---|---|---|---|
| EP | 3421006 A1 | 1/2019 | | |
| WO | WO-2005079696 A1 * | 9/2005 | ........... | A61C 8/0016 |
| WO | WO-2010146383 A1 * | 12/2010 | ........... | A61C 8/0012 |
| WO | 2011132006 A2 | 10/2011 | | |
| WO | 2018011604 A2 | 1/2018 | | |

OTHER PUBLICATIONS

Figliuzzi et al., "A Direct Metal Laser Sintering (DMLS) Root Analogue Implant Placed in the Anterior Maxilla: Case Report", iMedPub Journals, vol. 2 No. 1: Jan. 11, 2016, pp. 1-5.
Figliuzzi et al., "A Novel Root Analogue Dental Implant using CT Scan and CAD/CAM: Selective Laser Melting Technology", Oral Maxillofac Surg. 2012, vol. 41, pp. 858-862.
Heydecke et al., "Optimal Esthetics in Single-Tooth Replacement with the Re-Implant System: A Case Report", The International Journal of Prosthodontics vol. 12, No. 2, 1999, pp. 184-189.
Identical, Inc.; PCT/US2022/034388 filed Jun. 21, 2022; International Search Report and Written Opinion, mailed Aug. 3, 2022; ISA/US; 8 pp.
Lee et al., "Biomechanical Evaluation of Initial Stability of a Root Analogue Implant Design with Drilling Protocol: A 3D Finite Element Analysis", Applied Science, vol. 10 (4104), Jun. 15, 2020, pp. 1-13.
Mangano et al., "Custom-made, Root-Analogue Direct Laser Metal Forming Implant: a Case Report", Lasers Med Science, vol. 27, Jun. 15, 2012, pp. 1241-1245.
Moin et al., "A Patient Specific Biomechanical Analysis of Custom Root Analogue Implant Designs on Alveolar Bone Stress: A Finite Element Study", International Journal of Dentistry, vol. 2016, Article ID 8242535, Mar. 24, 2016, pp. 1-8.
Pirker et al., "Immediate, Non-Submerged, Root-Analogue Zirconia Implants Placed into Single-Rooted Extraction Sockets: 2-year follow-up of a Clinical Study", International Journal of Oral and Maxillofacial Surgery, vol. 38, Sep. 2009, pp. 1127-1132.

(56) References Cited

OTHER PUBLICATIONS

Pour et al., "Historical development of root analogue implants: a review of published papers" British journal of oral and Maxillofacial surgery, 2019, pp. 1-9.

Pour et al., "Innovative Single-Tooth Replacement with an Individual Root-Analog Hybrid Implant in the Esthetic Zone: Case Report", The International Journal of Oral & Maxillofacial Implants, vol. 32, No. 3, 2017, pp. 153-160.

Roestam Banai, "Current State of Root Analogue Implants (RAI): A Systemic Review", 2017, pp. 1-35.

* cited by examiner

200

201  202

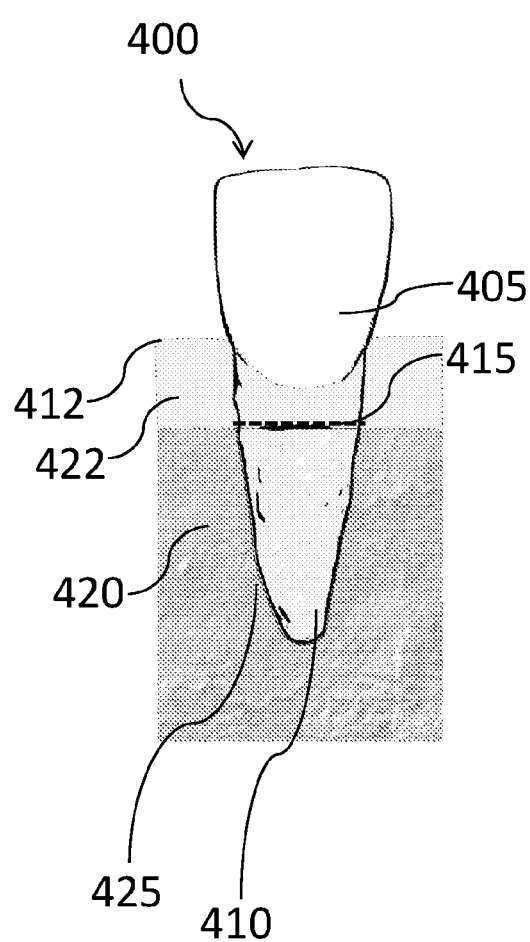
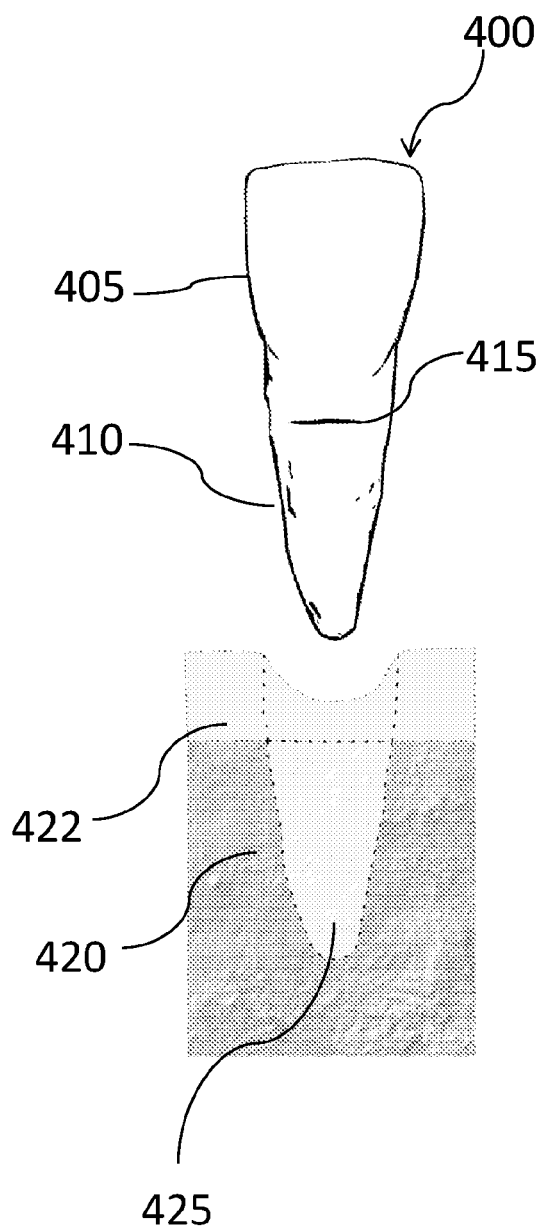
FIG. 4A
FIG. 4B

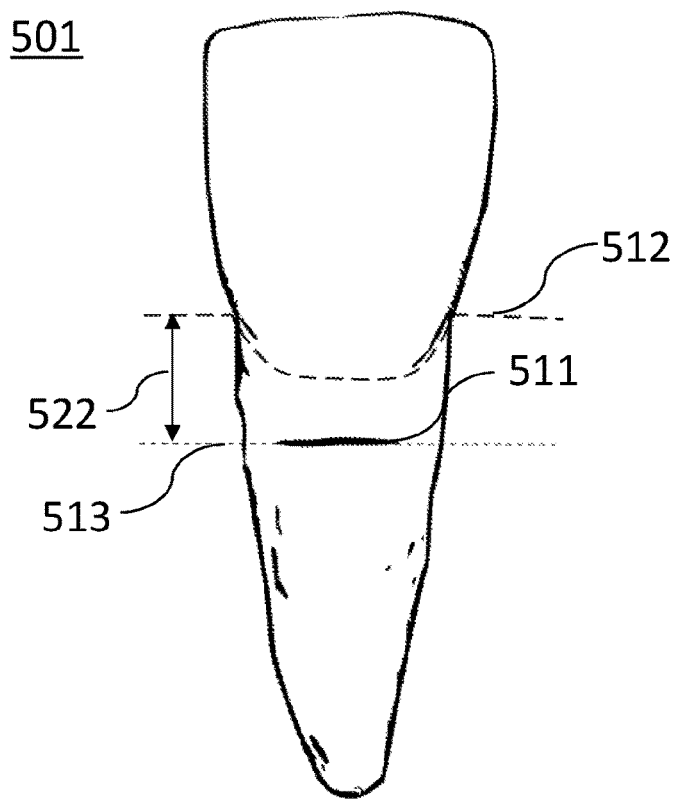
FIG. 5A1
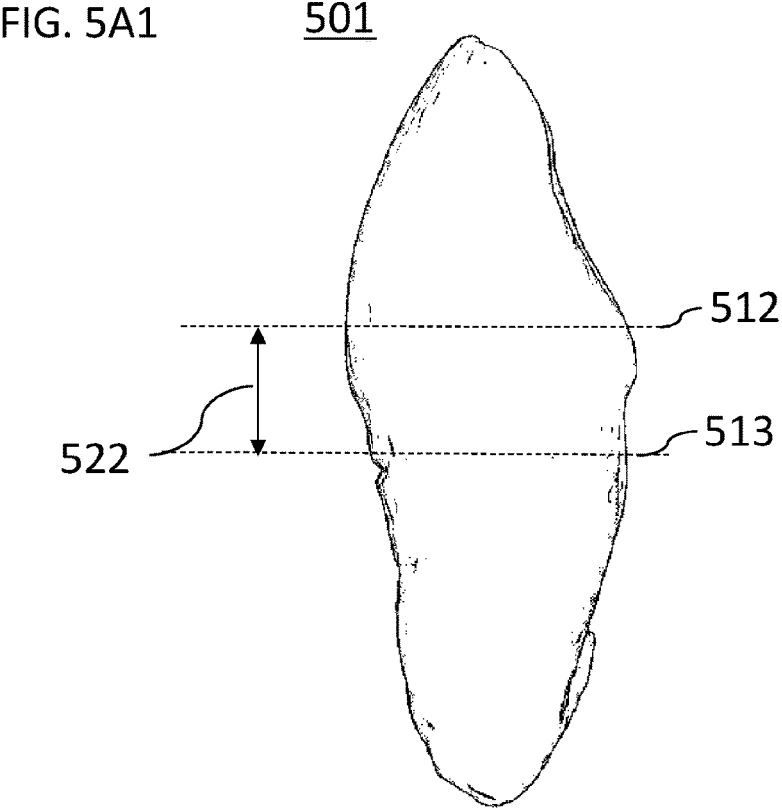
FIG. 5A2

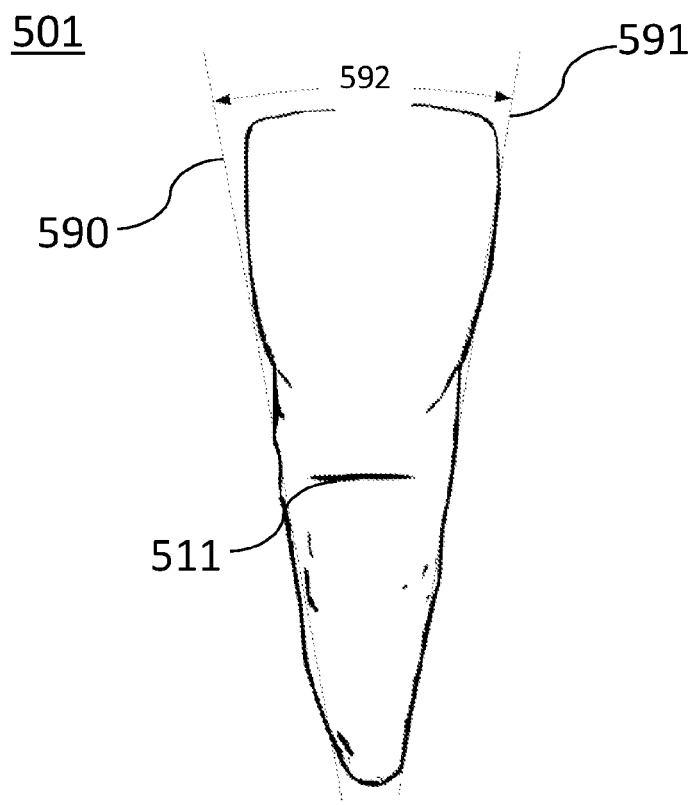
FIG. 5B1
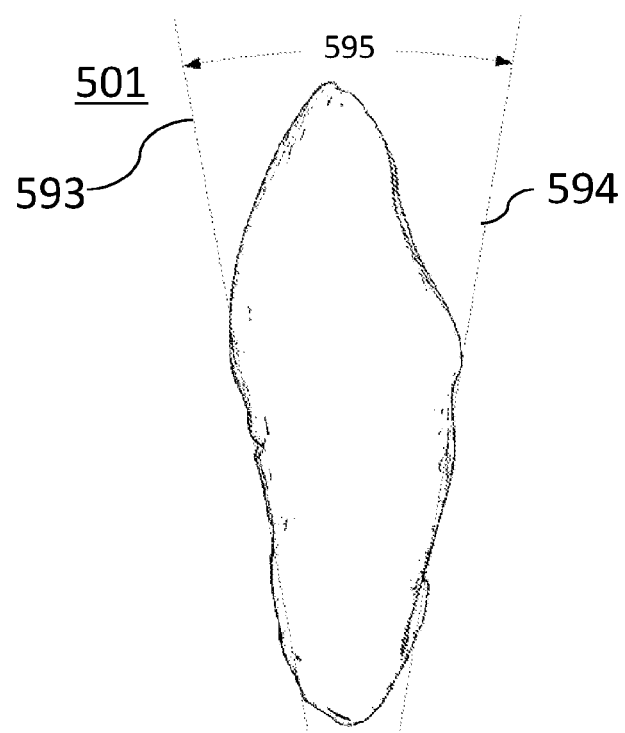
FIG. 5B2

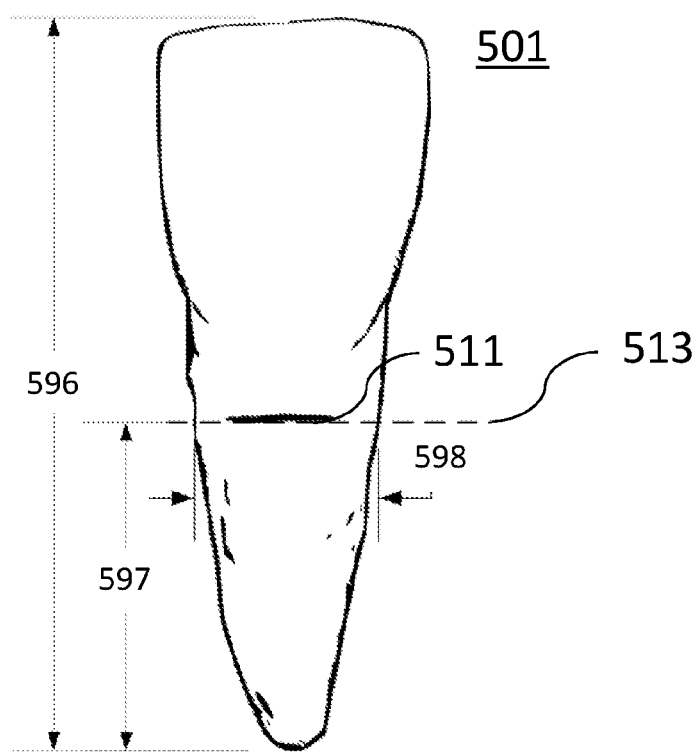
FIG. 5B3
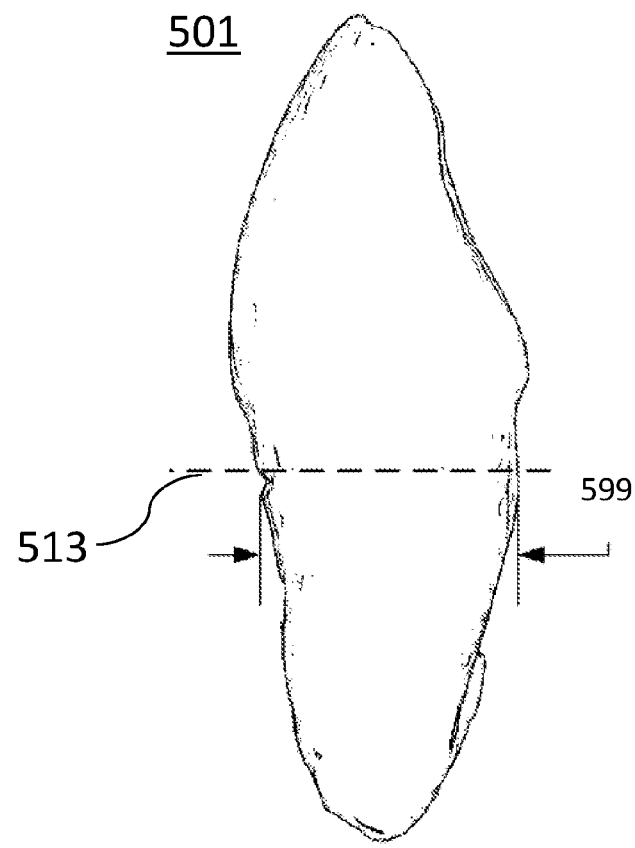
FIG. 5B4

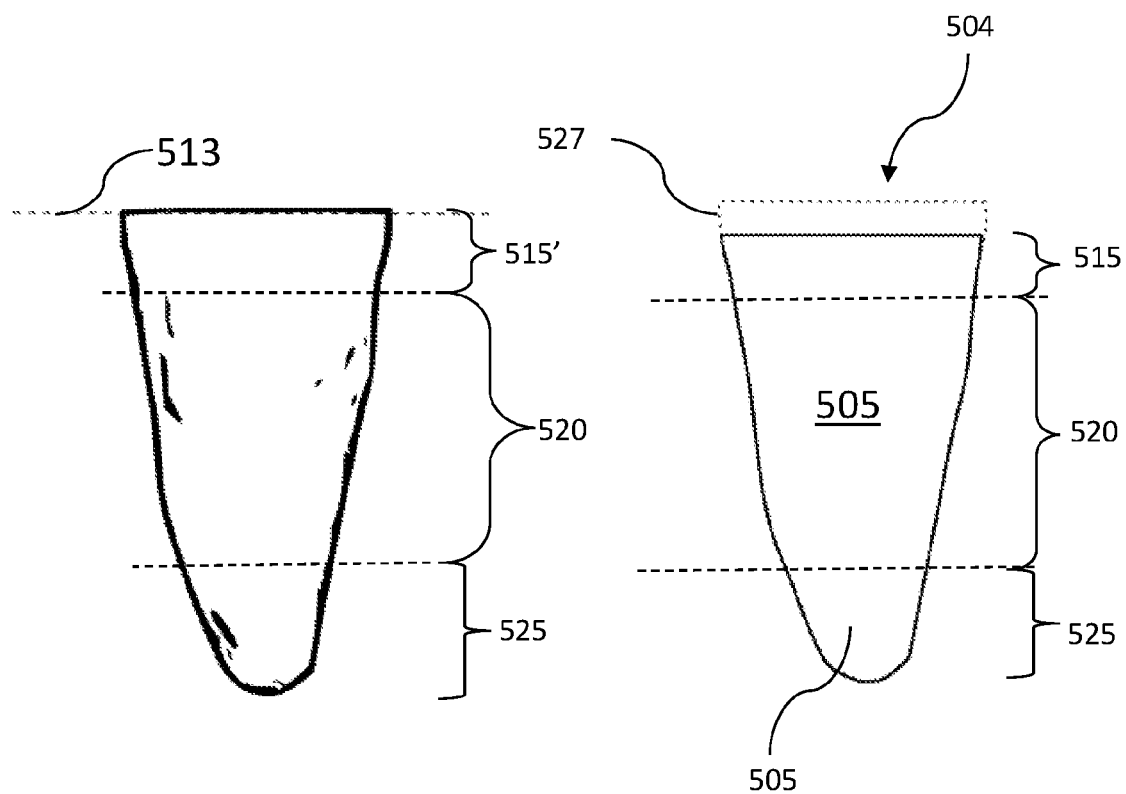
FIG. 5C1  FIG. 5C2

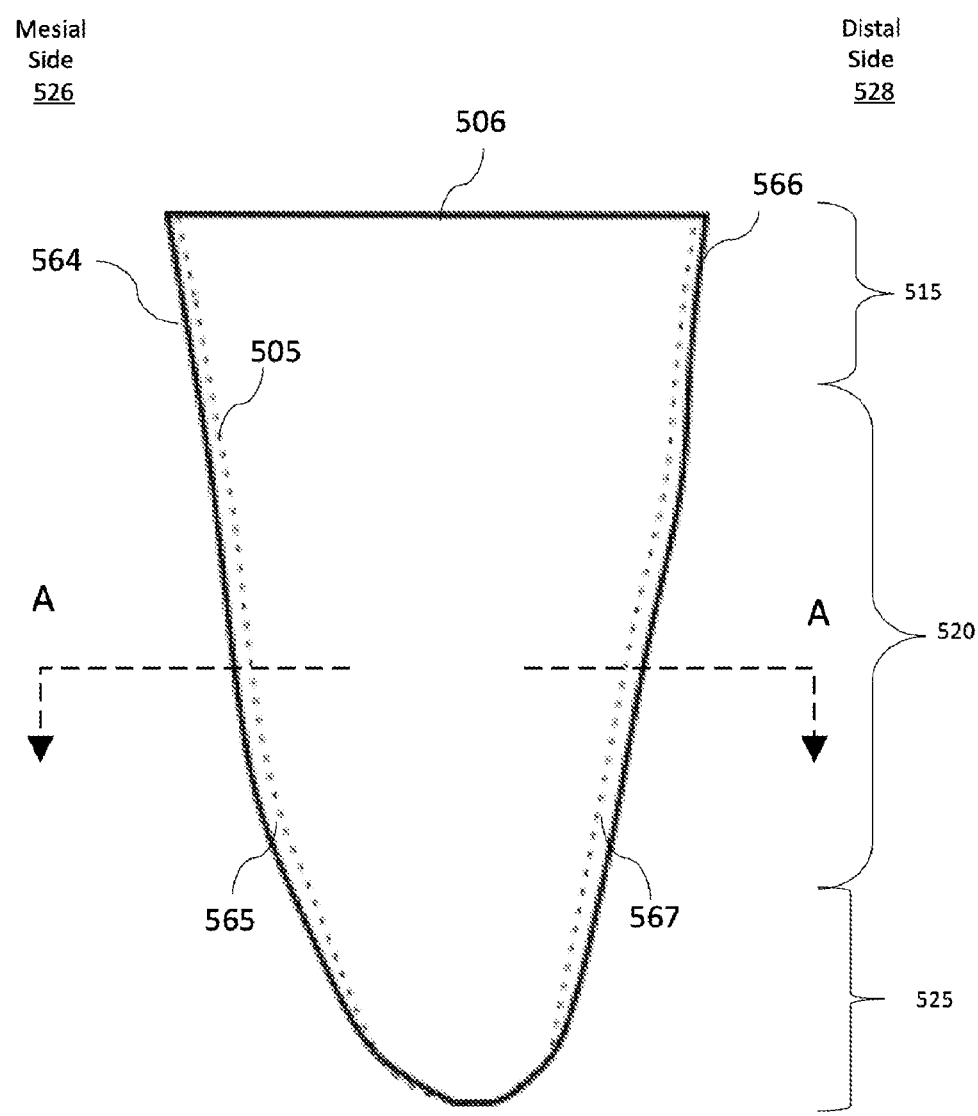
FIG. 5D1

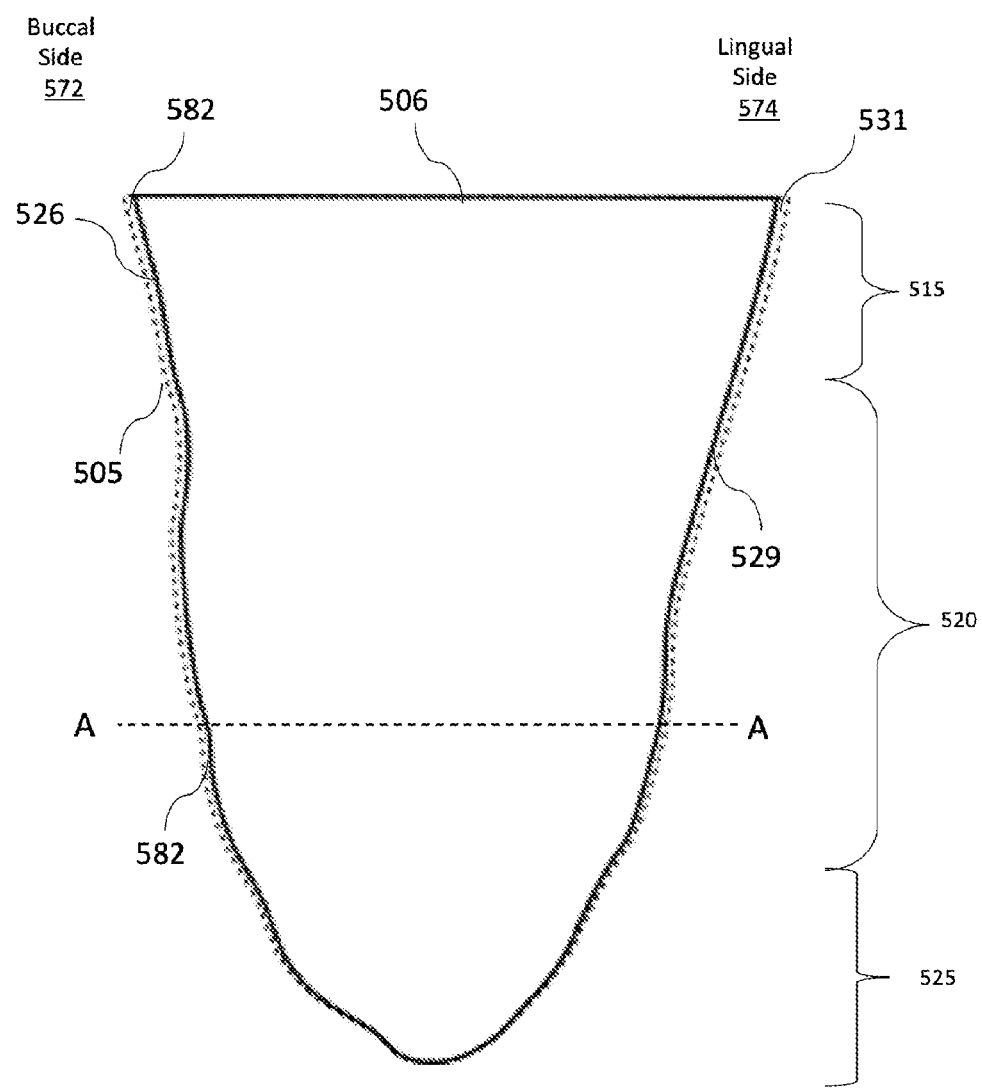
FIG. 5D2

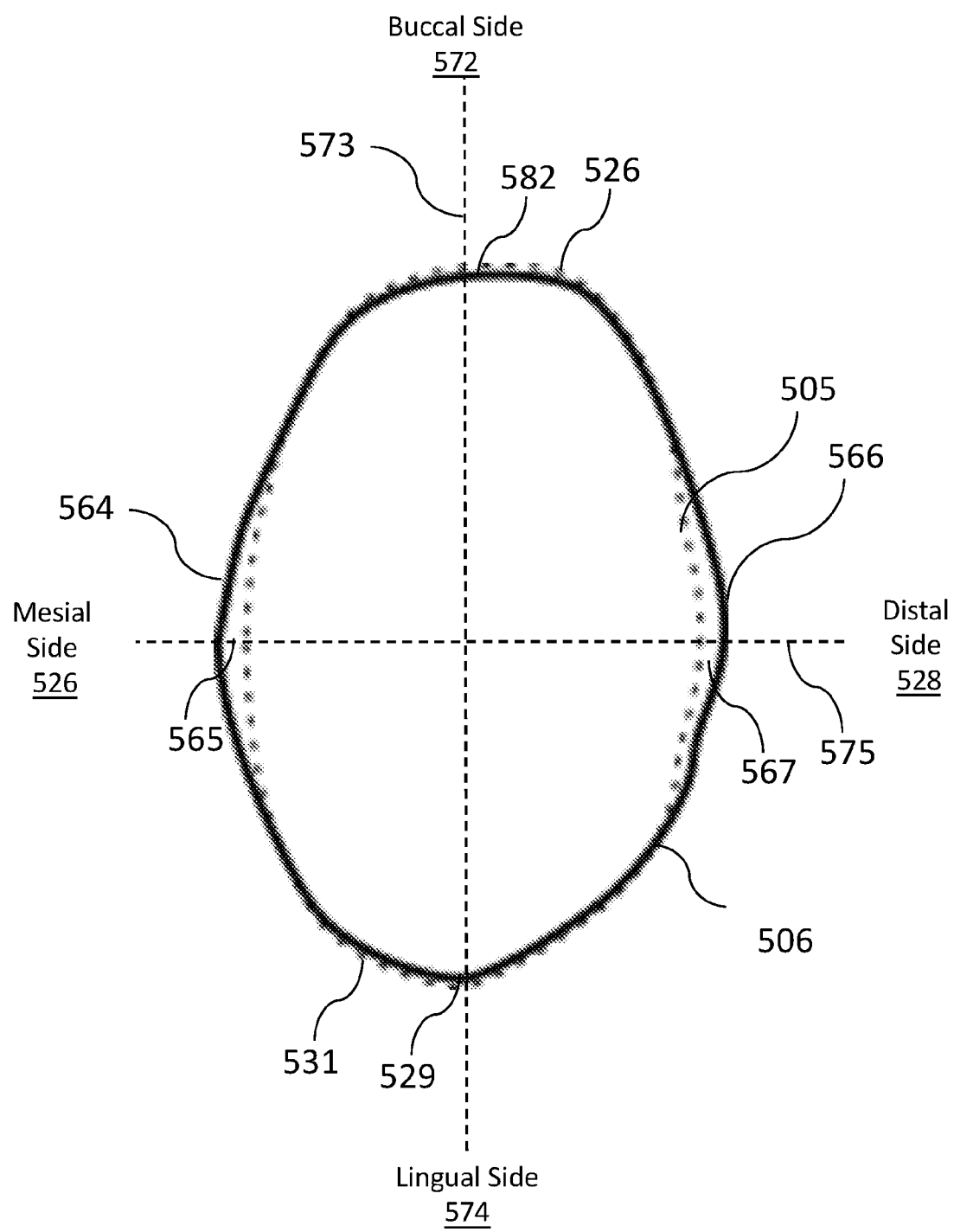
FIG. 5D3

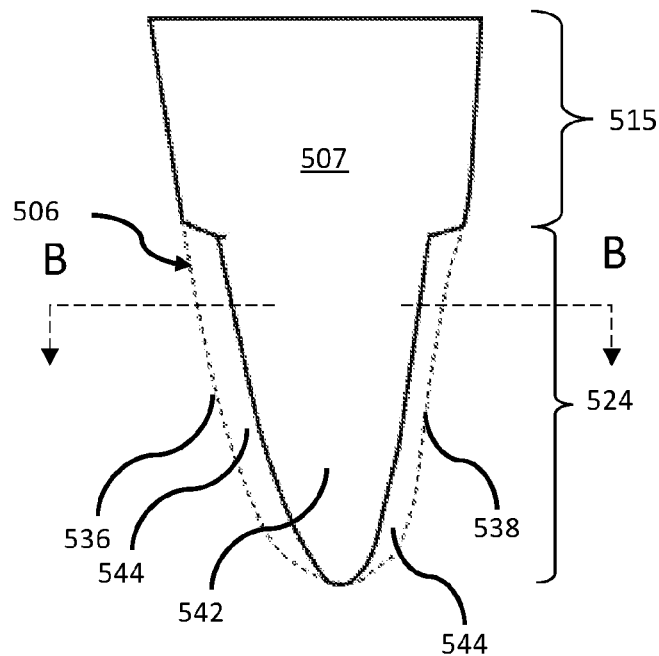
FIG. 5E1
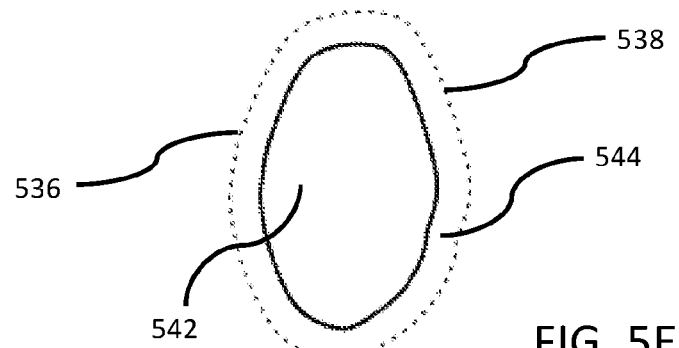
B-B
FIG. 5E2

602

603

604

704

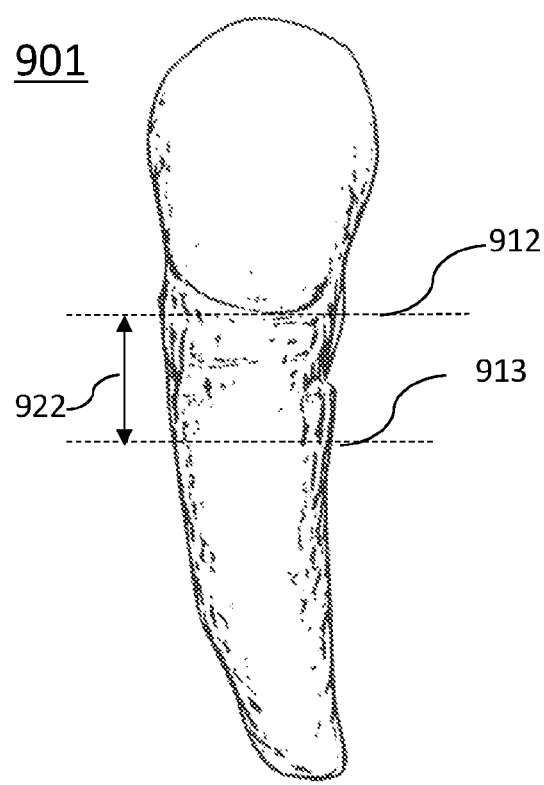
FIG. 9A1
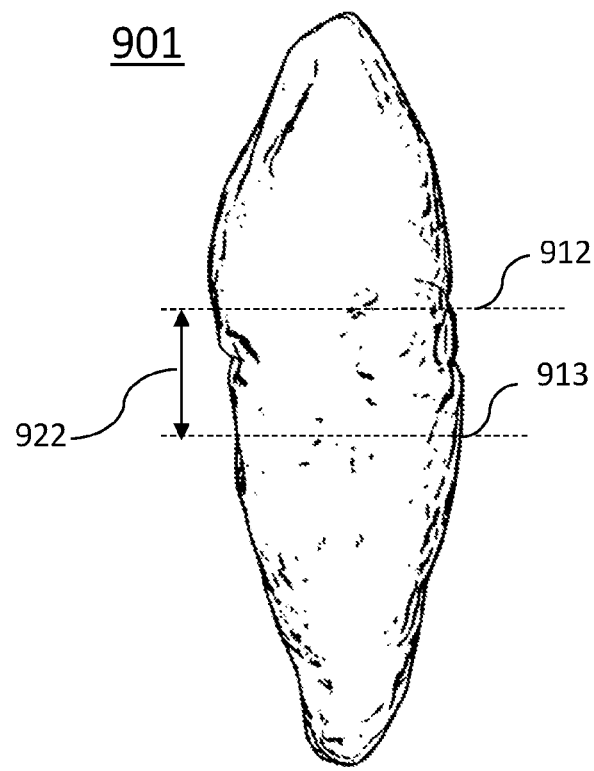
FIG. 9A2

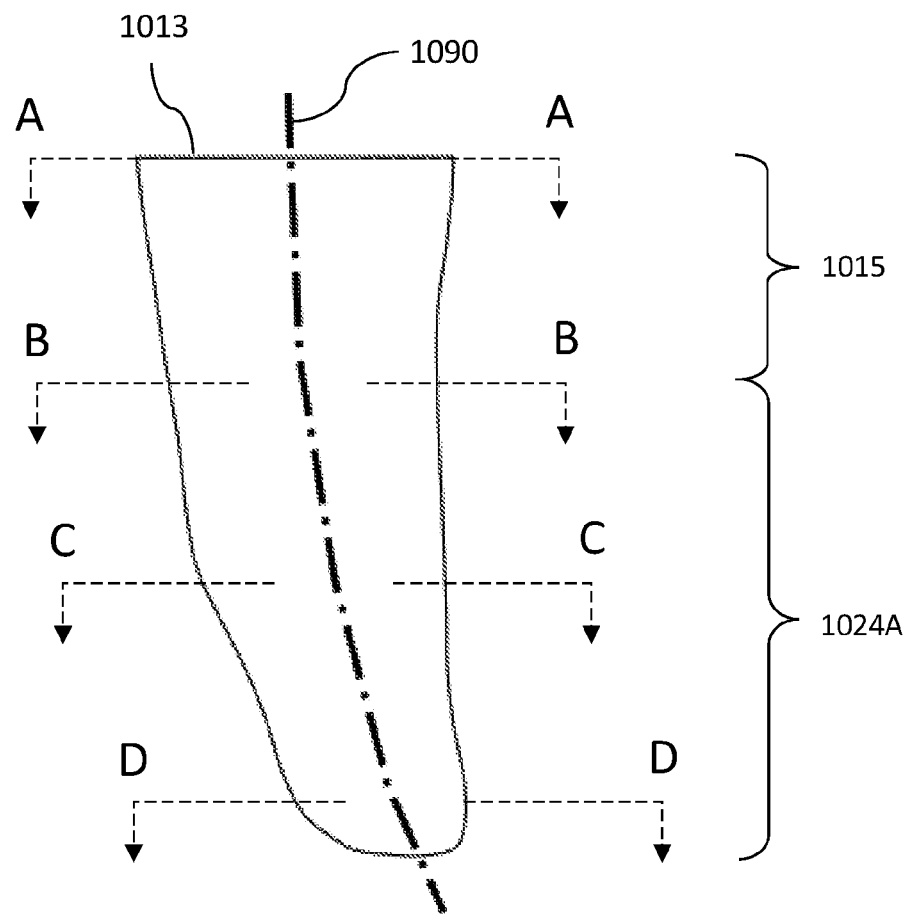
FIG. 10A1

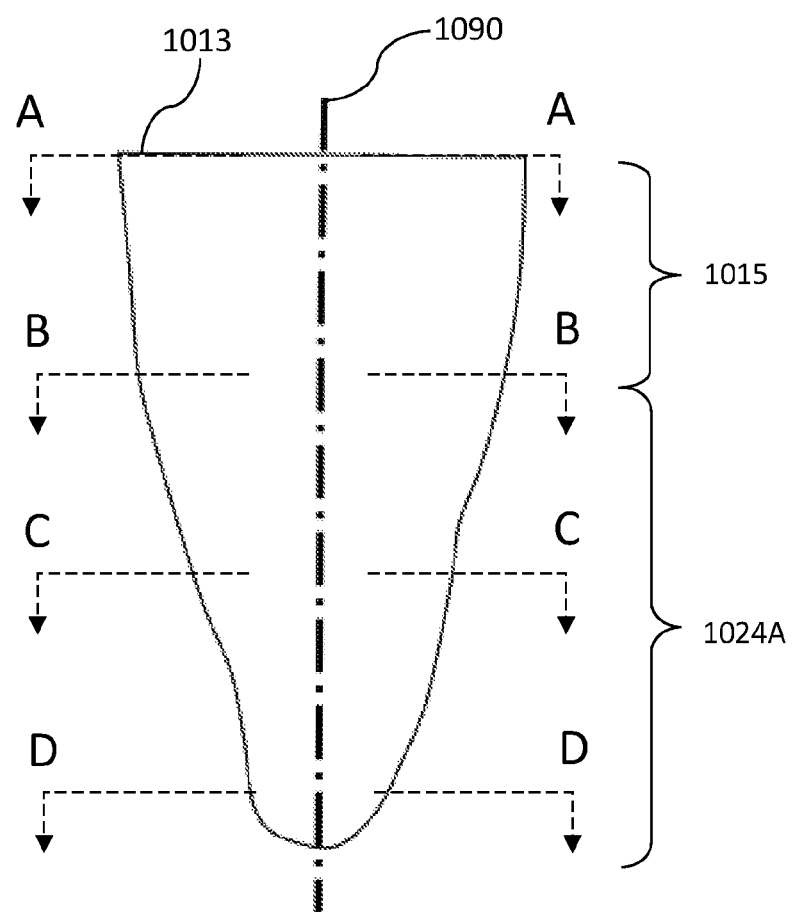
FIG. 10A2

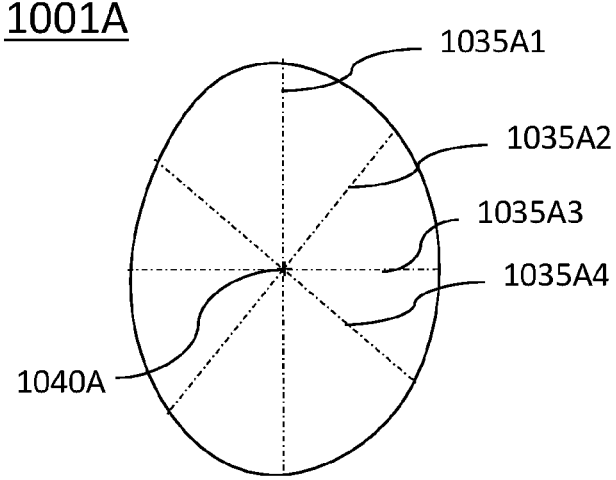
FIG. 10A3
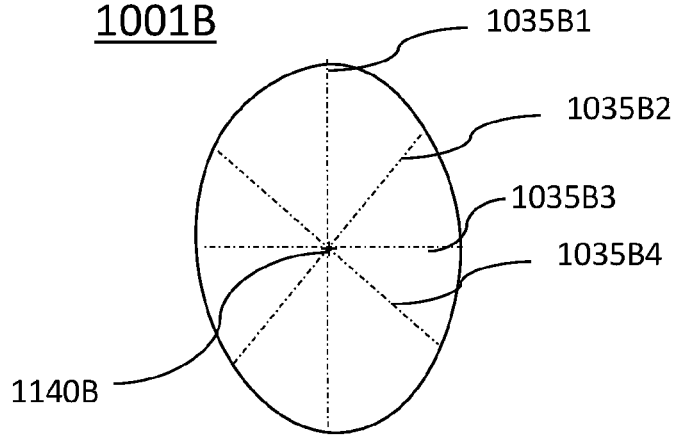
FIG. 10A4

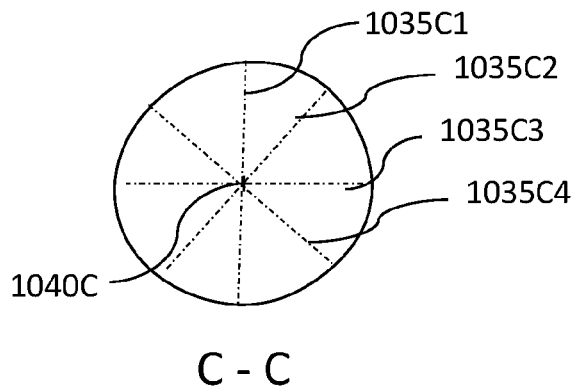
FIG. 10A5
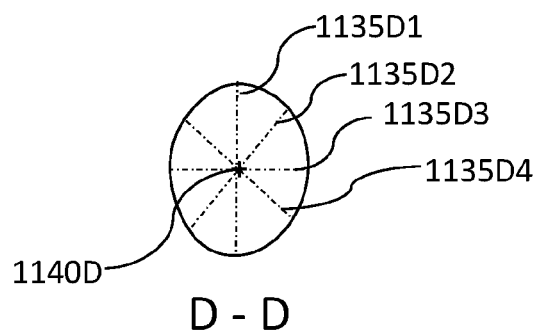
FIG. 10A6

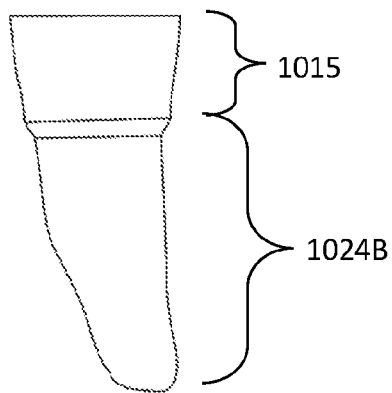
FIG. 10B1
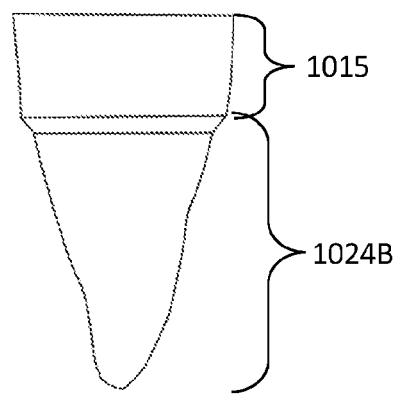
FIG. 10B2

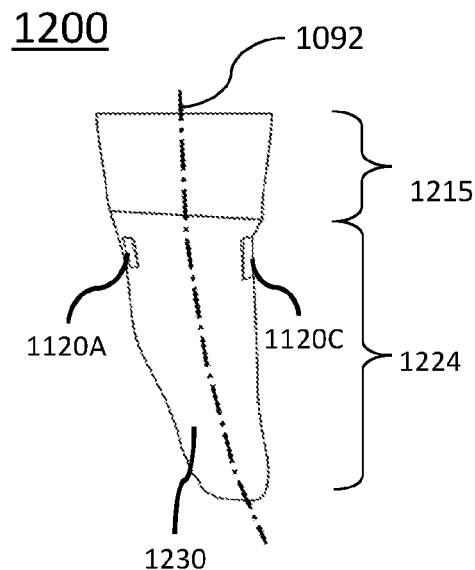
FIG. 12A1
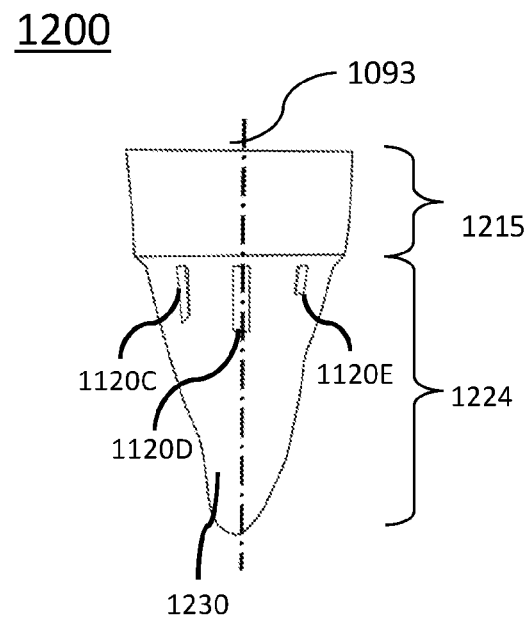
FIG. 12A2

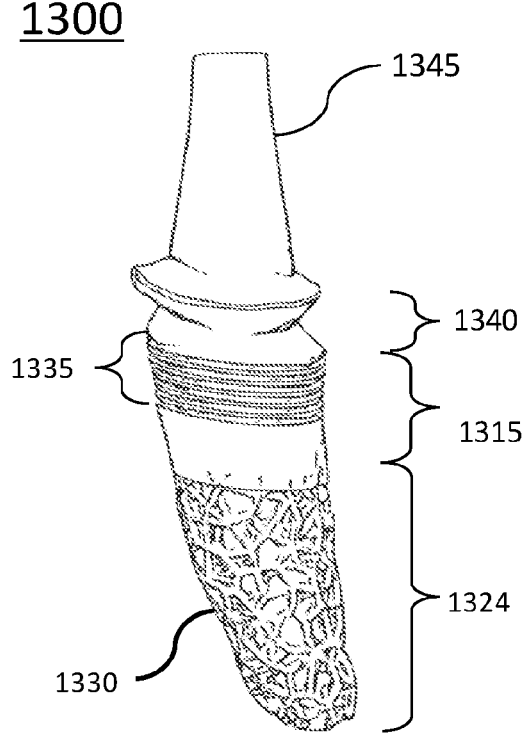
FIG. 13A1
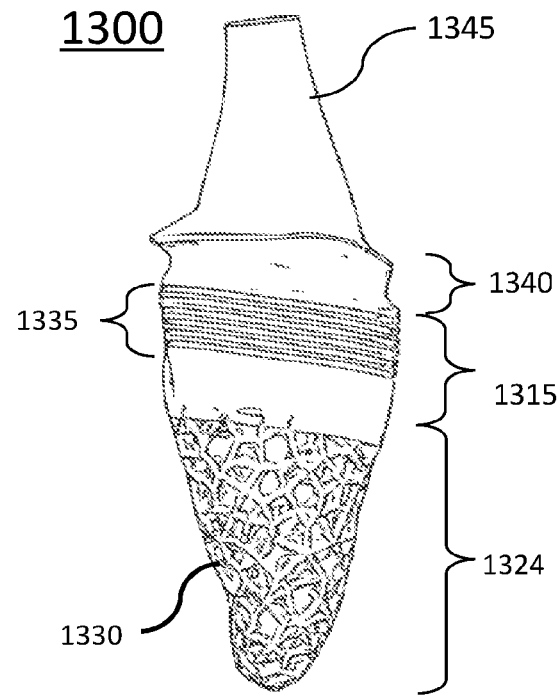
FIG. 13A2

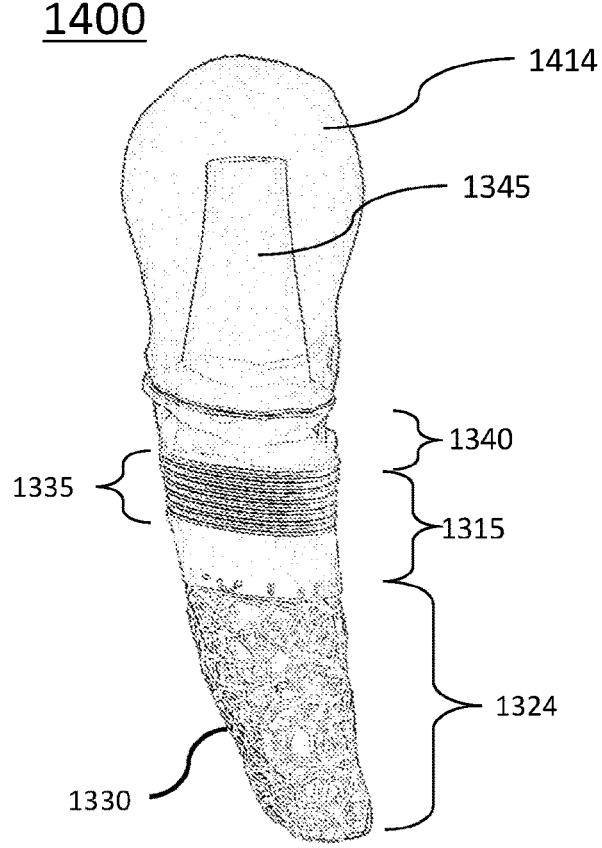
FIG. 14A1
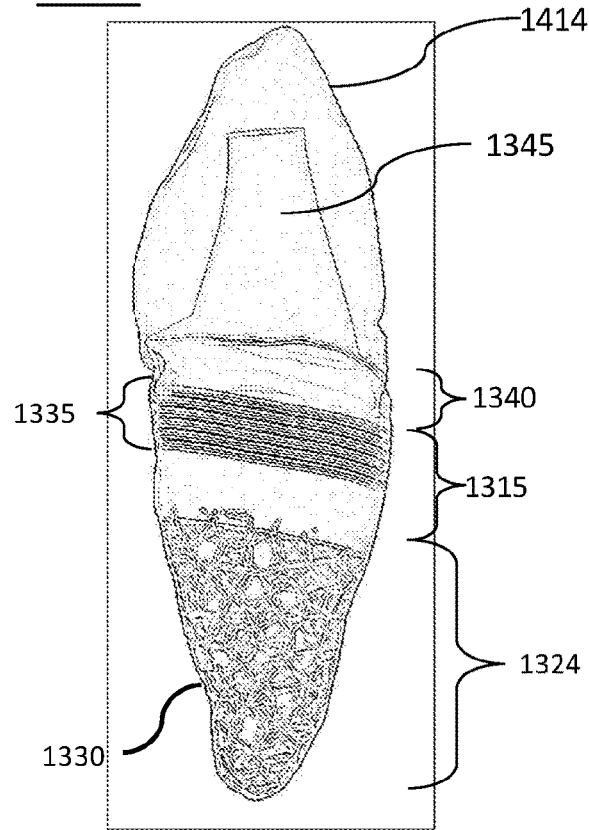
FIG. 14A2

ROOT-ANALOG DENTAL IMPLANTS AND SYSTEMS, DEVICES, AND METHODS FOR DESIGNING AND MANUFACTURING SAME

RELATED APPLICATIONS

This application is an INTERNATIONAL patent application of and claims priority to U.S. patent application Ser. No. 17/573,606, filed 11 Jan. 2022 and entitled "ROOT-ANALOG DENTAL IMPLANTS AND SYSTEMS, DEVICES, AND METHODS FOR DESIGNING AND MANUFACTURING SAME", U.S. Provisional Application No. 63/213,192, filed 21 Jun. 2021, and entitled "SYSTEMS, DEVICES, AND METHODS FOR DESIGNING AND MANUFACTURING A DENTAL IMPLANT USING ADDITIVE MANUFACTURING TECHNIQUES," and U.S. Provisional Application No. 63/251,623, filed on 2 Oct. 2021 and entitled "SYSTEMS, DEVICES, AND METHODS FOR DESIGNING AND MANUFACTURING A DENTAL IMPLANT WITH AN IMPLANT CORE," all of which are incorporated, in their entireties, by reference herein.

TECHNICAL FIELD

The invention generally relates to the field of dentistry, and more particularly to the field of dental implants. The invention further relates to the field of computer-assisted designing and/or the use of additive manufacturing techniques to design and manufacture dental implants.

BACKGROUND

Historically, traditional dental implants are placed within a site vacated by an extracted tooth after a prolonged healing phase following initial tooth extraction. During this healing phase, the bony structure of the tooth alveolar socket is reabsorbed by the body and replaced with a layer of bone and soft tissue covering the site of tooth extraction. Because these traditional dental implants come in standard shapes and sizes, a drill must be used to create an appropriately sized hole (i.e., osteotomy) within the healed-over bone to accommodate the dental implant. Unfortunately, the native hard and soft tissues around the alveolar socket are not supported during this drilling process, often resulting in bone and gumline defects commonly affecting esthetics and functional aspects of the tooth gumline. In addition, this methodology requires placement of the dental implant into soft medullary bone, which requires considerable time to fully integrate with the dental implant (i.e., osseointegration) and provide the strength and stability required for normal function. Placement of traditional dental implants may be achieved by screwing or press-fitting the dental implant into the drilled osteotomy. Following osseointegration, a permanent crown is attached to the dental implant via an attachable abutment.

This methodology may require long waiting and healing times between extraction of a damaged tooth, performance of the osteotomy, placement of the dental implant, and placement of a permanent crown for the patient. In addition, nerve damage is an inherent risk associated with drilling the required osteotomy.

SUMMARY

Several dental implant systems, devices, and methods for making same are herein described. Each of these may employ the use of additive manufacturing via, for example, three-dimensional (3D) printing, to enable the fabrication of these designs.

A dental implant may be designed using a three-dimensional scan of an atraumatically extracted tooth/tooth root. The surface of some root sections of the dental implant may be designed and fabricated with a porous, lattice-like structure. The porous, lattice-like structure may be configured to, for example, facilitate dental implant insertion, reduce stress on the bone surrounding the alveolar socket upon insertion and/or while the root portion of the dental implant is resident within the alveolar socket, and/or provide for better engagement between the bone and dental implant after healing.

In some embodiments, the processes described herein may be used to design a plurality of dental implants to replace an extracted tooth, wherein each dental implant of the plurality has different features. The dental implanting dentist may then select the appropriate dental implant from the plurality of virtually designed dental implants that may be, for example, displayed to the dentist on a display device (e.g., computer monitor).

On some occasions, a dental implant may be designed and fabricated such that it contains hollow interior section(s) positioned in the interior of the dental implant to relieve stress concentrations and/or provide a mechanism for injection of drugs, bone growth factors, antibiotics, etc. The hollow section may be entirely sealed within the dental implant, or it may have pores communicating with the surface of the root portion of the dental implant.

In some embodiments, a root portion of a root-analog dental implant (also referred to herein as a "root-analog dental implant") disclosed may be designed and fabricated in two pieces. When the two pieces are connected, a portion of the dental implant in the root socket may expand outward to directly engage with the alveolar socket, which may assist with provision of fixation of the dental implant in the root socket.

In some embodiments, a root portion of an implant (i.e., a portion of an implant positioned at, or below, a rim of an alveolar socket) may have three sections: a coronal section positioned near the rim of an alveolar socket from which a tooth has been extracted, an apex section positioned at an apex of the alveolar socket, and a diaphyseal section positioned between the coronal and apex sections.

At times, the coronal section may have a size and shape be adjusted relative to the 3D scan so that, for example, there is a reduction in a cross-sectional diameter in the buccal-lingual direction by, for example, 0.01 to 1.5 mm where the reduction may be taken at the buccal surface, the lingual surface, or both. In some instances, the reduction in the cross-sectional diameter may be responsive to, for example, alveolar socket geometry, bone morphology, and/or tooth position within the jaw. A purpose of the cross-sectional diameter may be to reduce stress-shielding along thin buccal or lingual plates. The buccal-lingual reduction in cross-sectional diameter may be decreased from the maximum buccal-lingual reduction around the surface of the implant either gradually, in a linear fashion or more abruptly depending on the morphology of the bone into which the implant is being placed.

The diaphyseal and apex sections may also have a reduction in cross-sectional area along the buccal and/or lingual surfaces of the implant root section. In some cases, the apex section of the implant may have a cross-sectional diameter reduced by roughly 1.0-3.0 mm from the apex may not follow the same expansion/reduction scheme but may be designed to mimic the root form or have a slight reduction in all aspects such that upon placement, the implant may be seated adjacent to bone.

A surface, or portion thereof, may be designed with macro-features to create a macro-porous surface (such as a lattice, holes, divots or other) that facilitates, for example, osseointegration and/or stability of a seated implant. The depth of this porous surface may range from 0.25 to 2.0 mm in thickness. In some cases, a surface of some, or all, of the macro-features may have smaller surface features that may serve to, for example, increase friction between the implant root section and bone of the alveolar socket upon implant placement and/or increase surface area of the root section of an implant for improved osseointegration. These features may include small divots or raised bumps or edges and at a smaller scale, varying levels of surface roughness. The size of these features might be limited to the resolution of the additive manufacturing technique but could potentially be reduced to the sub-micron scale.

In some instances, the diaphyseal section and/or apex sections of the root section of an implant may have a central core configured provide mechanical strength to the implant and/or root section of the implant such that the implant does not fail once it is in functional use. The core may be designed so that it has enough mechanical strength to withstand repeated loads from functional use (i.e., chewing and/or biting).

At times, the central core may have a solid, mostly solid, and/or densely arranged materials so that it lacks or mostly lacks voids in its structure such that the material strength is improved. A size, shape, position, and/or configuration of the solid, or mostly solid, core may depend on the shape of the implant and the amount of porous surface (e.g., lattice) surrounding it and/or struts present in the root section.

In some embodiments, the core may have a curvature that is different than the curvature of the outer surface of the root portion. In other words, the thickness of the porous shell of the diaphyseal and apex sections of the root portion may vary circumferentially and/or vertically.

At times, the core may be designed and fabricated with varying levels of solidity. For example, the core may have a solid circumferential "shell" with less solidity (increased voids) in the central core section or vice versa (i.e., increased solidity in the central core section with a number/volume of voids in the core increasing as it radiates outward to an external surface of the root section of the implant).

An exterior of the core may include features such as struts or ribs to improve mechanical strength of the implant root section. These features (referred to herein as "struts" for the sake of brevity) may be of any appropriate cross-sectional shape including, but not limited to, I-beams, triangles or other protruding features and may be vertically oriented, horizontally oriented, spirally oriented, zig-zag or wavy to improve mechanical strength. In some instances, these features may protrude into a porous shell/exterior surface of the root section up to or even beyond an exterior surface of the porous shell. The protruding features may be designed with maximum extent of protrusion nearest the coronal section of the root portion and decrease in height or level of protrusion further down toward the apex depending on the mechanical strength requirements at any given height on the implant root portion. The protrusions may follow the anatomical shape of the tooth socket and both engage the entirety of the alveolar socket upon implantation and during residency within the alveolar socket as well as relieve stress on the bone surrounding the alveolar socket.

A root portion of a root-analog dental implant as disclosed herein may include a core, a porous surface, and one or more struts. The core may be positioned in an approximate center of the root portion of the dental implant and may be configured to provide mechanical strength and/or support for the root-analog dental implant. The core may be positioned in an approximate vertically oriented center of the dental implant. In some embodiments, a density of the core may be variable across a horizontal cross-section of the core The porous surface may be positioned on a portion of a vertically oriented exterior surface of the core. An exterior surface of the porous surface may be configured to fit within an alveolar socket from which a tooth root has been removed. At times, the porous surface may include a plurality of overlapping elements and, in some embodiments, at least some of the plurality of overlapping elements may be interconnected and/or textured. Exemplary texturing includes a plurality of dimples and/or a plurality of holes.

The strut may extend from an external surface of the core into the porous surface along a portion of a length of the core. On occasions, the root-analog dental implant may include a plurality of struts that may be arranged around an exterior circumference of the core. In some embodiments, the porous surface may cover the strut(s). Strut(s) may have, for example, a triangular, square, curved, hexagonal, and/or pentagonal cross section.

In some embodiments, a root portion of a root-analog dental implant may include a core, a vertically oriented strut, and an exterior surface. The core may be positioned in an approximate center of the root portion of the dental implant and may be configured to provide mechanical strength and/or support for the dental implant. The core may be positioned in an approximate vertically oriented center of the dental implant and may include a coronal section, an apical section, and a diaphyseal section positioned between the coronal section and apical section. At times, a density of the core may be variable across a horizontal cross-section of the core.

One or more vertically oriented strut may extend from an external surface of the diaphyseal section of the core along a portion of a length of the diaphyseal section. The vertically oriented strut(s) may have, for example, a triangular, square, curved, hexagonal, and/or pentagonal cross section.

The exterior surface may be configured and positioned to cover a portion of the diaphyseal and apical sections of the core, the exterior surface may be configured to provide an exterior surface for the root-analog dental implant that approximates a shape of a corresponding diaphyseal and apical sections of an extracted tooth root. In some embodiments, the exterior surface may be porous and/or further arranged and positioned to cover the vertical strut.

In some embodiments, a root portion of a root-analog dental implant may include a core and a porous surface. The core may be positioned in an approximate center of the root portion of the dental implant and may provide mechanical strength and/or support for the root-analog dental implant and may be positioned in an approximate vertically oriented center of the dental implant.

The porous surface may be positioned on a portion of a vertically oriented exterior surface of the core and may be configured to fit within an alveolar socket from which a tooth root has been removed. The porous surface may include a plurality of overlapping elements and some of the plurality of overlapping elements may be interconnected and/or textured.

In some embodiments, the root portion of the root-analog dental implant may be configured to fit within an alveolar socket of an extracted tooth root. At times, the alveolar socket may be unmodified (e.g., no osteotomy is performed) prior to insertion of the root portion of the root-analog implant therein. The root portion of the root-analog dental implant may be manufactured via, for example, an additive manufacturing process so that, for example, the root portion of the root-analog dental implant is built as a single unit. In some embodiment, the root portion may include a coronal section that may optionally have surface texturing (e.g., grooves) configured to engage with a crest of the alveolar socket. At times, the root-analog dental implant may also include a transgingival section configured to sit in the gingiva of a patient but below the crest gingiva, or gum line. The root-analog dental implant may also include an abutment configured to cooperate with a crown positioned thereon.

The root portion of the root-analog dental implant disclosed herein may include a core, a porous surface, and a strut. The core may be configured to provide mechanical strength and/or support for the root-analog dental implant and a curvature of a centerline of the core may be configured to follow a curvature of a centerline of the extracted tooth root so that, for example, the root portion of the root-analog dental implant may fit into the alveolar socket in a manner similar to the tooth that was extracted therefrom. In some cases, a cross-sectional area of the core is variable along the centerline of the core so that, for example, a cross-sectional area of the core is larger near a coronal section of the root section and smaller near an apex of the root section.

The porous surface may be positioned on a portion (e.g., a diaphyseal and/or apical section) of the core, wherein an exterior surface of the porous surface is configured, sized and shaped to fit within the alveolar socket. The porosity of the porous surface may be configured to facilitate osseointegration of the root portion of the root-analog dental implant into the alveolar socket. In some cases, the porous surface may include a plurality of cavities configured to allow for bone growth therein. At times, the porous surface may include a plurality of overlapping elements and, in some cases, these overlapping elements may be interconnected and/or textured. In some embodiments, the porous surface covers the strut. In some embodiments, a thickness of the porous surface may vary along a length of the core so that, for example, the porous surface is wider near a coronal section of the root section and narrower near an apex of the root section.

The strut may be configured to provide mechanical strength and/or mechanical support for the root-analog dental implant and may extend from an external surface of the core into the porous surface along a portion of a length of the core. In some embodiments, the root section may include a plurality of struts arranged around an exterior circumference of the core. The struts may have any shape including, but not limited to, an irregular, curved, triangular, square, curved, hexagonal, and pentagonal cross section.

In some embodiments, a root portion of a root-analog dental implant may be configured to fit within an alveolar socket of an extracted tooth root. At times, the alveolar socket may be unmodified following extraction of the tooth root. The root portion may include a core, a porous surface, and one or more struts. The core may be configured to provide mechanical strength for the root-analog dental implant. A curvature of a centerline of the core may be configured to follow a curvature of a centerline of the extracted tooth root. The centerline of the core may be positioned in an approximately vertically oriented center of the core and the centerline of the extracted tooth root may be positioned in an approximately vertically oriented center of the tooth root. In some cases, the core may be designed using a template, or pre-designed, core and/or a base design for a core.

The porous surface may be positioned on a portion of the core and a shape and/or exterior geometry of the porous surface may be configured to fit within the alveolar socket. At times, the porous surface may include a plurality of interconnected and overlapping elements. In some situations, the porous surface may include a plurality of interconnected and overlapping elements and some of the plurality of interconnected and overlapping elements having a surface roughness and/or texture. In some embodiments, the porous surface may include a plurality of protrusions and/or cavities. At times, a thickness of the porous surface may vary along a length of the core. In some embodiments, a thickness of the porous surface may be responsive to a shape of curvature of the centerline of the core.

One or more struts may be configured to provide mechanical strength for the root-analog dental implant. The strut may extend from an external surface of the core into the porous surface along a portion of a length of the core. At times, an external surface of the strut fits within the exterior geometry of the porous surface. In some circumstances, a thickness and/or a width of the strut may be variable along a length of the core so that, for example, the strut is thicker near a coronal portion of the root-analog dental implant. In some embodiments, a shape of the strut may be responsive to a shape of curvature of a centerline of the core. Additionally, or alternatively in some embodiments, the root portions of a root-analog dental implant may include a plurality of struts and the core may have a lingual side, a buccal side, a mesial side, and a distal side. In these embodiments more of the struts may extend from the lingual side and/or the labial side than extend from the mesial side and/or the distal side.

In some embodiments, the root portion may further include a coronal section positioned proximate to the core and, in some circumstances the coronal section may have surface texturing (e.g., projections, cavities, and/or roughness).

BRIEF DESCRIPTION OF THE DRAWINGS

The present invention and embodiments thereof are illustrated by way of example, and not limitation, in the figures of the accompanying drawings in which:

FIG. 4A provides a side view of a tooth to be extracted from an alveolar socket, consistent with some embodiments of the present invention;

FIG. 4B provides a side view of tooth of FIG. 4A once extracted from alveolar socket and shows the cavity, or open space, of the alveolar socket, consistent with some embodiments of the present invention;

FIG. 5A1 provides a mesial/distal view of a first model of an extracted tooth, consistent with some embodiments of the present invention;

FIG. 5A2 provides a buccal/lingual view of the first model of the extracted tooth of FIG. 5A1, consistent with some embodiments of the present invention;

FIG. 5B1 provides a mesial/distal view measurements of the first model of FIG. 5A1, consistent with some embodiments of the present invention;

FIG. 5B2 provides a buccal/lingual view of the first model of FIG. 5A1 with annotations representing a buccal line and a lingual angulation line superimposed thereon, consistent with some embodiments of the present invention;

FIG. 5B3 provides a mesial/distal view of the first model of FIG. 5A1 with annotations representing a total modeled tooth length, a modeled root length, and a modeled mesial/distal width superimposed thereon, consistent with some embodiments of the present invention;

FIG. 5B4 provides a buccal/lingual view of the first model of FIG. 5A1 with annotations representing a modeled buccal/lingual width superimposed thereon, consistent with some embodiments of the present invention;

FIG. 5C1 provides an illustration of a second model, consistent with some embodiments of the present invention;

FIG. 5C2 provides an illustration of a third model, consistent with some embodiments of the present invention;

FIG. 5D1 provides a mesio/distal side view of a fourth model, consistent with some embodiments of the present invention;

FIG. 5D2 provides a buccal/lingual side view of the fourth model of FIG. 5D1 superimposed upon the third model of FIG. 5C2, consistent with some embodiments of the present invention;

FIG. 5D3 shows an irregular shape of a cross section of the fourth model of FIG. 5D1, consistent with some embodiments of the present invention;

FIG. 5E1 provides a buccal/lingual side view of a fifth model 507 superimposed upon the fourth model, consistent with some embodiments of the present invention;

FIG. 5E2 provides a cross section of fifth model superimposed upon the fourth model, consistent with some embodiments of the present invention;

FIG. 9A1 provides a mesial/distal view of a first curved-tooth model of an exemplary curved tooth root, consistent with some embodiments of the present invention;

FIG. 9A2 provides a buccal/lingual view of the first curved-tooth model of FIG. 9A1, consistent with some embodiments of the present invention;

FIG. 10A1 provides a mesial/distal view of a second curved-tooth model, consistent with some embodiments of the present invention;

FIG. 10A2 provides a buccal/lingual view of the second curved-tooth model of FIG. 10A1, consistent with some embodiments of the present invention;

FIG. 10A3 provides a cross section view of a first cross section of the second curved-tooth model of FIG. 10A1, consistent with some embodiments of the present invention;

FIG. 10A4 provides a cross section view of a second cross section of the second curved-tooth model of FIG. 10A1, consistent with some embodiments of the present invention;

FIG. 10A5 provides a cross section view of a third cross section of the second curved-tooth model of FIG. 10A1, consistent with some embodiments of the present invention;

FIG. 10A6 provides a cross section view of a fourth cross section of the second curved-tooth model of FIG. 10A1, consistent with some embodiments of the present invention;

FIG. 10B1 provides a mesial/distal view a third curved-tooth model, consistent with some embodiments of the present invention;

FIG. 10B2 provides a buccal/lingual view the third curved-tooth model of FIG. 10B1, consistent with some embodiments of the present invention;

FIG. 12A1 provides a mesial/distal view of a merged core, consistent with some embodiments of the present invention;

FIG. 12A2 provides a buccal/lingual view of the merged core of FIG. 12A1, consistent with some embodiments of the present invention;

FIG. 13A1 provides an exemplary mesial/distal view of a complete implant model that includes a porous surface, consistent with some embodiments of the present invention;

FIG. 13A2 provides a buccal/lingual view of the complete implant model of FIG. 13A1, consistent with some embodiments of the present invention;

FIG. 14A1 provides a mesial/distal view of a system that includes the complete implant model of FIGS. 13A1 and 13A2 and a modeled crown positioned on top of abutment, consistent with some embodiments of the present invention;

FIG. 14A2 provides a mesial/distal view of the system of FIG. 14A1, consistent with some embodiments of the present invention;

Figure 1A:
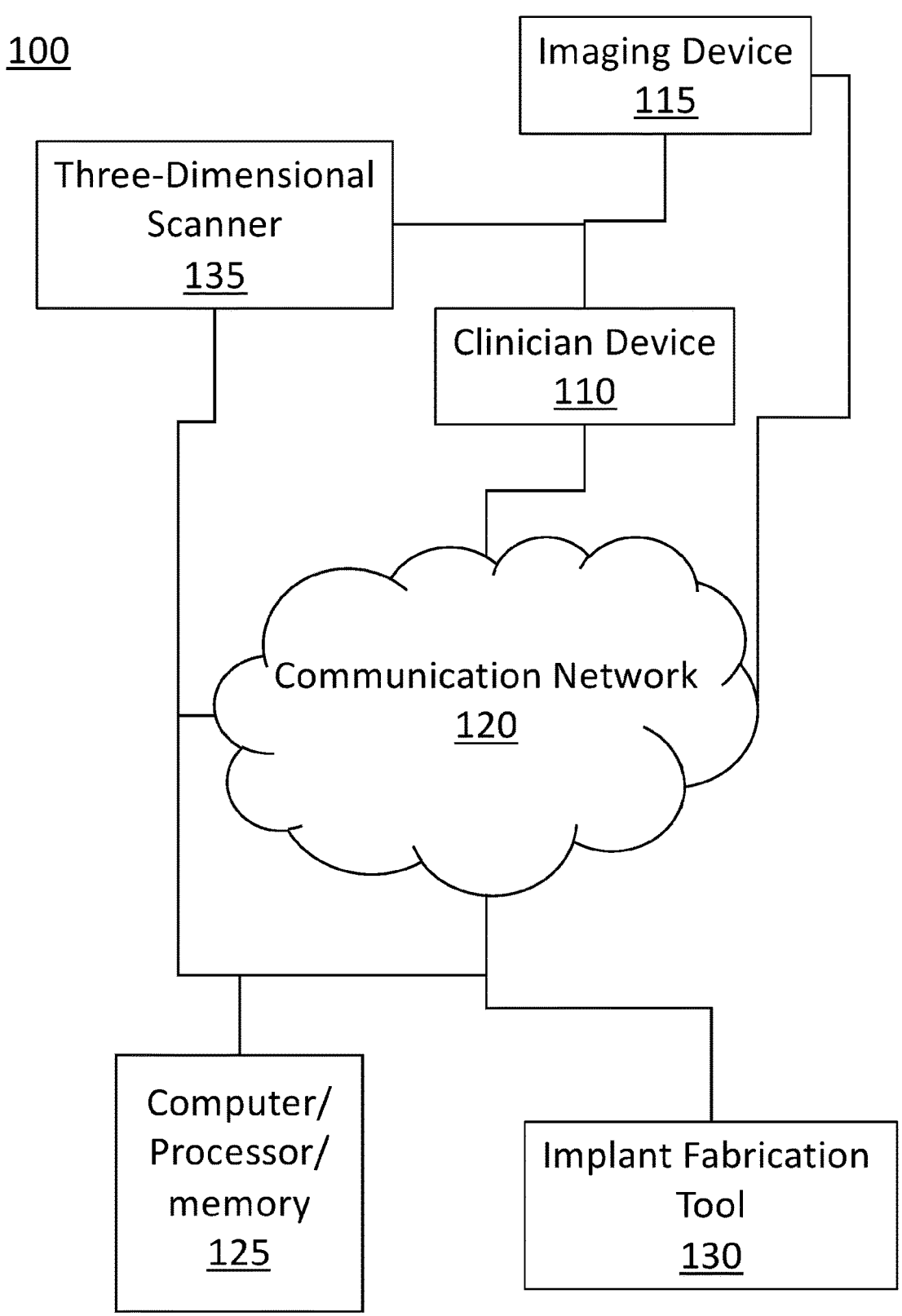
FIG. 1A is a block diagram of a system, which may be used to design and manufacture a dental implant using additive manufacturing techniques, consistent with some embodiments of the present invention.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

WRITTEN DESCRIPTION

A root-analog dental implant, as disclosed herein, may be designed using a three-dimensional scan, a CT scan, an intra-oral scan, and/or other images of a tooth prior to extraction and/or an extracted tooth and/or tooth root. In order to preserve shape and size information for an extracted tooth, it may be advantageous to atraumatically extract the tooth so that the tooth root is extracted from the jaw in one (or a few) pieces that may then be scanned or otherwise imaged and used as a model to design an implant to replace the extracted tooth. An implant design process may use a three-dimensional scan, or other images and information, of the extracted tooth root as a base for designing a three-dimensional model of a dental implant to replace the extracted tooth that may then be fabricated using, for example, an additive manufacturing process such as three-dimensional printing. Once manufactured, a root-analog dental implant designed using one or more processes described herein may be inserted directly into the original, unmodified alveolar socket from which the scanned and/or imaged tooth/tooth root has been extracted prior to the jawbone reshaping itself to fill in the vacated alveolar socket. Thus, the root-analog dental implants described herein may be seated within an unmodified alveolar socket thereby eliminating the need to modify the alveolar socket with an apical osteotomy as may be performed for immediate implants or to wait for the bone to grow into the vacated socket and create a subsequent osteotomy to insert a traditional screw or press-fit, cylindrically shaped, implant.

Historically, dental implants have been manufactured from solid materials using subtractive means or the removal of material until the final desired shape is achieved. This method uses mills, lathes or other machines or methods to remove materials. These methods are advantageous especially when large quantities of identical products are manufactured. However, one disadvantage to the subtractive method of manufacturing dental implants is that it is difficult to adapt these processes to generate customized, or personalized, root-analog dental implants because doing so would require reconfiguration of the subtractive implant fabrication equipment for each individual customized implant so that each dental implant can have its own shape and specifications which would require the machine to be set up for each part individually thus increasing the cost of each dental implant. These reconfiguration efforts increase time needed to manufacture the implants and increase the cost to manufacture them.

Another disadvantage to subtractive manufacturing of dental implants is the inherent limitations of the features that may be included in a dental implant. For example, there are features that may be desired (e.g., a porous exterior to promote bone growth or structural features to assist with implant durability and/or strength) that are difficult or impossible to create by subtractive means because it is difficult to carve out, or tailor, features that may be internal to (e.g., not on a surface of) a dental implant.

Additive manufacturing technology, where the raw material is in powdered form and is fused into a solid part using a highly focused heat source provides an alternative means of forming dental implants that may be a more advantageous manufacturing method versus subtractive manufacturing in situations where dental implant design is customized for a specific patient and/or a specific tooth or if there are features desired for a dental implant that are difficult, or impossible, to achieve using subtractive manufacturing methods.

In some embodiments, one or more of the dental implants described herein may include one or more mechanical strength and/or support mechanisms, or struts, configured to provide mechanical and/or structural strength and/or support for dental implants following insertion so that, for example, inserted dental implants may withstand various forces such as the forces and/or loads exerted on the inserted dental implant from chewing and/or tearing. In some embodiments, the struts may extend vertically from an axis and/or centerline of a dental implant body to the surface of the implant body. Additionally, or alternatively, the struts may extend from the center of a dental implant body toward an apex but may not extend all the way to the surface of the implant body and, in these embodiments, the struts may be covered by another portion of the dental implant such as a porous surface and/or lattice structure as described herein.

Struts may be designed and/or configured to provide strength and stability to an implant while under, for example, loads which are not co-axial with the root centerline thus creating a bending moment that may be exerted thereon while chewing. In some embodiments, strut design (e.g., size, shape, and position on, or within, an implant) may be configured to conform with strength and load requirements for a dental implant using, for example, computer-assisted design software and/or more processes described herein.

In some cases, an implant design process may incorporate numerous factors and/or features for an implant that may be based upon one or more characteristics of the extracted tooth, alveolar socket, and/or patient. For example, implant and/or strut design and/or configuration may be based root shape (curvature, length, amount of taper, etc.), where the tooth was positioned in the patient's jaw, and/or how much shear/compressive strain the tooth is expected to experience during its lifetime. Other factors that may be incorporated into implant design and/or configuration include expected rates of osseointegration of the implant within the alveolar socket and/or whether, and to what extent, bone grafting may be necessary. Additionally, or alternatively, implant and/or strut design may be customized to accommodate one or more clinician preferences and/or to provide a design most suitable for that particular case based upon scientific evidence. For example, if a dentist or oral surgeon has a particular preferred design to work with, that preference may be incorporated into the design of the implant. In another example, if a clinician observes the patient has brittle, or relatively thin, bone surrounding the alveolar socket, these observations may be included in the design of the implant so that the implant appropriately fits within the alveolar socket and does not excessively strain certain areas of bone surrounding the alveolar socket. Additionally, or alternatively, a dentist or clinician may have varying preferences regarding a surface texture (e.g., polished, highly polished, rough, micro-textured, rough, etc.) of a portion of a root-analog implant, a shape, size, and/or count of coronal grooves, a shape, size, position, and/or crown engagement mechanism of an abutment, and/or a shape, size, position, and/or surface texturing of a transgingival section of the root-analog dental implant.

In some embodiments, strut design and/or configuration may be responsive to analysis of, for example, a shape and/or size of the extracted tooth and/or tooth root as shown on, for example, a three-dimensional scan of the extracted tooth root, an X-ray, an intra-oral scan of the tooth and/or alveolar socket, and/or an external scan such as a CT or MRI scan.

Struts may be of any cross-sectional size, shape, or combination of shapes including, but not limited to, square, rectangular, star, hexagonal, rounded, triangular, a plurality of curved extensions, and I-beam shaped. In some cases, a strut size and/or orientation may change along the length of the implant root section. For example, a strut may be thinner near an apex of a root section and gradually increase in thickness to a maximum thickness at, or near, a coronal section. Additionally, or alternatively, a dimension (e.g., thickness, width, or height) may be proportional to an overall size of a root section of an implant so that as a cross-sectional area of the root section decreases from the coronal section to the apex section, a dimension of the strut changes in size depending on the strength requirements of the implant root.

In embodiments where both struts and a porous surface are used in a design of a root-analog dental implant; the struts may provide a micro geometry of an implant. At times, when a strut is extends to the exterior surface of an implant, a surface of the strut coincident with the exterior surface of the implant may include small, or nano, surface features (e.g., dimples or cross hatching) that may be configured to provide a surface for bone growth. At times, a strut may provide macro geometry, a lattice and/or porous structure may provide micro geometry, and additional even smaller features, such as a nano surfacing, spikes, and/or extensions may be applied to and/or designed into one or more struts and/or portion(s) of the lattice and/or porous structure. In some embodiments, a strut and/or lattice design for an implant may be responsive to, for example, clinical considerations and/or preferences, tooth type, tooth position within the mouth, variations of anatomy, patient preferences and/or characteristics, crown characteristics, tooth orientation, and/or features of teeth surrounding an extracted tooth and/or implant.

At times, a shape, size, orientation, and/or configuration of one or more struts may be responsive to, for example, characteristics of an extracted tooth root and/or an alveolar socket from which the tooth was extracted and/or where in the root-analog implant they are placed. For example, in some cases, struts positioned on a buccal and/or lingual side of an exterior surface of a core of a root-analog implant may extend a relatively large lateral, or perpendicular, distance from an implant core and/or into a porous surface covering the core (i.e., may be shallow) to provide greater mechanical strength in this aspect. Additionally, or alternatively, struts positioned on a mesial and/or distal side of a core of a root-analog dental implant may extend a relatively small lateral, or perpendicular, distance from the exterior surface of the core since bending moments in this aspect are relatively less.

In some embodiments, struts may be equidistantly positioned around a circumference of a core of a root-analog dental implant. Alternatively, struts may be positioned around a circumference of a core of a root-analog dental implant in a manner that is irregular. In these cases, positioning of one or more struts may be responsive to, for example, a characteristic of a tooth root and/or root-analog dental implant characteristic. For example, more struts may be positioned on a buccal and/or lingual side than a mesial and/or distal side of a root-analog dental implant because the buccal and/or lingual sides of the root-analog dental implant require greater mechanical resistance to loads imparted on the functioning implant. Positioning more struts on the buccal and/or lingual sides of the root-analog dental implant may assist with providing mechanical strength to the implant and/or dispersion of force along the relatively wider buccal and/or lingual sides of the root-analog dental implant.

Often times, a principal requirement of dental implants is that they must withstand the forces imparted on them by chewing to ensure they will not mechanically fail under maximum expected loads (tensile/compressive/shear strength) or repeated loads over time (fatigue). This includes maximum occlusive forces from a single bite as well as cyclic forces of repeated chewing over their expected life. Typically, manufacturers of dental implants test their products to ensure dental implants can withstand both maximum occlusal forces without breaking and repeated loads based on average and maximum forces for several million cycles.

Loads imparted on dental implants tend to be greatest at, or near, the top of the root portion of the dental implant (e.g., the portion of the dental implant corresponding to a coronal section) and minimal at, or near, the root portion or apex of the dental implant. For this reason, there is opportunity to remove material at, or near, the apex of the dental implant since it does not contribute to dental implant function or performance.

Turning now to the figures, FIG. 1A is a block diagram of a system 100, that may be used to design and manufacture a dental implant using additive manufacturing techniques such as 3D laser printing. System 100 may include a clinician device 110, one or more imaging devices 115, a communication network 120, a computer/processor/memory 125, a dental implant fabrication tool 130, and/or a three-dimensional scanner 135. Communication network 120 may be any network configured to assist with the communication between two or more components of system 100. Exemplary communication networks 120 include the Internet.

Clinician device 110 may be any device, such as a computer, tablet computer, and or smart phone, which is resident in a clinician's office (e.g., dentist's office) configured to communicate with one or more devices of a system 100. Clinician device 110 may be configured to communicate patient information and or tooth extraction information to, for example, computer/processor/memory 125. In some embodiments, clinician device 110 may be in communication with imaging device 115 in order to, for example, view or gain information about one or more images of the patient's mouth, jaw, and/or teeth such as X-rays or scans. In some cases, imaging device 115 may be in the clinician's office. Additionally, or alternatively, imaging device 115 may be resident in a separate facility (e.g., hospital or medical care clinic). Exemplary imaging devices 115 include, but are not limited to, x-ray machines, intra-oral scanners, and CT scanning devices.

Figure 1B:
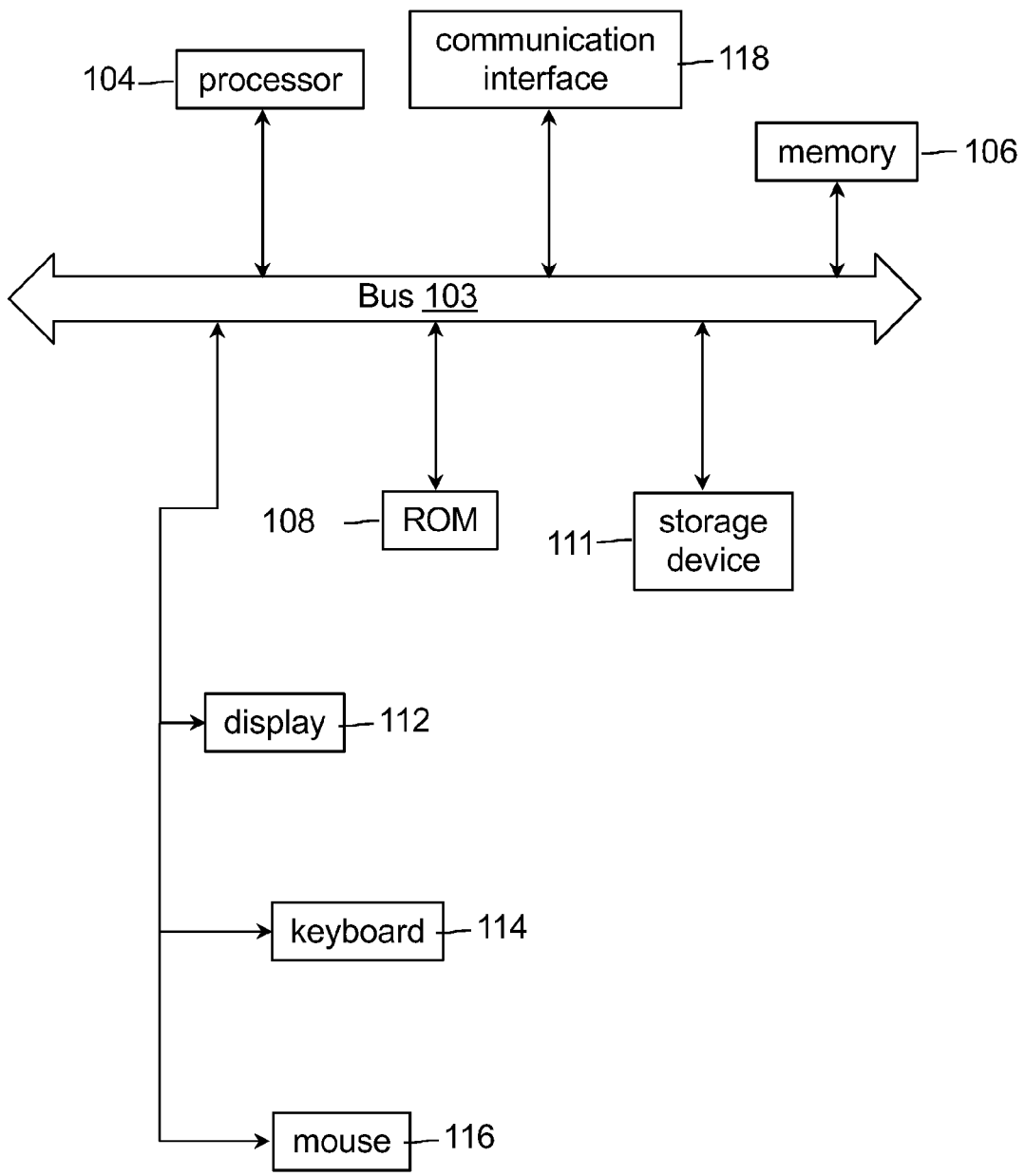
FIG. 1B is a block diagram of an exemplary processor-based system that may store data and/or execute instructions for the processes disclosed herein, consistent with some embodiments of the present invention.

Computer/processor/memory 125 may be configured to design a dental implant using additive manufacturing according to, for example, one or more of the methods disclosed herein. In some embodiments, computer/processor/memory 125 may be in communication with a processor-based system 102 as shown in FIG. 1B and described below via, for example, communication network 120. In some embodiments, computer/processor/memory 125 may be distributed and/or resident in multiple pieces of hardware that are in communication with one another via a wired and/or wireless connection (e.g., communication network 120). In some embodiments, computer/processor/memory 125 may be configured as a deep neural network capable of, for example, performing on or more operations using artificial intelligence and/or machine learning.

Three-dimensional scanner 135 may be configured to scan an extracted tooth root in three dimensions and communicate three-dimensional scans to clinician device 110 and/or computer/processor/memory 125 via communication network 120.

Dental implant fabrication tool 130 may be configured to receive instructions for the fabrication of one or more of the dental implants and/or dental implant components disclosed herein. Dental implant fabrication tool 130 may be, for example, a 3D printer, a computer-aided manufacturing (CAM) module, and/or a milling machine.

In some embodiments, not all components of system 100 may be resident in the same place. For example, three-dimensional scanner 135 may be resident in a dentist's office and may communicate the three-dimensional scan of the extracted tooth root to other components of system 100 via communication network 120.

FIG. 1B provides an example of a processor-based system 102 that may store and/or execute instructions for one or more of the processes described herein. Processor-based system 102 may be resident within, for example, clinician device 110 and/or computer/processor/memory 125. Note, not all the various processor-based systems which may be employed in accordance with embodiments of the present invention have all of the features of system 102. For example, certain processor-based systems may not include a display inasmuch as the display function may be provided by a client computer communicatively coupled to the processor-based system or a display function may be unnecessary. Such details are not critical to the present invention.

System 102 includes a bus 103 or other communication mechanism for communicating information, and a processor 104 coupled with the bus 103 for processing information. System 102 also includes a main memory 106, such as a random-access memory (RAM) or other dynamic storage device, coupled to the bus 103 for storing information and instructions to be executed by processor 104. Main memory 106 also may be used for storing temporary variables or other intermediate information during execution of instructions to be executed by processor 104. System 102 further includes a read only memory (ROM) 108 or other static storage device coupled to the bus 103 for storing static information and instructions for the processor 104. A storage device 111, which may be one or more of a hard disk, flash memory-based storage medium, a magnetic storage medium, an optical storage medium (e.g., a Blu-ray disk, a digital versatile disk (DVD)-ROM), or any other storage medium from which processor 104 can read, is provided and coupled to the bus 102 for storing information and instructions (e.g., operating systems, applications programs and the like).

System 102 may be coupled via the bus 103 to a display 112, such as a flat panel display, for displaying information to a user. An input device 114, such as a keyboard including alphanumeric and other keys, may be coupled to the bus 103 for communicating information and command selections to the processor 104. Another type of user input device is cursor control device 116, such as a mouse, a trackball, or cursor direction keys for communicating direction information and command selections to processor 104 and for controlling cursor movement on the display 112. Other user interface devices, such as microphones, speakers, etc. are not shown in detail but may be involved with the receipt of user input and/or presentation of output.

The processes referred to herein may be implemented by processor 104 executing appropriate sequences of processor-readable instructions stored in main memory 106. Such instructions may be read into main memory 106 from another processor-readable medium, such as storage device 111, and execution of the sequences of instructions contained in the main memory 106 causes the processor 104 to perform the associated actions. In alternative embodiments, hard-wired circuitry or firmware-controlled processing units (e.g., field programmable gate arrays) may be used in place of or in combination with processor 104 and its associated computer software instructions to implement the invention. The processor-readable instructions may be rendered in any computer language.

System 102 may also include a communication interface 118 coupled to the bus 103. Communication interface 118 may provide a two-way data communication channel with a computer network, which provides connectivity to the plasma processing systems discussed above. For example, communication interface 118 may be a local area network (LAN) card to provide a data communication connection to a compatible LAN, which itself is communicatively coupled to other computer systems. The precise details of such communication paths are not critical to the present invention. What is important is that system 102 can send and receive messages and data through the communication interface 218 and in that way communicate with other controllers, etc.

Figure 2:
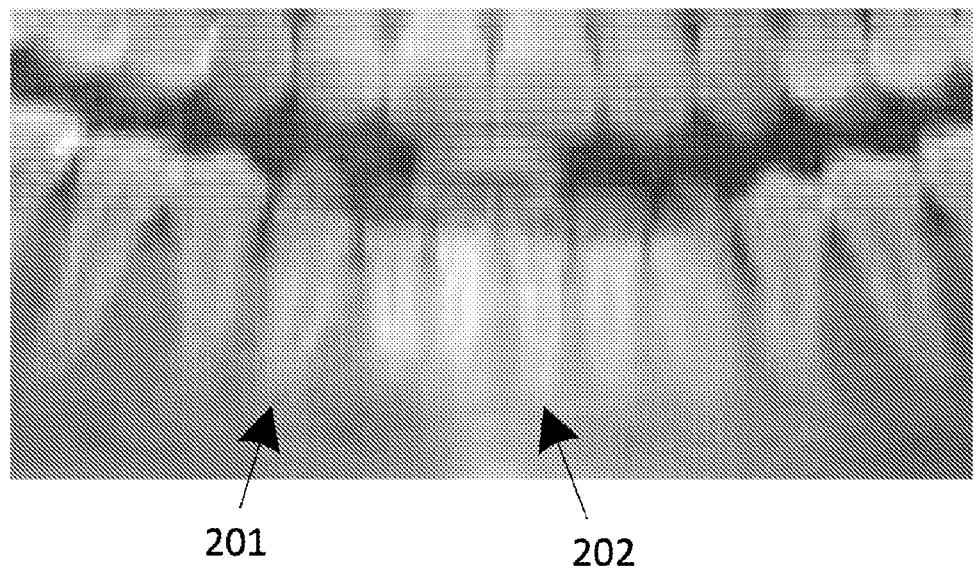
FIG. 2 is an X-ray image of a patient's lower jaw showing roots for the teeth in the patient's lower jaw, consistent with some embodiments of the present invention.

FIG. 2 is an X-ray image 200 of a patient's lower jaw showing roots for the teeth in the patient's lower jaw, consistent with some embodiments of the present invention. In particular, X-ray image 200 shows varying mesial-distal width between tooth roots within the patient's jaw with a mesial-distal distance width being larger on the mesial and distal sides of a first tooth 201 than a second tooth 202 positioned at the front, or apex, of the jawline.

Figure 3A:
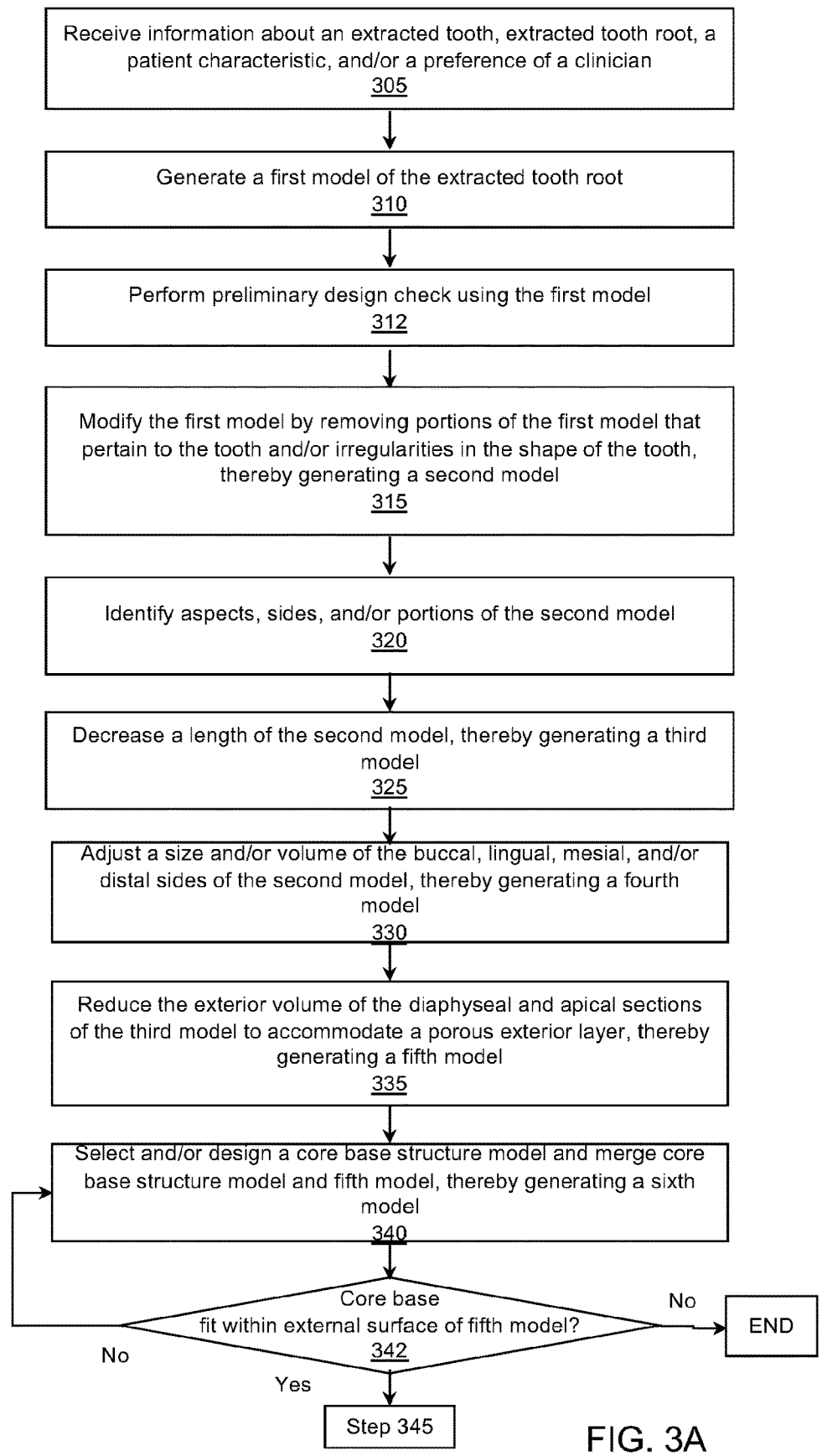
FIG. 3A provides a first portion of a flowchart that illustrates a process for designing a dental implant, consistent with some embodiments of the present invention.
Figure 3B:
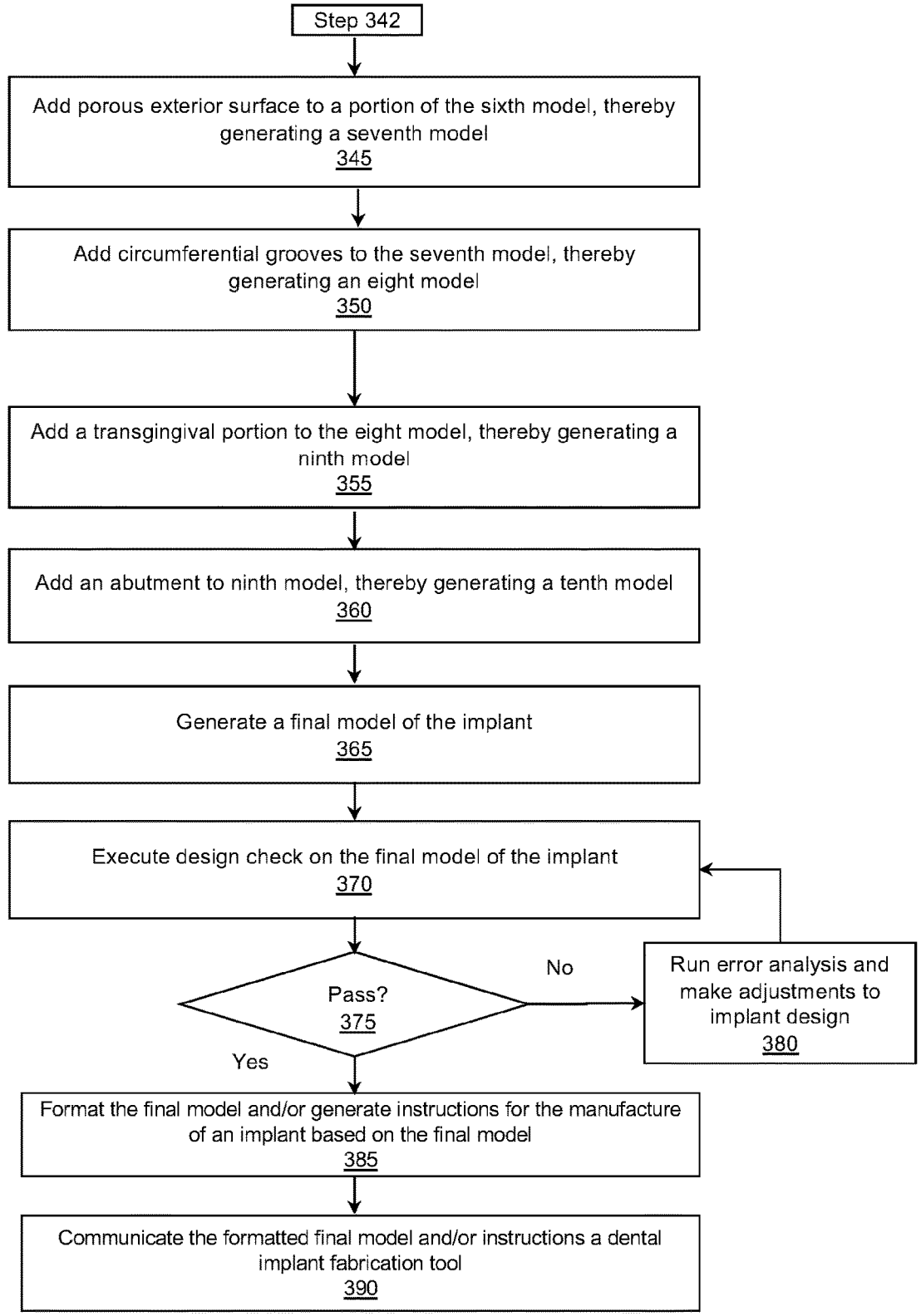
FIG. 3B provides a second portion, or continuation, the flowchart that illustrates the process for designing a dental implant of FIG. 3A, consistent with some embodiments of the present invention.

FIGS. 3A and 3B provide a flowchart that illustrates a process 300 for designing a dental implant. Process 300 may be executed by, for example, a processor or computer executing a set of instructions stored on a memory (e.g., memory 106) in communication with the processor (e.g., computer/processor/memory 125 and/or processor 104). In some embodiments, process 300 may be executed using one or more specifically designed and/or proprietary software packages configured to execute process 300 or portions thereof. In some cases, one or more steps of 300 may be executed automatically via execution of a machine learning process, application of an algorithm developed via a machine learning process that analyzed data from, for example, a plurality of extracted tooth roots, or via inputting information into a deep neural network configured to execute one or more steps of process 300. At times, one or more steps of process 300 may be executed via a distributed computing network and/or a local computer interfacing with a dental implant design professional. Additionally, or alternatively, in some embodiments, one or more steps of process 300 may be executed using a computer-assisted drawing software program. FIGS. 4A, 4B, and 5A-5G provide a series of drawings that depict an extracted tooth and a series of iterations to a model of a dental implant as may occur during execution of a dental implant design process like process 300 and will be discussed below with regard to exemplary relevant steps of process 300.

In step 305, information regarding an extracted tooth, an extracted tooth root, and/or a patient a tooth has been extracted from may be received by, for example, a processor-based system, which in some embodiments may include a processor configured to incorporate a computer-aided design (CAD) module such as computer/processor/memory 125. In many cases, the information received in step 305 includes one or more two- or three-dimensional image(s) and/or scan(s) of an extracted tooth root, fractured pieces of an extracted tooth root, and/or an alveolar socket from which the tooth has been extracted. This information may be received from/via, for example, an intra-oral scanner, an X-ray image, a CT scan image, a three-dimensional scanner like three-dimensional scanner 135 and/or a clinician device like clinician device 110. Additionally, or alternatively, the information received in step 305 may be a scan of the patient, a tooth and/or tooth root prior to, or following extraction, and/or a scan of a subject tooth/tooth root and adjacent teeth and/or opposing dentition. These scans may be, for example, CT scans, X-rays, and/or intraoral scans. Additionally, or alternatively, the information received in step 305 may be one or more patient characteristics such as gender, age, bone health, anticipated healing rates, bone thickness, bone density, and/or aesthetic considerations.

Optionally, in some embodiments, one or more patient characteristics (e.g., age, gender, bone quality, bone dimensions, bone density, general health, and/or whether the patient is immuno-compromised) and/or clinician preferences (e.g., occlusion and/or functional, esthetic, and/or prosthetic requirements) may be received in step 305. These characteristics and/or preferences may be used to design the root-analog dental implant models of process 300 and/or features thereof. In one example regarding patient characteristics, if a patient has relatively low bone density, thickness, and/or quality, an implant may be designed to exert relatively minimal force on a buccal and/or lingual surface of an alveolar socket. In another example, when a patient is relatively young, the implant may be designed for a maximum lifetime with bolstered mechanical strength and/or supports and/or struts to withstand a chewing load exerted thereon for many years.

Clinician preferences that may be received in step 305 may be used to, for example, design an implant that may accommodate the clinician's preferences for inserting the implant and/or preferences for the design, function, operation, durability, and/or aesthetics, of the implant. Additionally, or alternatively, clinician preferences may include preferences for a shape and/or design of the final tooth root implant. In some embodiments, information from a clinician and/or dentist about the patient and/or a clinician preference may be received in step 305 as part of, for example, a prescription for the implant. The prescription may also include, for example, aesthetic requirements for the patient and/or clinician preferences for the design of the implant some examples of which are provided in the discussion of process 300, below.

FIG. 4A provides an illustration of a tooth 400 to be extracted from an alveolar socket 425. Tooth 400 includes a crown 405, a root 410, and a root mark 415 that marks a location on the tooth coincident with the rim, or crest, of alveolar socket 425 on tooth 400. Root mark 415 delineates crown 405 from root 410. FIG. 4A also shows how tooth 400 fits into a layer of gingiva 422 within a patient's mouth, with an upper gingival edge (margin) 412, positioned above a patient's jawbone 420 proximate to the walls of alveolar socket 425. FIG. 4B shows tooth 400 being extracted from alveolar socket 425 and shows the cavity, or open space, of alveolar socket 425.

Next, in step 310, a first model of the extracted tooth root may be generated. The first model may be a two- or three-dimensional rendering of the extracted tooth (e.g., extracted tooth 400) generated using the data received in step 305 and may closely, or exactly, match the size, shape, and/or dimensions of the extracted tooth root. In some embodiments, execution of step 310 may include determining a portion of the three-dimensional image and/or scan received in step 305 that pertains to the crown and root of the extracted tooth. This determination may be made via analysis of a position of a root mark like root mark 415 on the first model so that a portion of the extracted tooth that is positioned on a first side (e.g., the side of the tooth extending away from the jawbone and into the patient's mouth) is determined to be the tooth crown (e.g., crown 405) and a portion of the extracted tooth that is positioned on a second side (e.g., the side of the tooth extending into the jawbone) is determined to be the tooth root (e.g., root 410).

FIG. 5A1 provides a mesial/distal view and FIG. 5A2 provides a buccal/lingual view of a first model 501 of tooth 400 that may be generated in step 310 using, for example, a three dimensional scan of extracted tooth 400, a CT scan of extracted tooth 400, an intraoral scan of extracted tooth 400, and/or an X-ray image of extracted tooth 400 that may be received in, for example, step 305. First model 501 may be a two- or three-dimensional rendering of tooth 400 that is unmodified (i.e., is a model that replicates the outline, dimensions, and/or shape of tooth 400) First model 501 includes a modeled root mark 511 that corresponds to the position of root mark 415, a root line 513 that extends root mark 511 around the circumference of first model 501, a modeled upper gingival edge 512 that may correspond to upper gingival edge 412, and a layer of gingiva 522 that may correspond to layer of gingiva 422. In the embodiment of FIG. 5A, root line 513 has been extended to the left and right (as oriented in the figure) with a dashed line that marks the root line across the circumference of first model 501.

Optionally, in step 312, a preliminary design check to determine whether the extracted tooth root is suitable for and/or compatible with implant design process 300 may be performed. In some embodiments, step 312 may be executed by comparing the first model of the extracted tooth root with one or more pre-generated and/or template implant designs and/or a design envelope for implants designed using process 300 to see if the parameters of designing an implant to replace the extracted tooth are compatible with (e.g., fit within) design parameters required for implants designed using process 300. Design envelope parameters may include, for example, tooth root length, width, circumference, shape, and/or a degree of angulation in one or more directions (e.g., mesio, distal, buccal, and/or lingual sides).

FIGS. 5B1-5B4 provide mesial/distal and buccal/lingual views of first model 501 that provide annotations for various measurements of first model that may be used throughout execution of process 300 and/or incorporated into the preliminary design check performed in step 312. For example, FIG. 5B1 provides a mesial/distal view of first model 501 with annotations representing a mesial angulation line 590 and a distal angulation line 591 superimposed thereon. Mesial and distal angulation lines 590 and 591 may each be a single line that is a best fit with an exterior edge of the mesial or distal sides, respectively, of first model 501. In some embodiments, mesial and/or distal angulation lines 590 and 591 may be a line drawn between one or more points at the crest of the tooth profile (e.g., top of the crown) through a point 1.5 to 2 mm from an apex of the tooth root but aligned with the respective mesial or distal sides of the extracted tooth. Mesial and distal angulation lines 590 and 591 may be used to establish a degree of angulation 592 between mesial and/or distal sides of first model 501 relative to one another. Exemplary degrees of angulation 592 may fall within an exemplary range of 15-45 degrees. Once the degree of angulation 592 is determined, it may be compared with a minimum degree of angulation required for a design envelope for a root-analog dental implant designed using process 300. A result of this comparison may be used to determine whether a root-analog implant for the extracted tooth may be designed using process 300 that meets minimum design requirements.

FIG. 5B2 provides a buccal/lingual view of first model 501 with annotations representing a buccal angulation line 593 and a lingual angulation line 594 superimposed thereon. Buccal and lingual angulation lines 593 and 594 may each be a single line that is a best fit with an exterior edge of the respective buccal or lingual sides of first model 501. In some embodiments, buccal and/or lingual angulation lines 593 and 594 may be a line drawn between one or more points at the crest of the tooth profile (e.g., top of the crown) through a point 1.5 to 2 mm from an apex of the tooth root but aligned with the respective mesial or distal sides of the extracted tooth.

Buccal and lingual angulation lines 593 and 594 may be used to establish a degree of angulation 595 between buccal and/or lingual sides of first model 501 relative to one another. Once degree of buccal/lingual angulation 595 is determined, it may be compared with a minimum degree of angulation required for a design envelope for a root-analog dental implant designed using process 300. A result of this comparison may be used to determine whether a root-analogue implant for the extracted tooth may be designed using process 300 that meets minimum design requirements for angulation. Exemplary angulation minimum design requirements are between 5-40 degrees.

FIG. 5B3 provides a mesial/distal view of first model 501 with a total modeled tooth length 596, a modeled root length 597, and a modeled mesial/distal width 598 superimposed thereon. FIG. 5B4 provides a buccal/lingual view of first model 501 with a modeled buccal/lingual width 599 superimposed thereon. Buccal/lingual width 598 and/or mesial/distal width 598 may also be measured at the crest of the crown and/or at a position located below (as shown in the figure). Total modeled tooth length 596 may be a measured and/or calculated value of a total length of model 501 from an apex of the modeled tooth root to an apex of the modeled tooth crown. Modeled root length 597 may be a measured and/or calculated value of a total length of a root section of model 501 from an apex of the modeled tooth root to root mark 511 and/or root line 513. Modeled mesial/distal width 598 may be a measured and/or calculated value of a total width of model 501 from the mesial side to the distal side of the modeled tooth root. Modeled buccal/lingual width 599 may be a measured and/or calculated value of a total width of model 501 from the buccal side to the lingual side of the modeled tooth root. In some embodiments, modeled mesial/ distal width 598 may be measured and/or calculated at, or near, modeled tooth root to root mark 511 and/or root line 513. Once the total modeled tooth length 596, modeled root length 597, modeled mesial/distal width 598, and/or buccal/lingual width 599 are determined, each respective value may be compared with a respective minimum modeled tooth length, minimum modeled root length, minimum modeled mesial/distal width, and/or minimum buccal/lingual width required for a design envelope for a root-analog dental implant designed using process 300. A result of this comparison may be used to determine whether a root-analogue implant for the extracted tooth may be designed using process 300 that meets minimum design requirements.

In step 315, the first model of the extracted tooth root of step 310 may be modified to remove any, or all, portions of the first model that do not pertain to the tooth root (i.e., remove portions of the first model that reside above the root pertain to the portion of the tooth above the tooth root), thereby generating a modified model of the tooth root. In some embodiments, execution of step 315 may include removing irregularities (e.g., fragments of tissue, irregularities in tooth surface, hooked portions of the tooth root, etc.) in a shape of the three-dimensional model so that, for example, the root portion of the model has a smooth, or nearly smooth, exterior surface prior to completion of the design process.

In step 320, aspects, sides, and/or portions of the second model may be identified and/or determined. In some embodiments, execution of step 320 may include identification of, for example, a buccal side, a lingual side, a mesial side, a distal side, a coronal portion, a diaphyseal portion, and/or a root tip/apical area of the modified model of the tooth root.

FIG. 5C1 provides an illustration of an exemplary second model 504 that is a modified version of first model 501 where the portion of the three-dimensional scan that corresponds to the crown portion of tooth 400 (i.e., the portion of three-dimensional scan positioned above root line 513) is removed via, for example, execution of step 315. FIG. 5C1 also shows a full coronal section 515', a diaphyseal section 520, and an apex section 525 of second model 504 as may be determined and/or identified via execution of step 320. In the embodiment of FIG. 5C1, full coronal section 515' corresponds to a portion of the extracted tooth root 415 proximate to and/or abutting root mark 415, apex section 525 corresponds to an apex of the extracted tooth root (i.e., a bottom of the tooth root as oriented in FIGS. 4A and 4B) and diaphyseal section 520 corresponds to a middle portion of the extracted tooth root and is situated between full coronal and apex sections 515' and 525 of second model 504. Exemplary dimensions for sections of second model 504 are: full coronal section 515' may be 1-4 mm in length, diaphyseal section 520 may be 3-10 mm in length, and apex section 525 may be 1.5-4 mm in length.

Optionally, in step 325, a length (i.e., a distance from the bottom to the top of the tooth root) of the second model of the tooth root of step 315 may be adjusted, thereby generating a third model. Adjustments executed in step 325 include, for example, shortening a height of the modified model of the tooth root by, for example, removing 0.15 mm to 0.7 mm from an edge of the model proximate to a root line. In some embodiments, execution of step 325 may include determining an expected change in the shape and/or size (e.g., a decrease in depth and/or an expansion of a circumference) of the alveolar socket that may be caused by, for example, bone loss and/or re-absorption due to a natural healing process when the body/alveolar socket recovers from the tooth extraction and/or seating of a root-analog dental implant as described herein. In some embodiments, the expected change may be due to bone loss at an upper edge, or rim, of the alveolar socket that may be caused by, for example, an inflammatory response of the body following the extraction of the tooth root. A size and shape of the root portion of the dental implant may be responsive (e.g., shortened) to the expected change in the size and/or shape of the alveolar socket. At times, determining an expected change in the size and/or shape of the alveolar socket according to the healing process may be responsive to, for example, patient characteristics, tooth positioning, jawbone characteristics, etc.

FIG. 5C2 provides an illustration of a third model 505 where an upper (as oriented in the figure) portion of third model 504 is removed responsively to the expected change in the height of alveolar socket 425 during the tooth extraction healing process so that a height of full coronal section 515' is reduced by, for example, 0.15-0.7 mm to generate a modified coronal section 515 (which may also be referred to as "coronal section 515" herein) as seen in FIG. 5C2. FIG. 5C2 provides an illustration of third model 505 overlaid upon second model 504 so that a difference (shown as height difference 527 in FIG. 5C2) therebetween may be visualized.

In step 330, a size, cross-sectional area, and/or volume of second (or third when step 325 is executed) model of the tooth root of step 325 may be further modified in order to, for example, reduce a width and/or cross-sectional diameter of the modified model of the tooth root of step 325 by narrowing and/or reducing the width of the modified model of the tooth root of step 325 by removing, for example, 0.3-0.7 mm from the edge of the buccal and/or lingual sides in the coronal section 515 and/or the diaphyseal section 520 and/or apex section 525 along the length of the coronal section 515 and/or diaphyseal section 520 and/or apex section 525 and thereby generate a fourth model. In some embodiments, this adjustment may be made by, for example, moving the buccal and/or lingual edges of the model of step 325 inward by, for example, 0.3-0.7 mm along a length of the model thereby reducing the overall volume, width, and cross-sectional area of the tooth root model.

Additionally, or alternatively, execution of step 330 may include extending a horizontal cross-sectional area, or circumference, of the mesial and/or distal sides (along the length thereof) of second or third model thereby creating a mesial and/or distal extension. In these embodiments, mesial and/or distal extension(s) may be configured to abut and/or push into adjacent mesial and/or distal bony walls of an alveolar socket in order to, for example, increase a magnitude of friction and/or compression applied to the mesial and/or distal walls of the alveolar socket when a corresponding implant (e.g., implants 800 or 1500, as discussed below with regard to FIGS. 8D-8J, 15A and 15B, respectively) is resident within in the alveolar socket. A exterior shape, or outline, of a mesial and/or distal extension(s) may have a curved and/or parabolic cross section so that an apex of the extension is positioned at, or near, a longitudinal center of the fourth model in the mesial and/or distal sides. In some instances, a shape and/or size of the mesial and/or distal extensions may be a mirror image of one another and, in other instances, the size and/or shape (e.g., location of an apex, degree of curvature, etc.) may vary between mesial and distal projections 564 and 566. Exemplary dimensions for a width of mesial and/or distal projections are 0.1-0.75 mm along the mesial and/or distal length of the model. In some cases, a width of mesial and/or distal projections may vary along the length so that a width of mesial and/or distal projections is 0.05-0.2 mm in the cortical section, 0.02-0.3 in the diaphyseal section, and 0.01-0.35 mm in the apical sections of the root portion of the model.

FIG. 5D1 provides a mesio/distal side view of an exemplary fourth model 506 (shown in solid lines) with a mesial side 526 and a distal side 528, with third model 505 superimposed thereon so that differences between third model 505 and fourth model 506 may be visualized. Fourth model 506 may be generated via execution of step 330, wherein a width of fourth model 506 is modified along a length of a mesial and/or distal root portion of an implant so that mesial side 526 and/or distal side 528 of third model 505 pushed outward for fourth model 506 thereby forming a mesial projection 564 and a distal projection 566, which provide fourth model 506 with an increased cross-sectional circumference compared with a corresponding cross-sectional circumference of third model 505, an example of which is shown in the cross-section of FIG. 5D3, which shows an irregular shape of a cross section of third model 505. A shape (e.g., width, volume, or cross-sectional area) of mesial projection 564 and/or distal projection 566 may vary along the length of the respective mesial 526 and distal side 528. An exemplary mesial width 565 of mesial projection 564 and/or an exemplary distal width 567 of distal projection 566 may vary from, for example, 0.1 mm-3 mm along the length of the root section of the implant.

FIG. 5D2 provides a buccal/lingual side view of fourth model 506 (shown in solid lines) with a buccal side 572 and a lingual side 574 superimposed upon third model 505 (shown in broken lines) so that differences between them may be visualized. As explained above, fourth model 506 may be generated via execution of step 330, so that a width of fourth model 506 is modified along its length so that a buccal side and a lingual side of fourth model 506 are recessed, or pushed inward, when compared with a corresponding buccal and lingual side of third model 505, thereby creating a recessed buccal side 526 and a recessed lingual side 529 for fourth model 506. A shape (e.g., width, volume, or cross-sectional area) of recessed buccal side 526 and recessed lingual side 529 may vary along the length of the respective lingual side 574 and buccal side 572 and a shape of a buccal side recessed space 582 (i.e., the difference between the buccal side of third model 505 and the recessed buccal side 526 of fourth model 506) and/or a shape of a lingual side recessed space 531 (i.e., the difference between the lingual side of third model 505 and the recessed lingual side 529 of fourth model 506) may vary from, for example, 0.1 mm-1.0 mm along the length of the root section of the implant.

FIG. 5D3 provides a cross-section image of the superposition of third (shown as a dashed line) and fourth (shown as a solid line) models 505 and 506 shown in FIGS. 5D1 and 5D2 along cross-section line A-A with a horizontal axis 575 and a vertical axis 573 superimposed therein, wherein horizontal axis 575 corresponds to a mesial/distal axis and vertical axis 573 corresponds to a buccal/lingual axis. Horizontal axis 575 and vertical axis 573 intersect at a center point. The cross-section of FIG. 5D3 shows a reduction in volume along buccal side 572 and lingual side 574 of fourth model 506 when compared with third model 505 with dimensions of buccal side recessed space 582 representing a change in the shape of the buccal side between third model 505 and fourth model 506 and dimensions of lingual side recessed space 531 representing a change in the shape of the lingual side between third model 505 and fourth model 506. In addition, the cross-section of FIG. 5D3 shows an increase in volume along mesial side 526 and distal side 528 of fourth model 506 when compared with third model 505 as mesial projection 564 and distal projection 566, respectively. A shape of mesial projection 564 and distal projection 566 varies along the horizontal cross section with a maximum width of mesial projection 564 and distal projection 566 occurring approximately along a horizontal axis 575 of third model 505 and fourth model 506.

Dental implants designed with a reduction in overall volume of a diaphyseal and/or apical section(s) may be useful in reducing pressure on the alveolar socket generally, and in particular, at a region of the alveolar socket corresponding to the reduced-volume side (e.g., the facial/buccal side). For example, a degree of bone density and/or bone thickness of the jawbone may be less on the mesial and/or distal side, and prolonged application of force (as created by the presence of the dental implant) may exacerbate bone resorption through stress shielding as the dental implant pushes against the bone in the alveolar socket. Reducing the volume of the dental implant on the mesial and/or distal side may help prevent or alleviate this effect thereby reducing risks associated with poor osseointegration and/or bone loss at proximate to the alveolar socket.

In some embodiments, a degree of recessing of the buccal side and/or lingual side of fourth model 506 and/or a degree of expanding the mesial and distal sides (e.g., a size and/or shape of mesial projection 564 and/or distal projection 566) of fourth model 506 may be responsive to, for example, a size of the extracted tooth root, a position of the extracted tooth root, characteristics of the alveolar socket from which the tooth was extracted, patient characteristics, patient preferences, and/or clinician preferences and/or requirements (all of which may be received in step 305). For example, if a patient has a relatively thin buccal wall (information that may be received in, for example, step 305), then fourth model 506 may be generated and/or step 330 may be executed by recessing the buccal and/or lingual sides of the third model to generate the fourth model to a greater extent than these side(s) otherwise would have been recessed (e.g., an amount of recessing applied to a tooth root model for a patient with greater buccal wall thickness) so that less stress is placed on the relatively thin buccal and/or lingual sides of the patient's alveolar socket. Increasing the recessing on the buccal and/or lingual sides of the third model to generate the fourth model in this manner may yield an implant that exerts less stress on the buccal and/or lingual sides of the alveolar socket, which may assist with minimizing bone loss due to stresses on the bone caused by the implant when resident within the alveolar socket, which may be helpful to patients with thin buccal plates. Continuing with this example, execution of step 330 may also include increasing a size and/or cross-sectional area of the mesial and/or distal extensions of fourth model 506 in order to, for example, increase the friction between and/or compression against the mesial and/or distal sides of the alveolar socket, which may assist with retention of the root portion of the implant within the alveolar socket especially when there is reduced contact with and/or pressure on the buccal and/or lingual sides of the patient's alveolar socket.

In step 335, an exterior volume of the diaphyseal and apical sections of modified tooth root model of step 330 may be reduced in order to provide, for example, space for the application of an exterior porous outer layer, thereby generating a fifth model. Execution of step 335 may be accomplished by, for example, moving an exterior edge of the diaphyseal and/or apical sections of the tooth root model of step 330 inward by, for example, 0.1 mm to 1.0 mm so that a volume of the remaining diaphyseal and apical sections of the root-analog dental implant model may be reduced by, for example, 3-5%. FIGS. 5E1 and 5E2 provide an example of how step 335 may be executed. FIG. 5E1 provides a buccal/lingual side view of a fifth model 507 that includes coronal section 515 and a combined diaphyseal and apex section 524. In FIG. 5E1, a size and/or volume of combined diaphyseal and apex section 524 may be modified and/or reduced as, for example, a result of execution of step 335, to create a diaphyseal/apical core 542 as shown in FIG. 5E1. FIG. 5E1 also shows fifth model 507 superimposed on fourth model 506 to show a porous surface space 544 configured for acceptance of a porous surface. An inner boundary of porous surface space 544 is defined by diaphyseal/apical core 542 and an outer boundary of porous surface space 544 is defined by an outer boundary 536 of fourth model 506. Porous surface space 544 may represent the reduction of the exterior volume of the diaphyseal and apical sections performed via execution of step 335. FIG. 5E2 provides a cross section of the superimposition of fourth and fifth models 506 and 507 shown in FIG. 5E1 taken at line B-B, wherein diaphyseal/apical core 542 is surrounded by porous surface space 544 as shown in the figure. FIG. 5E2 also shows a cross-sectional shape of diaphyseal/apical core 542, which in the embodiment of FIG. 5E2 is irregular. The irregular shape of core 542 may be similar to, but smaller than, a shape of a cross-section of first model 501 taken at a position corresponding to line B-B.

In step 340, a tooth root core base structure (also referred to herein as a "core base") may be designed and/or selected from a plurality of tooth root core base structures for use in designing a core structure for the tooth about which information was received in step 305. Tooth root core base structures may be configured to be compliant with minimum mechanical and/or structural (e.g., rigidity, durability, load requirements, etc.) strength standards for dental implants that may be used to replace an extracted tooth. In some embodiments, a plurality of core base structures may be designed in advance of execution of process 300 in order to, for example, facilitate more rapid execution of step 340 and/or the implant design process overall. Each of the core base structures of the plurality may be designed and/or configured for different applications and or use in different situations based upon, for example, tooth type, tooth size, root size, root shape, tooth position, patient characteristics, and/or clinician preferences.

In many cases, a core base structure may have a coronal section and a combined diaphyseal/apical section. A circumference of the coronal section may have a solid and approximately flat, or smooth, exterior surface. An exterior surface of a diaphyseal section of a core base structure may have one or more struts or other mechanical strength and/or support mechanisms (e.g., spiraling extensions, concentric circular, curved extensions, extensions, etc.) extending from an exterior surface thereof along a portion of a length of the diaphyseal section. Once the core base structure is designed and/or selected, it may be merged with and/or overlaid upon the fifth model thereby generating a sixth model of the root portion of the dental implant.

Figure 6A:
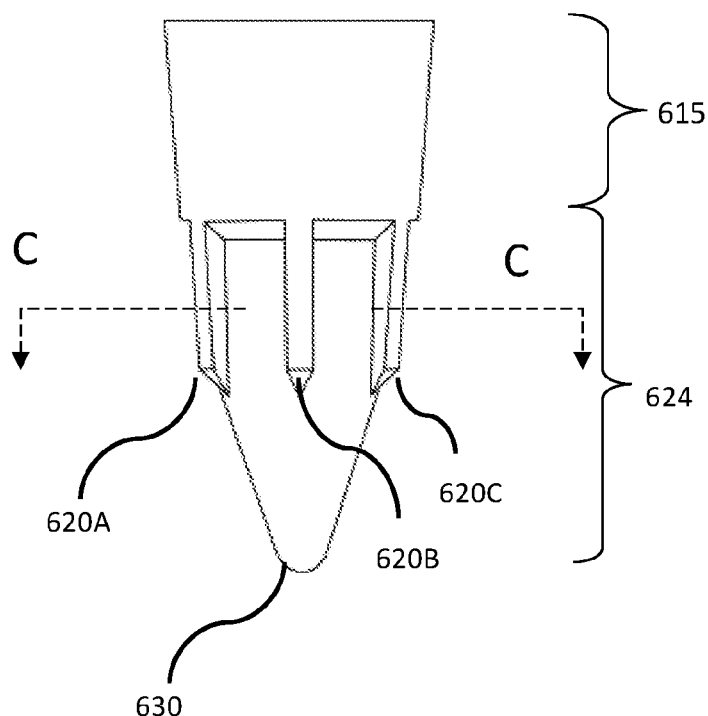
FIG. 6A provides a side view of an exemplary core base structure, consistent with some embodiments of the present invention.
Figure 6B:
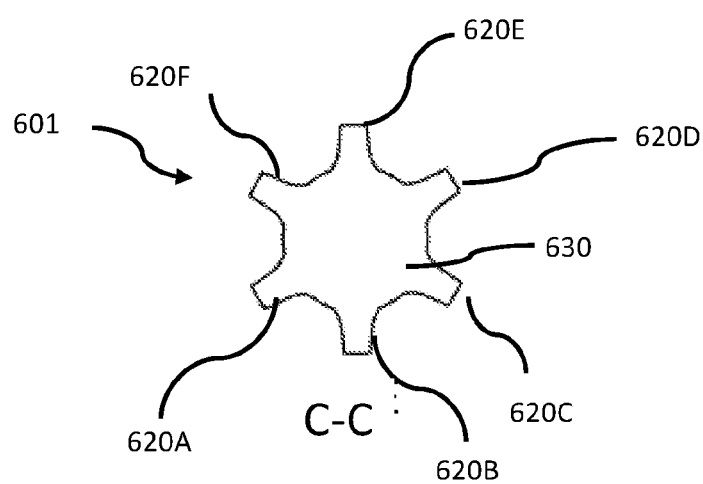
FIG. 6B provides a cross-section view of the core base structure of FIG. 6A, consistent with some embodiments of the present invention.

FIG. 6A provides a side view of an exemplary core base structure model 601 and FIG. 6B provides a cross-section view of core base structure model 601 taken at line C-C. Core base structure model 601 includes a coronal section 615 with a solid/smooth exterior surface and six optional struts 620A, 620B, 620C, 620D, 620E, and 620F (620D, 620E, and 620F only being shown in the cross-section view of FIG. 6B) that extend from an exterior surface of a core center 630. Struts 620A, 620B, 620C, 620D, 620E, and 620F extend along a length of a portion of diaphyseal section of core base structure from a lower (as oriented in FIG. 6A) edge of coronal section 615 and come to a point approximately midway down combined diaphyseal/apical section 624. Although the cross-sectional shape of core base structure model 601 is regular, circular with extensions (struts) extending therefrom in a symetrical fashion this need not always be the case. In some embodiments, core base structure model 601 may have a non-circular (e.g., oval or irregular) cross-sectional shape that, at times, may be configured to map to a cross-sectional shape of an extracted tooth root.

Figure 6C:
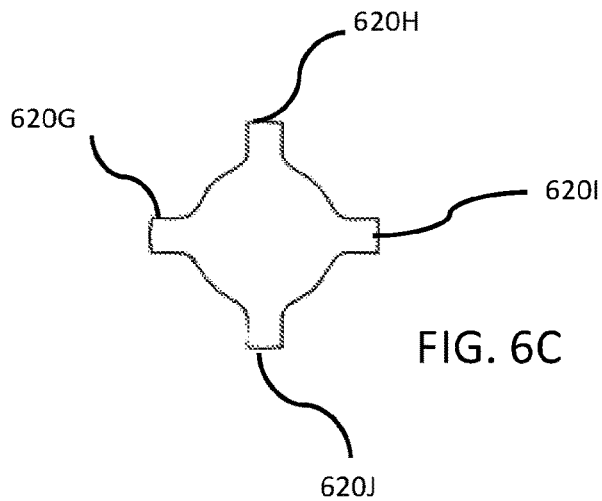
FIG. 6C provides a cross-section view another exemplary core base structure that includes four struts, consistent with some embodiments of the present invention.
Figure 6D:
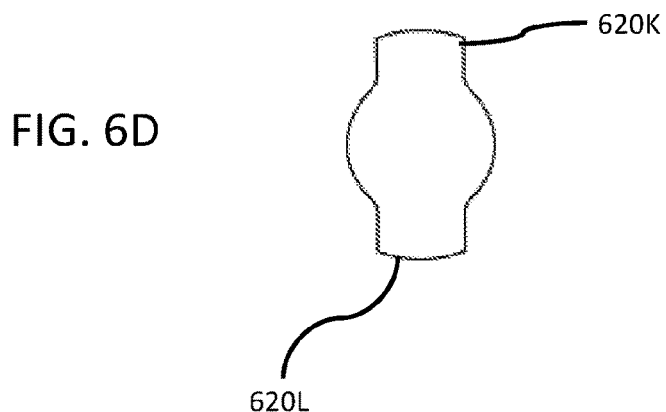
FIG. 6D provides a cross-section view of another exemplary core base structure that includes two struts, consistent with some embodiments of the present invention.
Figure 6E:
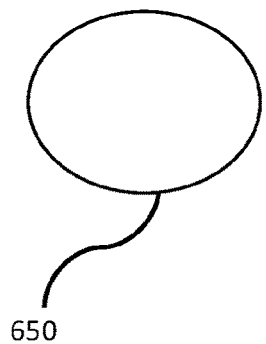
FIG. 6E provides a cross-section view of another exemplary core base structure with no struts, consistent with some embodiments of the present invention.

FIG. 6C provides a cross section of another exemplary core base structure model 602 that includes four struts 620G, 620H, 620I, and 620J arranged approximately equidistantly around the circumference of core base structure model 602. FIG. 6D provides a cross section of another exemplary core base structure model 602 that includes two struts 620K and 620L arranged approximately equidistantly around the circumference of core base structure 603. FIG. 6E provides a cross section of yet another exemplary core base structure model 604 with an oval-like shape and no struts.

Once a core base structure model has been selected and/or designed, it may be compared with the fifth model of step 335 to, for example, determine whether the fifth model fits within one or more mechanical, structural, and/or size requirements established by the core base (step 342). In some embodiments, execution of step 342 may include determining whether the core base structure fits within an external surface of a model of the extracted tooth and/or root-analog dental implant such as model(s) 501, 504, 505, 506, and/or 507. If the fifth model does not fit within the requirements, another core base structure may be selected for comparison with the fifth model (i.e., step 340 may be repeated) and/or process 300 may end as the implant may not be able to be manufactured in a manner that complies with the mechanical and/or structural requirements for the implant. When the fifth model is mechanically and/or structurally compliant, process 300 may continue to step 345 (shown in FIG. 3B).

Figure 7A:
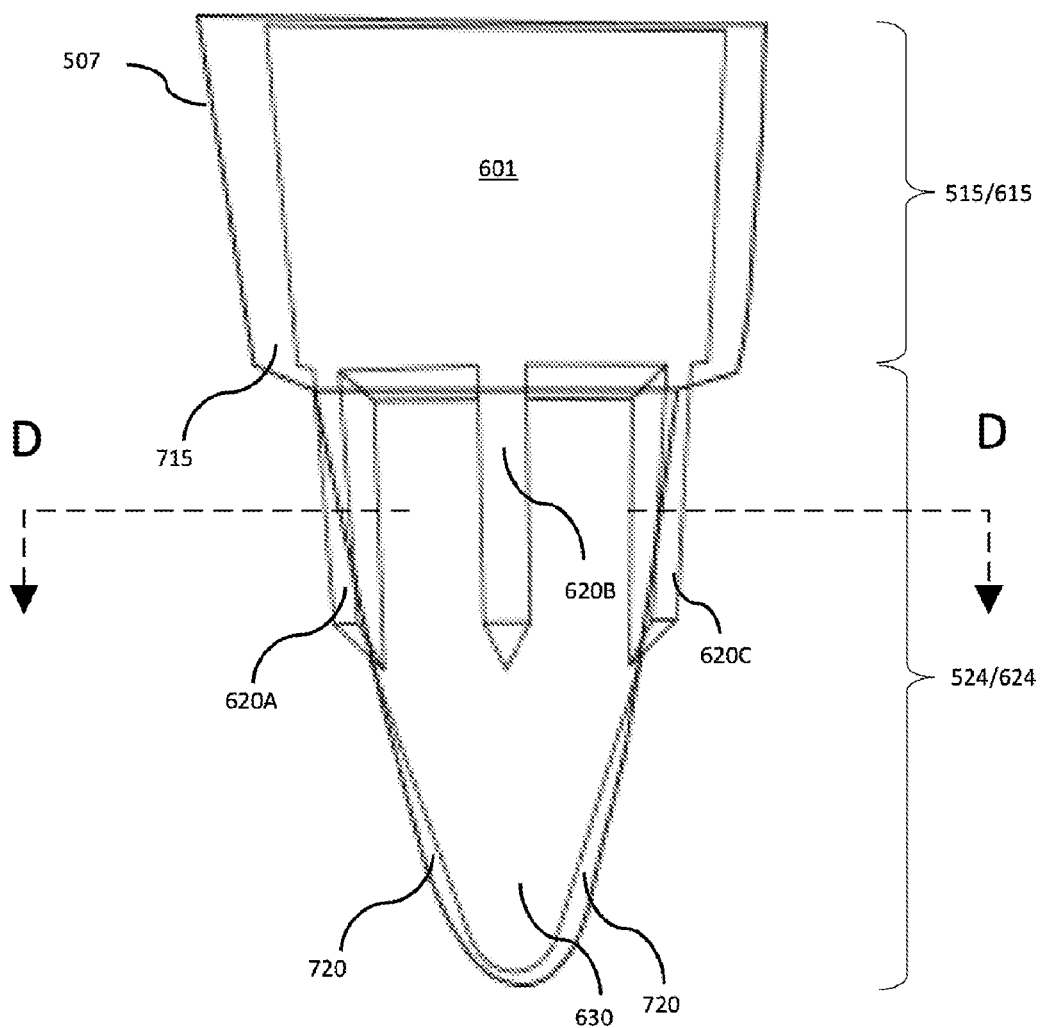
FIG. 7A provides a side view of an exemplary root-analog dental implant model overlaid upon a core base structure, consistent with some embodiments of the present invention.

A visual example of how step 342 may be executed is provided via FIGS. 7A (side view) and 7B (cross-section view along line D-D), which show an example of fifth model 507 overlaid upon a core base structure such as core base structure model 601 selected and/or designed in step 340. As shown in FIG. 7A, coronal section 615 of core base structure model 601 fits within coronal section 515 of fifth model 507, which indicates that coronal section 515 of fifth model 507 fits within the mechanical and/or structural requirements established by coronal section 615 of core base structure model 601. Core center 630 of combined diaphyseal and apical section 624 of core base structure model 601 also fits within combined diaphyseal and apical section 524 of fifth model 507, which indicates that combined diaphyseal and apical section 524 of fifth model 507 is compliant with the mechanical and/or structural requirements of combined diaphyseal and apical section 624. Were core center 630 to extend beyond the border of combined diaphyseal and apical section 524 and/or when a volume of core base 601 does not fit entirely within the outer surface of fifth model 507, that may indicate that an implant designed using process 300 may not have a core structure large/robust enough to meet mechanical and/or structural requirements.

Figure 7B:
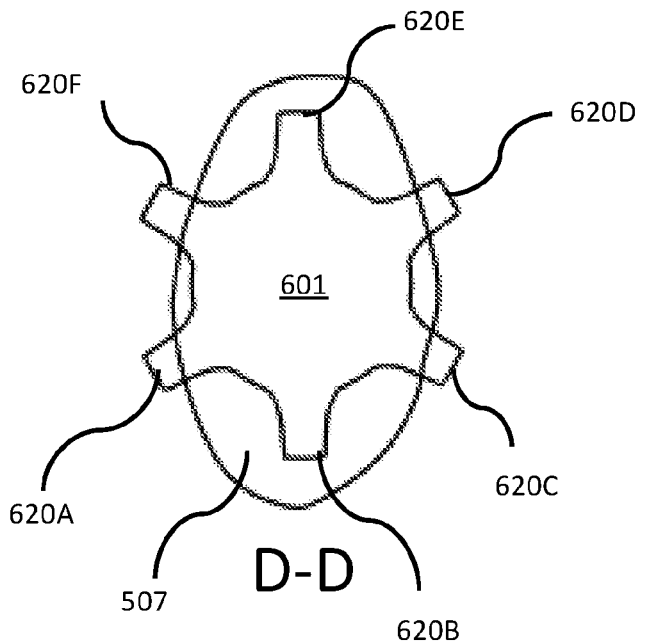
FIG. 7B provides a cross-section view of the root-analog dental implant model overlaid upon a core base structure of FIG. 7A, consistent with some embodiments of the present invention.

In addition, an exterior surface of struts 620A, 620B, and 620C fits within an outline for an exterior surface of an implant designed using process 300. As shown in FIGS. 7A and 7B, a portion of struts 620A, 620C, 620D, and 620F extend beyond an outline, or border, of a corresponding portion of fifth model 507 and may protrude into a porous surface added onto an exterior of combined diaphyseal and apical section 524 as discussed below with regard to FIGS. 7C and 7D.

Figure 7C:
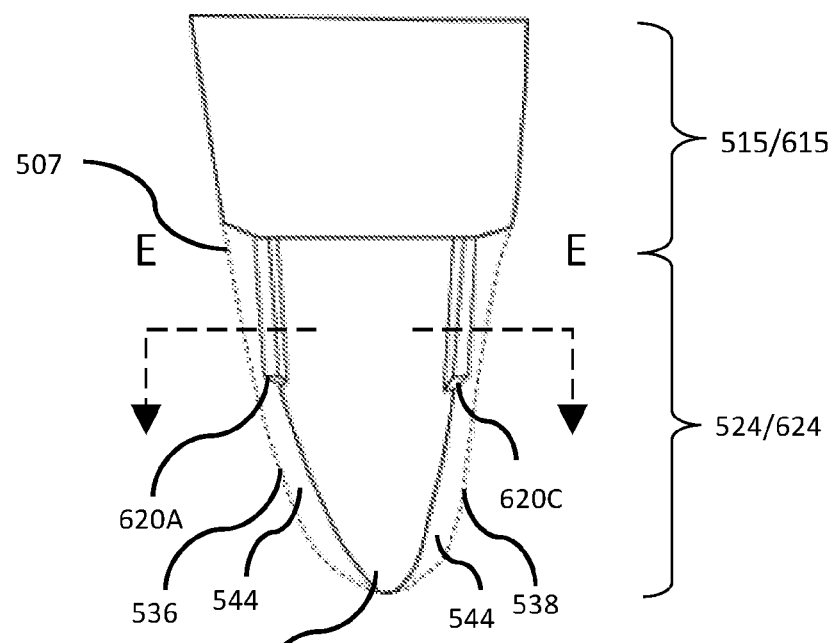
FIG. 7C provides a side view of a modeled merged core superimposed upon an outline of root-analog dental implant model, consistent with some embodiments of the present invention.
Figure 7D:
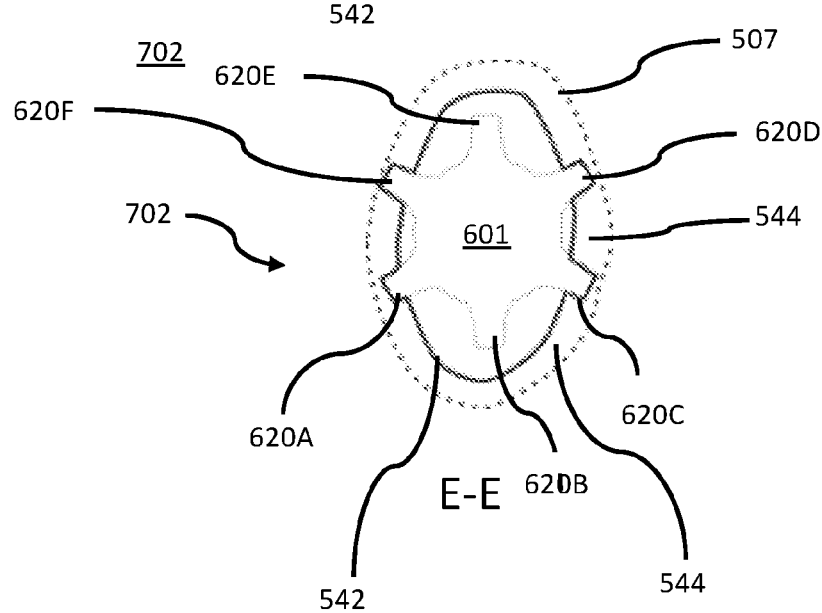
FIG. 7D provides a cross-section view of the modeled merged core superimposed upon an outline of root-analog dental implant model of FIG. 7C, consistent with some embodiments of the present invention.

FIG. 7C provides a side view and FIG. 7D provides a cross-section view (along line E-E) of a merged core, or sixth model, 702 superimposed upon an outline of fifth model 507 (shown in dashed lines). FIGS. 7C and 7D show the protrusion of struts 620A, 620C, 620D, and 620F from diaphyseal/apical core 542 and how these struts do not extend beyond the outline of fifth model 507. Struts 620B and 620E do not extend beyond the outline of fifth model 507 and, therefore, are covered by diaphyseal/apical core 542.

Figure 7E:
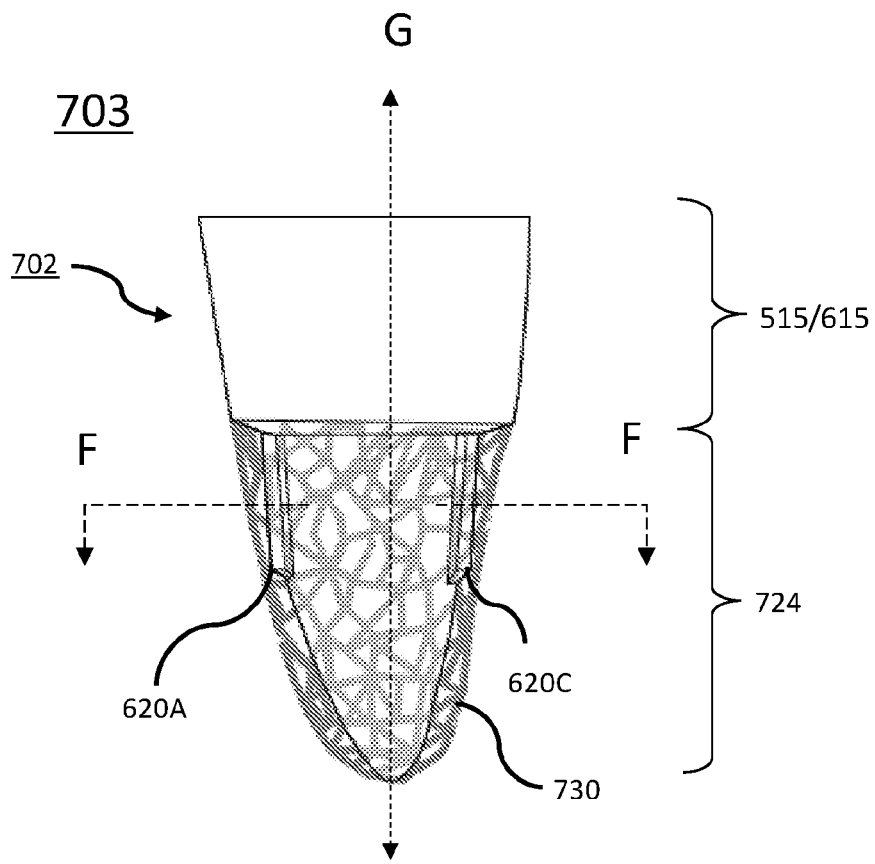
FIG. 7E provides a side view of an exemplary root-analog dental implant model with a porous surface, consistent with some embodiments of the present invention.
Figure 7F:
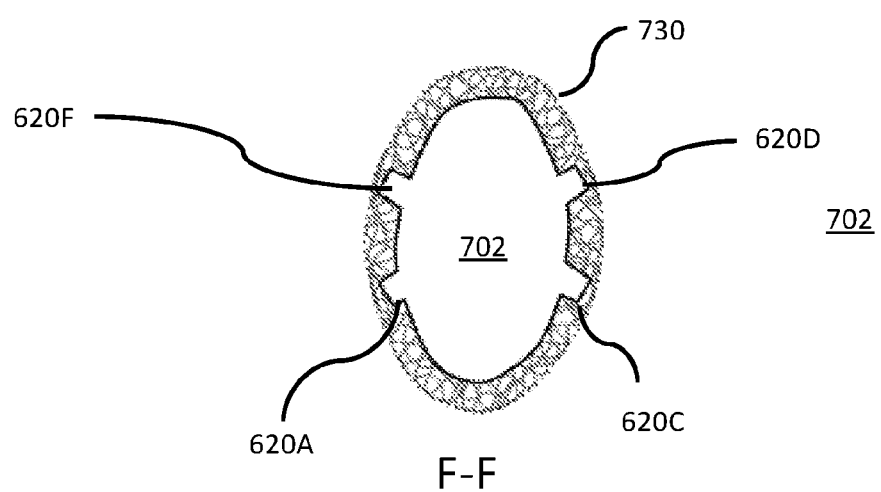
FIG. 7F provides a horizontal cross-section view of the exemplary root-analog dental implant model of FIG. 7E, consistent with some embodiments of the present invention.

In step 345, a porous surface may be added to an exterior surface of a portion of the sixth model such as diaphyseal section 520 and/or apex section 525, thereby generating a seventh model, an example of which is shown in FIGS. 7E and 7F. In most embodiments, an exterior edge of the porous surface added in step 345 does not extend beyond an outline of the diaphyseal section 520 and/or apex section 525 of the fifth model. The porous surface may be from 0-2.0 mm deep and may include one or more holes or spaces therein in which bone may grow when an implant manufactured using the model developed via execution of process 300 is implanted into an alveolar socket. Exemplary specifications for the porous covering and/or lattice network are as follows: porosity within a range of 40-85%, surface thickness within a range of 0-2 mm, or 0.5-0.65 mm nominal and an average pore size within a range of 200-600 micrometers.

In some embodiments, the porous surface may be a series of overlapping and/or interconnected structures or strands and/or a matrix or mesh of material. A porous surface structure may be achieved by using, for example, additive manufacturing such as 3-D printing using Laser, selective laser sintering, E-Beam or other focused energy to fuse powdered bio-compatible materials (e.g., titanium and/or ceramic) into a specific solid form as an example) to manufacture the dental implant wherein the porous structure/lattice is overlaid upon a base for the portion of diaphyseal and/or apex sections 520 and 525 of the model covered by the porous structure/lattice. In some embodiments, the porous surface may be configured to be manufactured layer-by-layer at the same time as the core, or internal components, of a root-analog dental implant. In some cases, the porous surface may be added in a uniform (e.g., a thickness of the porous covering and/or lattice network may be uniform throughout) or non-uniform (e.g., a thickness of the porous surface may not be uniform throughout) manner In some cases, one or more features of a porous surface (e.g., density, diameter of threads that make up the lattice, thickness, degree of interconnectedness, overlapping patterns, pattern, width, length, etc.) may be configured responsively to, for example, strength and/or application requirements for dental implants. In some embodiments, one or more porous surface characteristics may be configured to match and/or be compatible with bone characteristics of the alveolar socket and/or extracted tooth characteristics. Exemplary bone and/or tooth characteristics include, but are not limited to, density, tissue type, and whether disease is present. In some embodiments, a porous surface or a portion thereof may include one or more protrusions that extend from an exterior edge of the lattice. The protrusions may be configured to engage with the bone of the alveolar socket and improve retention within the alveolar socket. Exemplary shapes for the protrusions include spikes and knobs.

In some embodiments, a porous surface may include small, or nano, surface features (e.g., texturing, dimples, or cross hatching) that may be configured to provide a surface texture on the outer surface of the lattice strut or other porous surface elements which would be favorable to osseointegration. At times, these features may be throughout the lattice, and, at other times, the micro or nano surface texture may be present only on, or toward, an exterior surface of a root section of an implant.

In some embodiments, execution of step 345 may include analysis of alveolar socket (e.g., alveolar socket 425) and/or images of alveolar socket in order to determine, for example, the dimensions (e.g., diameter, radius, circumference, position of irregular shapes within the opening, etc.) of the opening or top of the alveolar socket so that dimensions and/or configurations may be selected for addition to the surface of, for example, fifth model 507 in a manner that accommodates the size and shape of the opening at the top of the alveolar socket so that, for example, an dental implant with a porous covering and/or lattice network will be able to pass through the opening of the alveolar socket without damaging the bone at the rim of the alveolar socket.

FIG. 7E provides a side view of an exemplary seventh model 703, that may be generated via execution of step 345, with a porous surface 730 added to an exterior surface of combined diaphyseal/apical section 524/624 of sixth model 702 to generate a diaphyseal/apical section 724 covered with the porous surface. In some cases, porous surface 730 may occupy space between diaphyseal/apical surface of sixth model 702 and a corresponding diaphyseal/apical surface of fifth model 507. An external surface and/or exterior geometry of porous surface 730 may be designed to fit within the alveolar socket from which the tooth was extracted so that, for example, an intimate fit between an implant manufactured using seventh model 703 and the alveolar socket may be achieved; often times without modification of the alveolar socket by a dentist or other clinician when and/or prior to seating the implant in the patient's mouth. At times, the external geometry of the porous surface 730 may be designed to further extend mesial and/or distal extensions 564 and 566 so that, when a root-analog dental implant based on seventh model 703 is manufactured, the mesial and/or distal sides of the porous surface of the root-analog dental implant may extend and/or push into the corresponding portions of the alveolar socket. Additionally, or alternatively, the external geometry of the porous surface 730 may be designed so that the recessing of recessed buccal side 526 and/or recessed lingual side 529 is maintained so that the buccal and/or lingual sides of porous surface 730 are also recessed in a manner similar to recessed buccal side 526 and/or recessed lingual side 529. In this way, the buccal and/or lingual sides of the porous surface of the root-analog dental implant may not extend and/or push into the corresponding portions of the alveolar socket.

FIG. 7F provides a horizontal cross-section view along line G-G of root-analog seventh model 703 and shows how porous surface 730 occupies porous surface space 544.

Figure 7G:
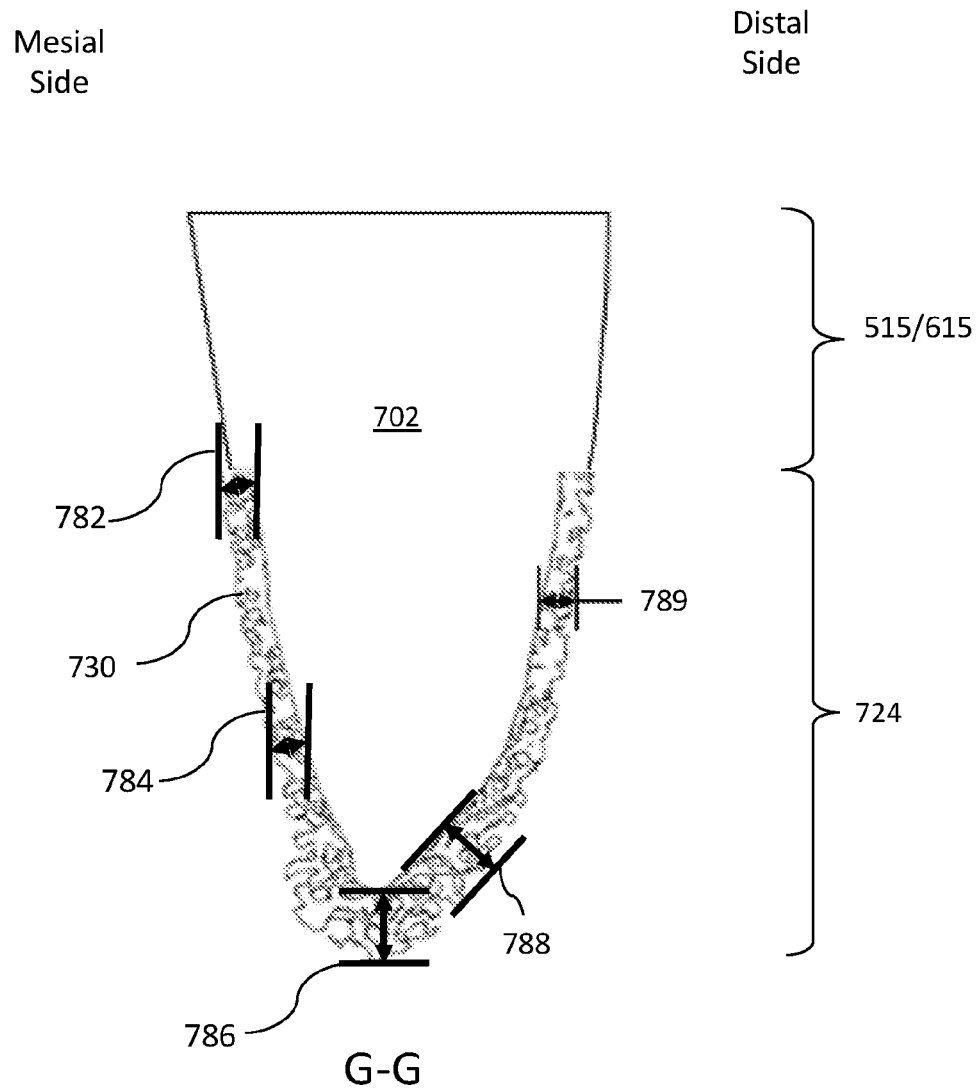
FIG. 7G provides a vertical cross-section view of the exemplary root-analog dental implant model of FIG. 7E, consistent with some embodiments of the present invention.

FIG. 7G provides a vertical cross-section view along line G-G of seventh model 703 and shows how porous surface 730 occupies porous surface space 544. FIG. 7G also shows a first exemplary thickness 782 of porous surface 730 on a mesial side of seventh model 703 positioned proximate to the coronal section of the model 515/615, a second exemplary thickness 784 of porous surface 730 on a mesial side of seventh model 703 positioned on a mesial side of diaphyseal/apical section approximately two thirds between coronal section 515/615 and an apex of seventh model 703, a third exemplary thickness 786 of porous surface 730 positioned at the apex of seventh model 703, a fourth exemplary thickness 788 of porous surface 730 on a distal side of seventh model 703 proximate to the apex of seventh model 703, and a fifth exemplary thickness 789 of porous surface 730 positioned on an distal side of diaphyseal/apical section approximately one third between coronal section 515/615 and an apex of seventh model 703.

Figure 7H:
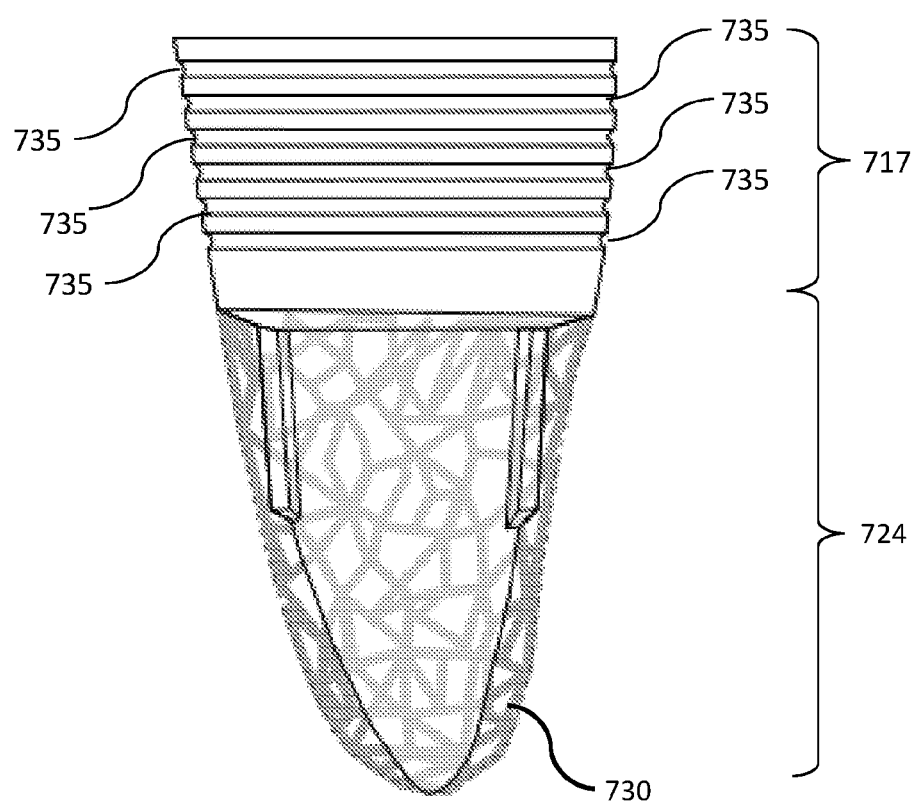
FIG. 7H provides side view of an exemplary root-analog dental implant model with a plurality of circumferential grooves added to a coronal section, consistent with some embodiments of the present invention.

In step 350, one or more circumferential grooves may be added to coronal section 515 of the seventh model of step 345, thereby generating an eighth model, an example of which is provided by FIG. 7H and discussed below. The circumferential grooves may be configured to engage with cortical bone present in the alveolar socket in order to, for example, facilitate retention of a dental implant manufactured using the model generated via execution of step 350 within the alveolar socket, osseointegration of the implant within the alveolar socket, and/or prevention of entry of foreign material (e.g., fluid and/or bacteria) into the alveolar socket following insertion of the implant. FIG. 7H provides side view of an exemplary root-analog dental implant model 704 with a plurality of circumferential grooves 735 added to coronal section 515 of seventh model 703 thereby generating a grooved coronal section 717 for eighth model 704.

In step 355, a transgingival portion may be added, proximate the root line, to the eighth model, thereby generating a ninth model. The transgingival portion may be configured to reside above (for teeth in the lower jaw) or below (for teeth in the upper jaw) the rim of the alveolar socket when the manufactured dental implant is inserted into the alveolar socket but, below/above the gum line. A height of the transgingival portion may be configured so that it does not extend above a gingival height of the patient's mouth proximate to the alveolar socket. In some embodiments, the transgingival portion may be configured so that it enables a "platform switching" effect. Alternatively, the transgingival portion may be designed by extending the top of the three-dimensional image and/or scan of an extracted tooth root by, for example, 1-3 mm in a cylinder-like manner and then constricting a portion of the cylinder in between the top and bottom of the cylinder (e.g., to create a sideways "v"-like shape).

In some cases, a surface profile design of the transgingival portion of the implant may be modeled using from inputs received in, for example, step 305 of process 300. These inputs may include the surface profile of the tooth in this region, the gingival margin (a circumferential line depicting the top of the gums relative to the tooth), physician preferences such as presence or degree of platform switch, margin height reduction, etc. Physician preferences for transgingival design may include written preferences or selection of preferences from a list of available options.

Figure 7I:
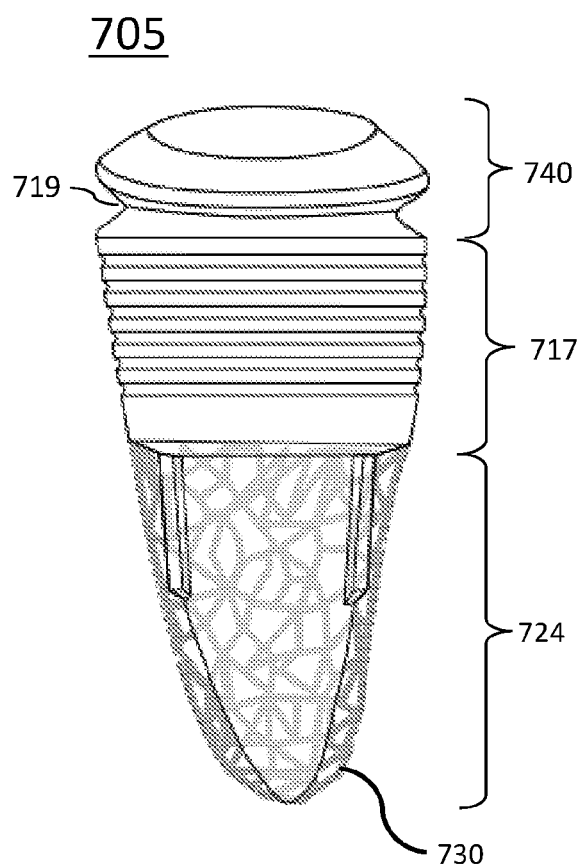
FIG. 7I provides a side view of an exemplary root-analog dental implant model that includes a transgingival portion positioned above a grooved coronal section, consistent with some embodiments of the present invention.

FIG. 7I provides a side view of an exemplary ninth model 705 that includes a transgingival portion 740 positioned above (as oriented in FIG. 7I) grooved coronal section 717. Transgingival portion 740 extends from the grooved coronal section of the root to a specified height which may be coincident with the gingival margin or slightly reduced depending on the preference of the implanting physician and other patient characteristics such as gum tissue thickness, patient health, age and tooth position. Transgingival portion 740 also has an exemplary circumferential "V"-shaped indent, or notch, 719 configured to enable the platform switching effect.

Figure 7J:
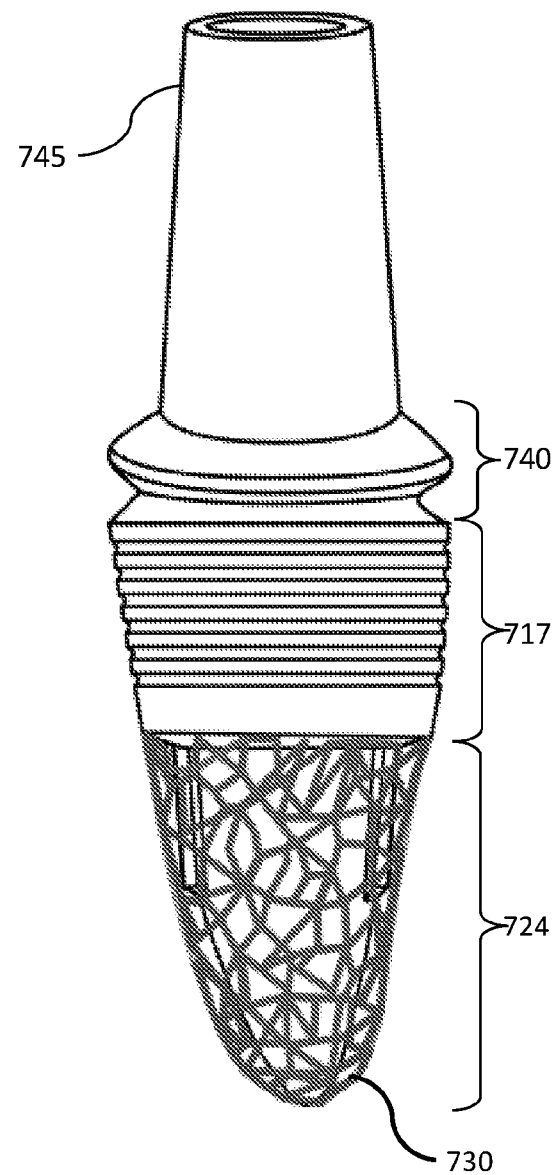
FIG. 7J provides a side view of an exemplary model of a complete dental root-analog dental implant model including an abutment, consistent with some embodiments of the present invention.

In step 360, an abutment configured for cooperation with a crown may be added to the top (for teeth in the lower jaw) or bottom (for teeth in the upper jaw) of the transgingival portion of the ninth model, thereby generating a tenth model. In some embodiments, a size and/or shape of the abutment may be configured for cooperation with a crown so that the crown can be securely attached to the abutment and the crown fits and/or cooperates properly with the other teeth in the patient's mouth. At times this may be achieved via use of a pre-operative intraoral scan and/or CT scan of the patient's tooth to be extracted and surrounding teeth so that features (e.g., height, width, ridge depth, angulation, etc.) may be incorporated into the design and/or selection of the abutment. In some cases, the abutment may be a predesigned chamfer shape of an appropriate size (e.g., cross-sectional area, height, etc.). In some cases, a height for the abutment may be selected using information (e.g., height of teeth adjacent to the extracted tooth, chewing habits of the patient who had his or her tooth extracted, strength or thickness of bone making up the alveolar socket, and/or whether the patient has gum disease) provided by a dental professional (e.g., the dental professional who extracted the tooth). Additionally, or alternatively, the height of the abutment may be selected using a model, impression, and/or scan of the patient's full mouth prior to the extraction. FIG. 7J provides a side view of an exemplary tenth model 706, which corresponds to a complete dental root-analog dental implant model 706 including an abutment 745.

In some embodiments, the transgingival portion and/or abutment of steps 350 and 355 may be designed to be at an angle relative to, for example, a root line like root line 513 so that, for example, an angle of orientation of a crown fitted on an abutment may be oriented in a direction that matches an orientation of the extracted tooth root and/or cooperates well with other teeth in the patient's mouth.

Optionally, in step 365, the tenth model of step 360 may be finalized thereby generating a final model of the dental implant. Execution of step 365 may include performance of one or more additional finalization steps for generating complete model of the dental implant (e.g., converting the modified model into an appropriate format for fabrication). In some embodiments, step 365 may be optional, and the method may skip from step 360 to step 370 such that the model of step 360 is the final dental root-analog dental implant model.

In step 370, a design check of the tenth and/or final dental root-analog dental implant model of step 370 may be performed to determine whether the dental root-analog dental implant model is appropriately designed and meets with for example, all dental implant, patient, and/or clinician requirements. Execution of the design check may include, for example, comparison of the final model of the dental implant to the original three-dimensional image and/or scan of the extracted tooth root, comparison of the final model of the dental implant to design parameters for dental implants, and/or comparison of the final model dental implant to an image, a three-dimensional scan, and/or impression of the alveolar socket from which the tooth root was extracted. In some embodiments, the design check may involve performance of steps to determine whether the dental implant will function appropriately, have, for example, adequate surface area for osteointegration and/or adequate strength (e.g., for durability and functionality). For example, the design check 370 may include comparing parameters of the final model against, for example, predetermined root-analog dental implant design specifications For example, the design check 370 may include comparing a surface area of a tooth root portion of the final model and/or the strength of the dental implant at different points (e.g., which may be mathematically modeled) against specified regulatory standards such as those set forth by, for example, a governmental agency (e.g., the United States Food and Drug Administration (FDA) and/or European Medicines Agency) and/or a medical and/or dental review organization or association (e.g., the United States American Dental Association (ADA) and/or the European Association of Dental Public Health (EADPH).

If the tenth and/or final model does not pass the design check (step 375), an error analysis of the final dental root-analog dental implant model may be run so that adjustments may be made to the tenth and/or final dental root-analog dental implant model (step 380) and step 370 may be executed again. If the tenth and/or final dental root-analog dental implant model passes the design check (step 375), the final dental root-analog dental implant model may be formatted for manufacturing (step 385). In some embodiments, execution of step 385 may also include generation of one or more instructions for the manufacture of the dental implant based on the final model. In some cases, execution of step 385 includes translating the final model into CAM software for communication to a manufacturing device (e.g., a three-dimensional printer. In some embodiments, execution of step 385 may include receiving, or adapting, the instructions to generate the dental implant based on a material (e.g., titanium or other biocompatible material) and/or an additive manufacturing process used to manufacture the dental implant. In step 390, the formatted tenth and/or final model and/or instructions for manufacturing a root-analog dental implant based upon the tenth and/or final root-analog dental implant model may be communicated to an implant fabrication tool such as a 3D printer.

Figure 8A:
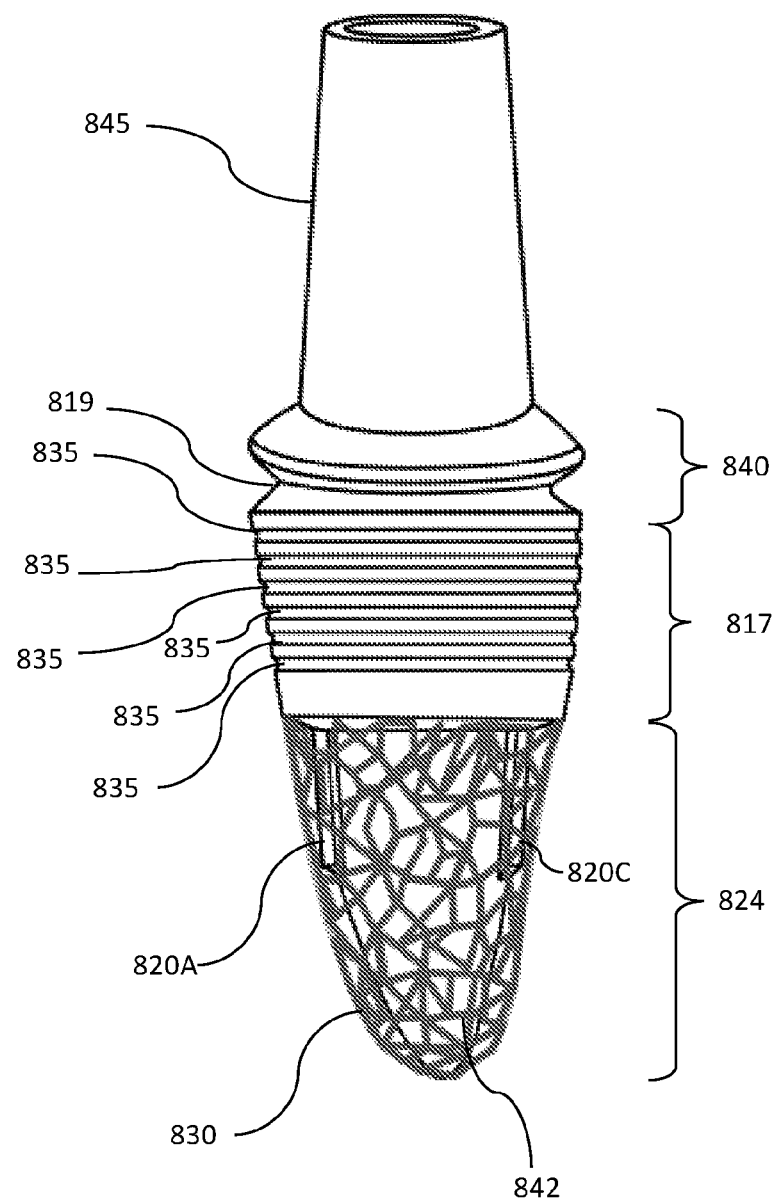
FIG. 8A provides a mesio-distal side view of an exemplary root-analog dental implant fabricated using one or more design processes and/or design process features described herein.

FIG. 8A provides a mesio-distal side view of a root-analog dental implant 800 fabricated using one or more design processes, design process features, and/or models described herein such as process 300, or portions thereof. Root-analog dental implant 800 includes an abutment 845, a transgingival section 840, a "V"-shaped indent, or notch, 819, a coronal section 817 that includes a plurality of circumferential grooves 835, and a diaphyseal/apical section 824 that includes a porous surface 830 that covers a core 842 that has two struts 820A and 820C extending therefrom. Further details regarding core 842 and struts 820A and 820C are provided below with regard to FIG. 8B. Root-analog implant 800 may be fabricated using, for example, an additive manufacturing process (e.g., three-dimensional printing) such as laser sintering of a metallic (e.g., titanium) powder.

In the embodiment of FIG. 8A, abutment 845 may be configured and/or manufactured to allow for attachment to and cooperation with a crown (not shown) that extends above a rim, or crest, of the patient's alveolar socket. In some cases, abutment 845 may correspond to modeled abutment 745. Transgingival section 840 may be positioned within root-analog dental implant 800 so that it sits between abutment 845 and a horizontally oriented edge of coronal section 817. Transgingival section 840 may be configured to be manufactured according to the designed, or modeled, transgingival section 740. Coronal section 817 may be positioned within root-analog dental implant 800 so that it sits between transgingival section 840 and combined diaphyseal/apical section 824. Coronal section 817 may be configured to be manufactured according to the designed, or modeled, coronal section 717. In the embodiment of FIG. 8A, coronal section 817 includes six circumferential grooves 835 that encircle a portion of coronal section 817 and are configured to provide engagement with a corresponding coronal section of the patient's alveolar socket upon implantation of root-analog dental implant 800. Porous surface 830 may be manufactured via, for example, an additive manufacturing process to have one or more holes, openings, interconnected, and/or overlapping structures into and/or onto which bone from the alveolar socket may grow to facilitate osseointegration of root-analog dental implant 800 into the alveolar socket as discussed above with regard to modeled porous surface 730.

Figure 8B:
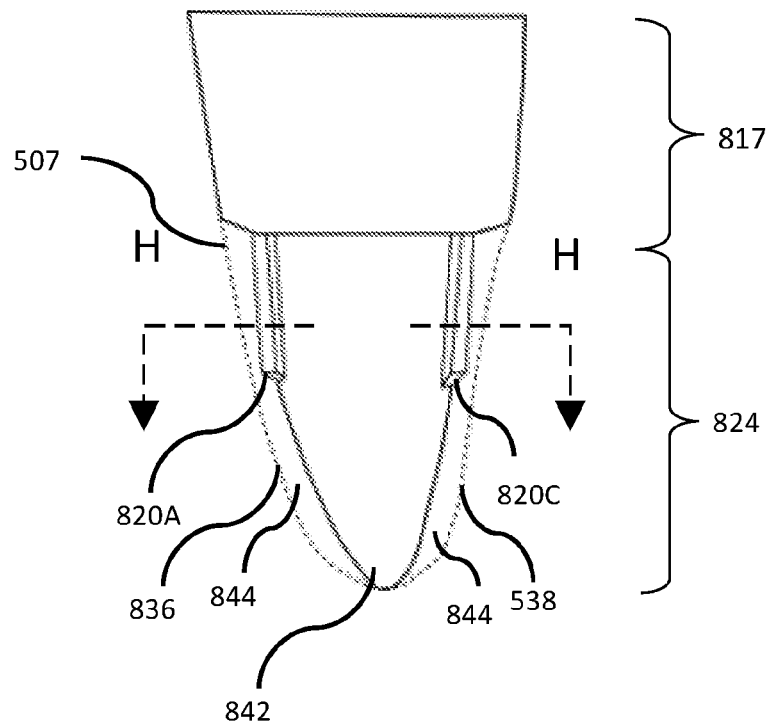
FIG. 8B provides a mesio-distal side view of a merged core of exemplary root-analog dental implant of FIG. 8A without porous surface positioned thereon, consistent with some embodiments of the present invention.

Porous surface 830 may cover diaphyseal/apical 824 section of core 802 and struts 820A and 820C, which are also shown in FIG. 8B. FIG. 8B provides a mesio-distal side view of a core 802 of exemplary root-analog dental implant without porous surface positioned thereon so that features of the merged core may be more clearly seen. Core 802 may correspond to, for example, modeled as discussed above with regard to sixth model 702 and struts 820A and 820C may correspond to modeled struts 620A and 620C as discussed herein. Core 802 also shows a porous surface outline 836, which may correspond to modeled porous surface 536 and a porous surface space 844 into and/or onto which porous surface 830 may be applied. Porous surface space 844 may correspond to modeled porous surface space 544.

Figure 8C:
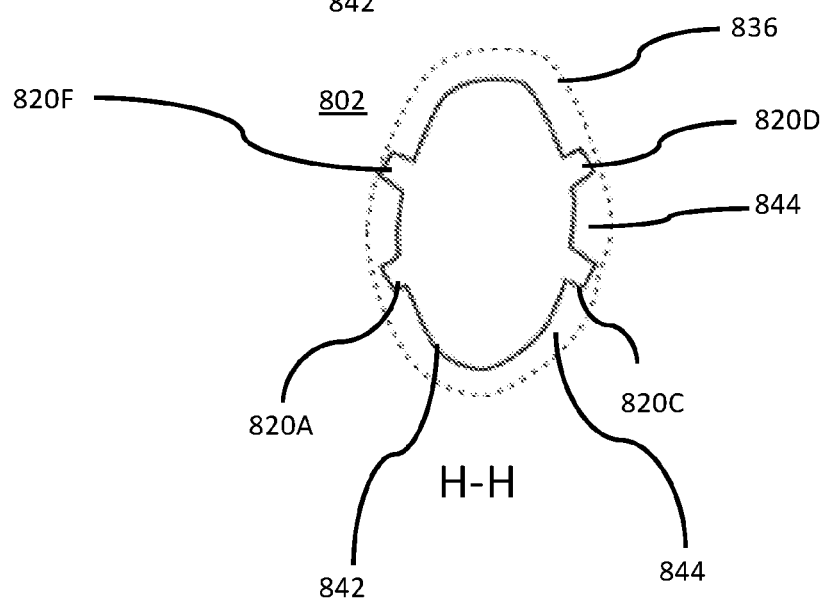
FIG. 8C provides a cross-section view of the merged core of FIG. 8B, consistent with some embodiments of the present invention.

FIG. 8C provides a cross-section (taken at line H-H) view of core 802 as shown in FIG. 8B. The cross-section of FIG. 8C shows a circumference of core 802 with four struts 820A, 820C, 820D, and 820F extending from the diaphyseal/apical 824 section of core 802 into porous surface space 844 as shown.

In some embodiments, the process of manufacturing root-analog dental implant 800 may involve, for example, a two (or more) step process wherein merged core 842 is manufactured first and then porous surface 830, circumferential grooves 835, transgingival portion 840, and abutment 845 are added onto manufactured merged core 842. However, in most instances, the entirety of root-analog dental implant 800 is manufactured at the same time (i.e., processing or printing interval) via an additive manufacturing process.

Figure 8D:
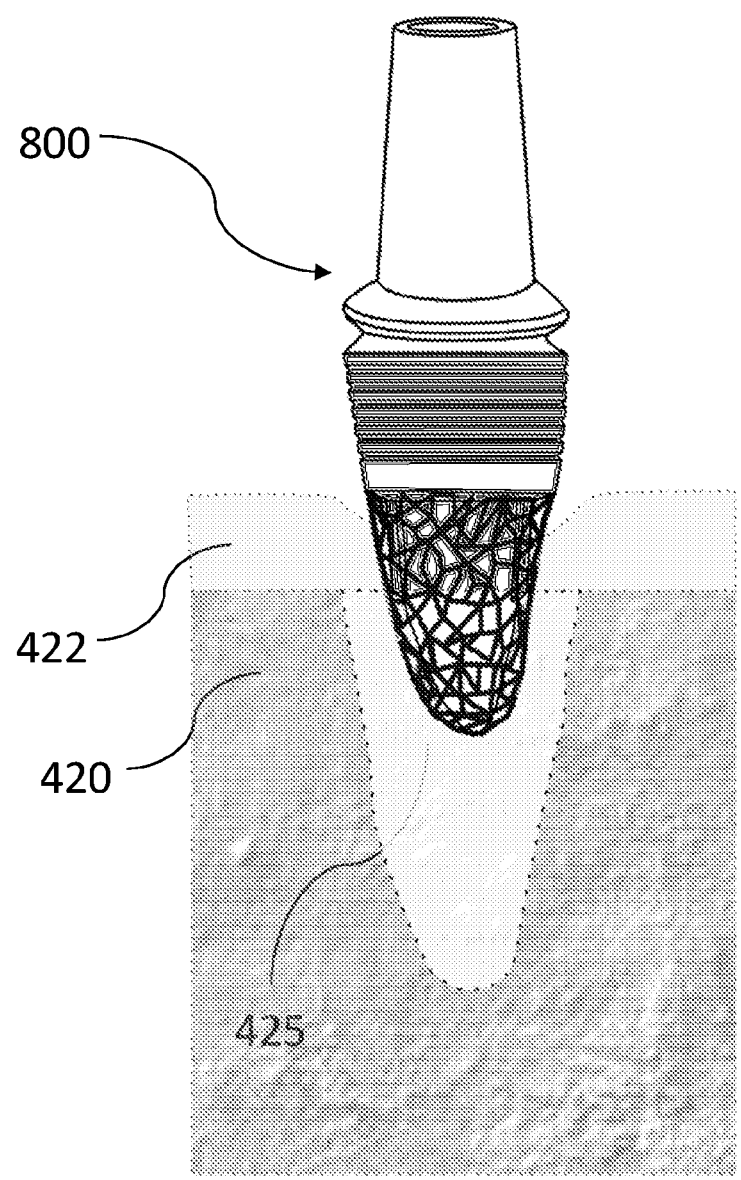
FIG. 8D provides a mesio-distal side view of the root-analog dental implant of FIG. 8A partially inserted into an alveolar socket, consistent with some embodiments of the present invention.
Figure 8E:
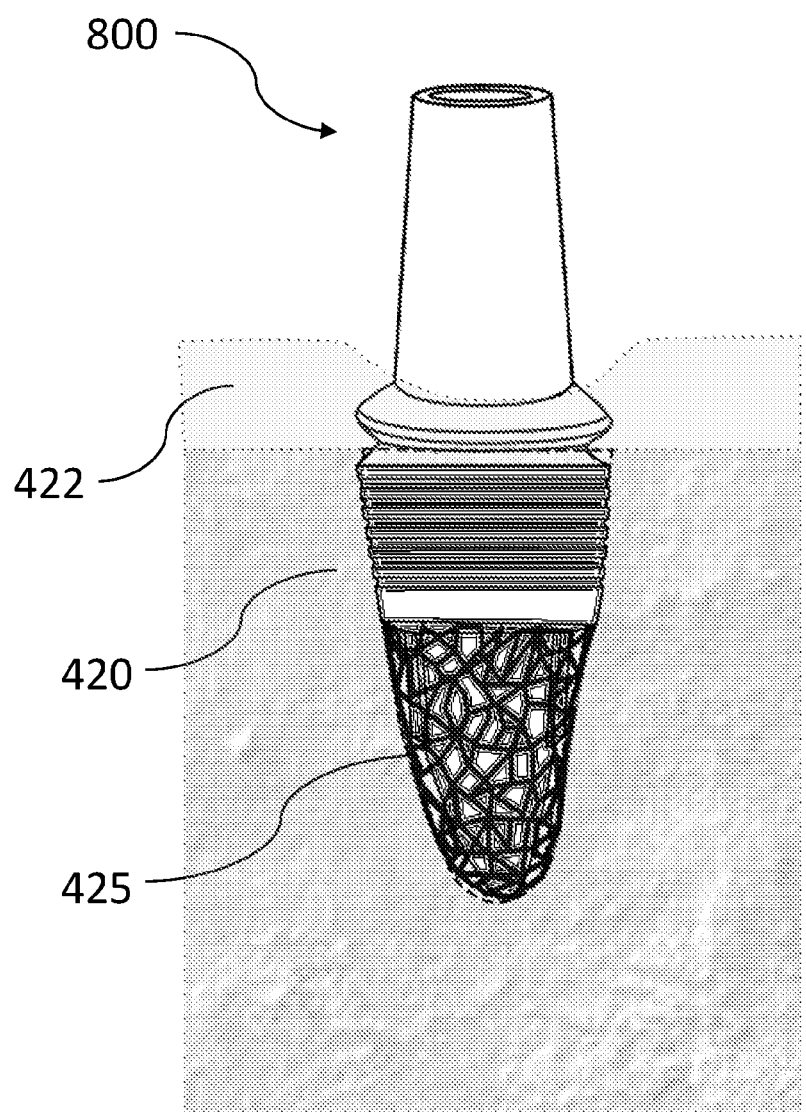
FIG. 8E provides a mesio-distal side view of the root-analog dental implant of FIG. 8A fully inserted into the alveolar socket of FIG. 8D, consistent with some embodiments of the present invention.
Figures 8F, 8G:
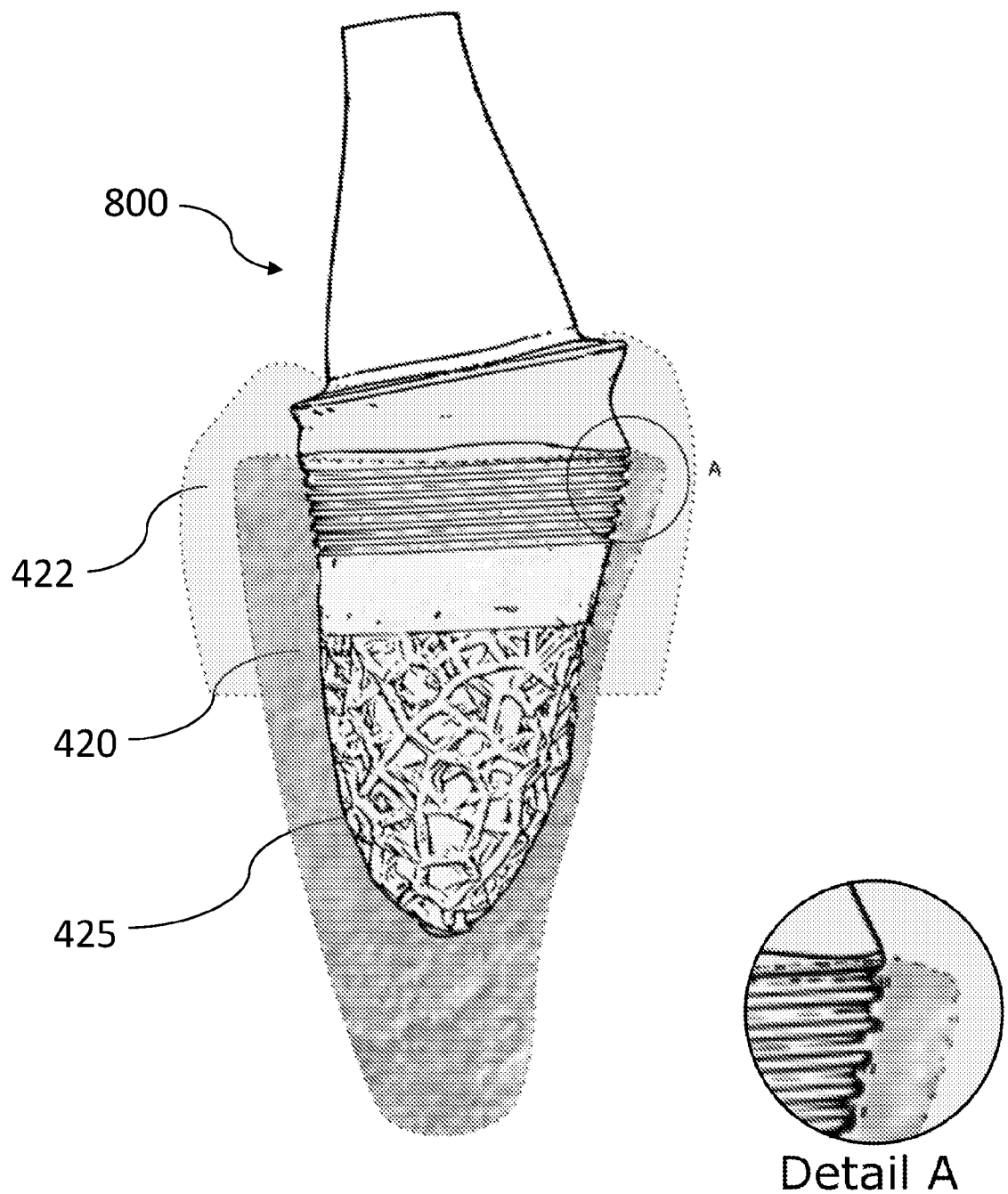
FIG. 8F provides a buccal/lingual side view of the root-analog dental implant of FIG. 8A fully inserted into the alveolar socket of FIG. 8D, consistent with some embodiments of the present invention.
FIG. 8G provides a close-up detail of a portion of FIG. 8F, consistent with some embodiments of the present invention.

FIG. 8D provides a mesio-distal side view of a root-analog dental implant 800 partially inserted, through layer of gingiva 422, into alveolar socket 425 positioned within patient's jawbone 420, FIG. 8E provides a mesio-distal side view of a root-analog dental implant 800 fully inserted through layer of gingiva 422 into alveolar socket 425, and FIG. 8E provides a buccal/lingual side view of a root-analog dental implant 800 fully inserted into alveolar socket 425. Root-analog dental implant 800 may be inserted into alveolar socket 425 by a dentist or other clinician using his or her hands and/or an implant seating device (e.g., an ultrasonic vibration device and/or mechanical force delivery device (e.g., a mallet)). As may be seen in FIG. 8E, root-analog dental implant 800 is slightly larger than alveolar socket 425 in the mesial and distal directions in accordance with the design process described herein. This enlargement is due to mesial and distal extensions of root-analog dental implant 800, which are modeled in the execution of process 300 and shown in FIGS. 5D1 and 5D3 and translated into instructions that are used to manufacture root-analog dental implant 800. FIG. 8F provides a buccal/lingual side view of root-analog dental implant 800 fully inserted into the alveolar socket 425. As described above, root-analog dental implant 800 may be configured so that it does not directly press into alveolar socket 435. FIG. 8G provides a close-up detail of a portion of FIG. 8F labeled "A." As may be seen in FIG. 8G, a buccal side of implant 800 does not directly engage with, or touch, a wall of the socket site 425, which is consistent with the modeled narrowing of the width of implant 800 in the buccal/lingual directions as disclosed herein as shown in, for example, FIGS. 5D2 and 5D3.

Figure 8H:
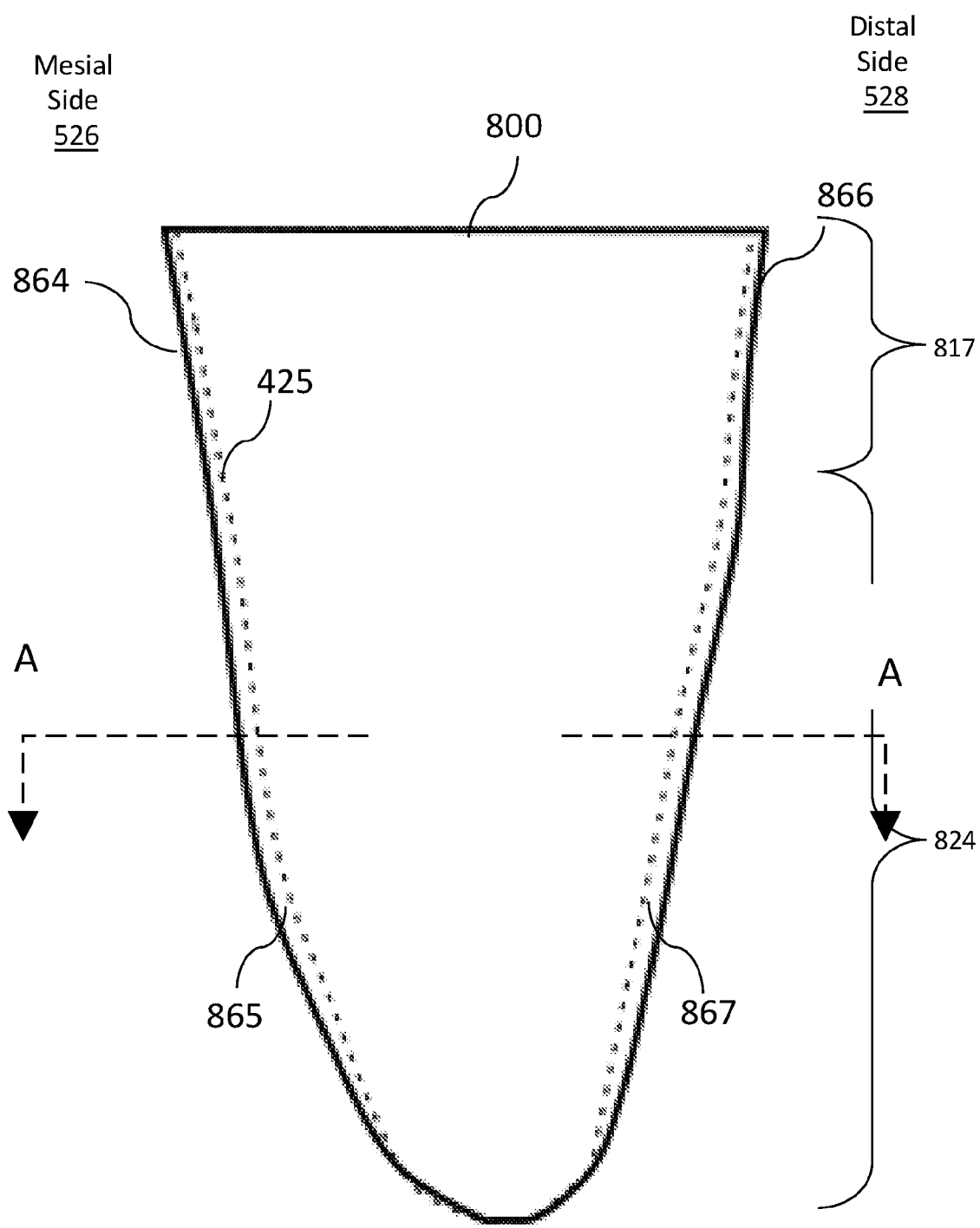
FIG. 8H provides a mesio/distal cross-section view of coronal and diaphyseal/apical sections of the root-analog dental implant of FIG. 8A, consistent with some embodiments of the present invention.

FIG. 8H provides a mesio/distal side, vertical, cross-section view of coronal 817 and diaphyseal/apical 824 sections of root-analog dental implant 800 (shown in solid lines) with a mesial side and a distal side seated within socket site 425 as shown in, for example, FIG. 8E. FIG. 8H shows how root-analog dental implant 800 is configured and shaped to include a mesial extension 864 and a distal extension 866, which may correspond to and/or be consistent with modeled/designed mesial projection 564 and a distal projection 566 disclosed herein. Mesial extension 864 and distal extension 866 provide root-analog dental implant 800 with an increased cross-sectional circumference compared with a corresponding cross-sectional circumference of socket site 425. A shape (e.g., width, volume, or cross-sectional area) of mesial projection 864 and/or distal projection 866 may vary along the length of the respective mesial side and distal side of root-analog dental implant 800. An exemplary mesial width 865 of mesial projection 864 and/or an exemplary distal width 867 of distal projection 866 may vary from, for example, 0.1 mm-3 mm along the length of the root section of the implant.

Figure 8I:
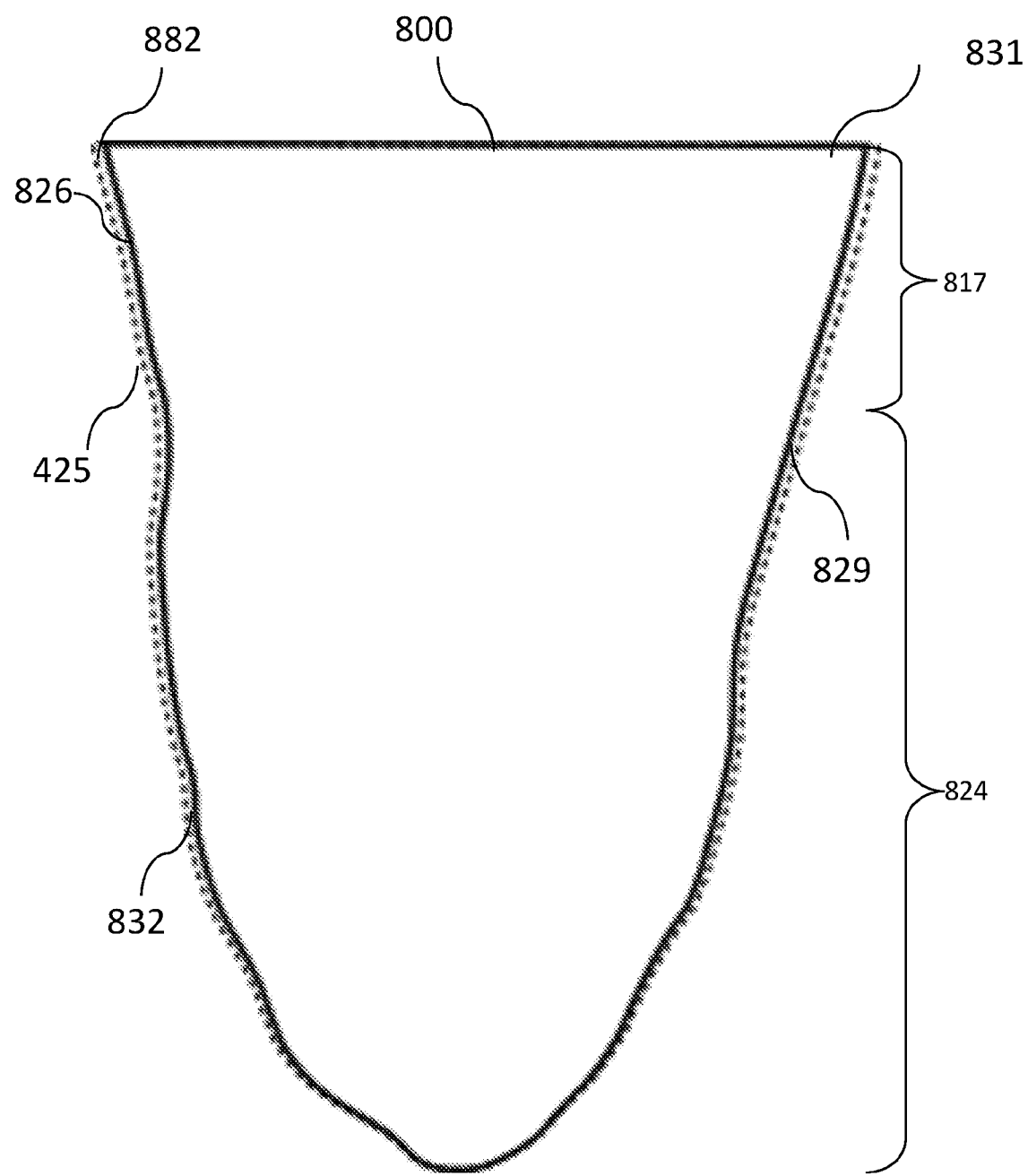
FIG. 8I provides a buccal/lingual cross-section view of coronal and diaphyseal/apical sections of the root-analog dental implant of FIG. 8A, consistent with some embodiments of the present invention.

FIG. 8I provides a buccal/lingual cross-section view of coronal and diaphyseal/apical sections of root-analog dental implant 800 (shown in solid lines) with a buccal side 832 and a lingual side 829 seated within socket site 425 as shown in, for example, FIG. 8E. As shown in FIG. 8I, buccal side 832 and a lingual side 829 do not directly abut a corresponding portion of socket site 425, which may reduce force applied to the buccal and/or lingual sides of socket site 425. A shape (e.g., width, volume, or cross-sectional area) of buccal side 826 and lingual side 829 may vary along the length of the respective lingual and buccal sides and a shape of a buccal side recessed space 882 (i.e., the difference between the buccal side 826 and a buccal side of socket site 425) and/or a shape of a lingual side recessed space 831 (i.e., the difference between the lingual 829 and the lingual side of socket site 425) may vary from, for example, 0.1 mm-1.0 mm along the length of the root section of the implant.

Figure 8J:
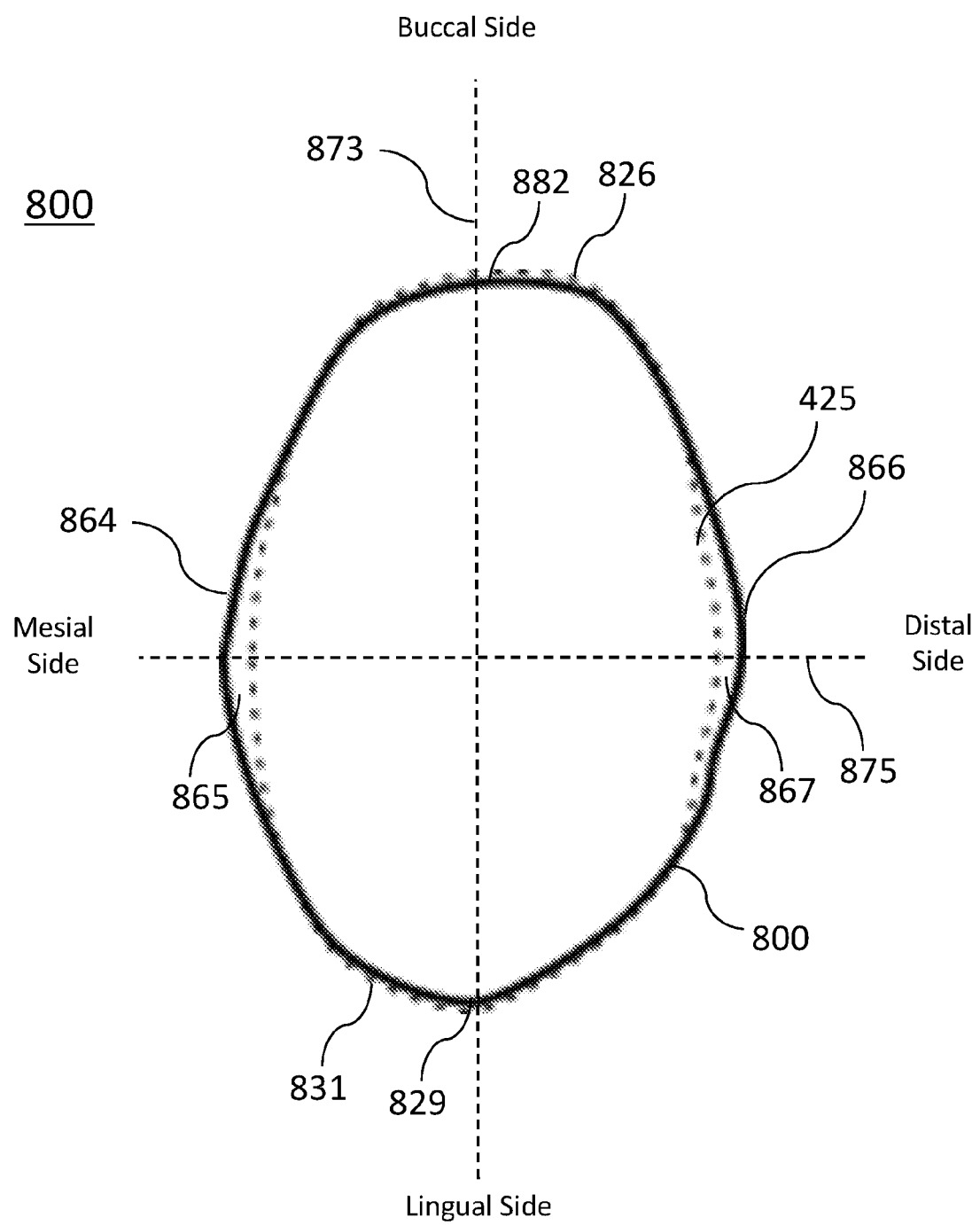
FIG. 8J provides a cross-section image of the root-analog dental implant of FIG. 8A, consistent with some embodiments of the present invention.

FIG. 8J provides a cross-section image of root-analog dental implant 800 along cross-section line A-A (shown in FIG. 8H) with a grid superimposed where a horizontal axis 875 corresponds to a mesial/distal axis and a vertical axis 873 corresponds to a buccal/lingual axis. The cross-section of FIG. 8J shows a reduction in volume along buccal side and lingual side of root-analog dental implant 800 as buccal side 826 and lingual side 829 with dimensions of buccal side space 882 representing a change in the shape of the buccal side between root-analog dental implant 800 and socket site 425 and dimensions of lingual side recessed space 831 representing a change in the shape of the lingual side between root-analog dental implant 800 and socket site 425.

In some cases, a tooth and/or tooth root may be curved and/or have a centerline that is not linear (e.g., curved) or perfectly perpendicular to the patient's jawbone and a process for designing and/or manufacturing a root-analog implant to replace non-linear and/or curved teeth and/or tooth roots may be similar to process 300, with one or additional steps as disclosed below. Once such exemplary curved tooth is modeled with a first curved-tooth model 901, which is shown in FIGS. 9A and 9B, wherein FIG. 9A provides a mesial/distal view of first curved-tooth model 901 and FIG. 9A2 provides a buccal/lingual view of a first curved-tooth model 901. First curved-tooth model 901 may be generated via, for example, execution of step 310 using, for example, information received in step 305, such as a three dimensional scan, a CT scan, an intraoral scan of, and/or an X-ray image of the extracted tooth that may be received in, for example, step 305 of process 300 described above. First curved-tooth model 901 includes a root line 913 that indicates where, on first curved-tooth model 901, a crest of an alveolar socket from which the tooth was extracted is positioned on first curved-tooth model 901. First curved-tooth model 901 also includes a modeled upper gingival edge 512 that may correspond to an upper gingival edge of a patient's mouth proximate to the alveolar socket from which the tooth was extracted.

FIG. 10A1 provides a mesial/distal view and FIG. 10A2 provides a buccal/lingual view of a second curved-tooth model 1001 of the extracted tooth root that includes coronal portion 1015 and a combined diaphyseal/apical section 1024A. Second curved-tooth model 1001 may be generated following, for example, step 315, wherein first curved-tooth model 901 is modified to remove a crown portion thereof and remove one or more protrusions from an external surface of first curved-tooth model 901 in a manner similar to that described above with regard to step 315. FIG. 10A1 also provides a mesial/distal view of a centerline line 1090 that shows, or defines, a curvature, or non-linearity of second curved-tooth model 1001 in the mesial/distal directions. At times, tooth centerline 1090 may approximate a shape and/or degree of curvature of the extracted tooth and/or extracted tooth root used to generate first curved-tooth model 1000. FIG. 10A2 also provides buccal/lingual side view of centerline line 1090 that delineates, or shows, a curvature of the extracted tooth/second curved-tooth model 1001 in the buccal/lingual directions. As shown in FIGS. 10A1 and 10A2, centerline line 1090 is more curved when viewed from the buccal/lingual side than when viewed on the mesial/distal side. In some instances, tooth centerline 1090 may represent a central axis, or medial line extending through a center of second curved-tooth model 1001 and a position and/or curvature of tooth centerline 1090 may be determined by measuring, or otherwise calculating, midpoint between the buccal and lingual sides of second curved-tooth model 1001 at a plurality of points along its length and by measuring, or otherwise calculating, a midpoint between the mesial and distal sides of second curved-tooth model 1001 along its length. Additionally, or alternatively, a central point of second curved tooth-root model may be determined at a plurality of points along its length by determining where a buccal/lingual axis and a mesial/distal axis may intersect or overlap as shown in, for example, FIG. 5D3. In some embodiments, these buccal/lingual and mesial/distal midpoints may be calculated every 0.1-10 mm along the length of preliminary model 1001 thereby creating a series of buccal/lingual and mesial/distal midpoints that may be used to define, or model, a curvature of the extracted tooth root using, for example, one or more mathematical processes (e.g., regression analysis, best fit analysis, and/or standard of deviation analysis for one or more positions of buccal/lingual and/or mesial/distal midpoints).

FIGS. 10A1 and 10A2 also show four horizontal cross-sectional lines A-A, B-B, C-C, and D-D positioned along the length of second model 1001 as shown in FIGS. 10A and 10B. FIG. 10A3 is a cross-section view that shows a first horizontal cross-section 1001A taken along line A-A; FIG. 10A4 corresponds to a second horizontal cross-section 1001B taken long line B-B; FIG. 10A5 corresponds to a third horizontal cross-section 1001C taken long line C-C;

and FIG. 10A6 corresponds to a fourth horizontal cross-section 1001D taken long line D-D. Each of FIGS. 10A3-10A6 show an approximate geometric center point 1040 of the cross section of the respective portion of second model 1001, wherein approximate geometric center point, midpoint, centroid, 1040A corresponds to an approximate geometric center point for first cross-section 1001A; approximate geometric center point 1040B corresponds to an approximate geometric center point for second cross-section 1001B; approximate geometric center point 1040C corresponds to an approximate geometric center point for third cross-section 1001C; and approximate geometric center point 1040D corresponds to an approximate geometric center point for fourth cross-section 1001D.

FIGS. 10A3-10A6 also show a polar grid superimposed upon horizontal cross-sections 1001A-1001D, respectively, with a midpoint (i.e., where the grid lines on the polar grid intersect) on the polar grid aligned with the approximate geometric center point 1040 of the respective cross section. The polar grids of FIGS. 10A3-10A6 each include four grid lines 1035, with each gridline 1035 being positioned at an angle of approximately 45 degrees relative to an adjacent grid line 1035, thereby dividing a volume of a respective cross section into eight portions. A dimension, length, or magnitude, of each grid line 1035 may indicate a length of a diameter of second model of the extracted tooth root taken along the respective grid line 1035. For example, FIG. 10A3 provides a first grid with a first grid line 1035A1 of a first length (e.g., 6-10 mm), a second grid line 1035A2 of a second length (e.g., 4.5-9 mm), a third grid line 1035A3 of a third length (e.g., 3-8.5 mm), and a fourth grid line 1035A4 of a fourth length (e.g., 4.5-8 mm); FIG. 10A4 provides a second grid with a first grid line 1035B1 of a first length (e.g., 5-10 mm), a second grid line 1035B2 of a second length (e.g., 3.5-9 mm), a third grid line 1035B3 of a third length (e.g., 1.5-8 mm), and a fourth grid line 1035B4 of a fourth length (e.g., 3.5-8 mm); FIG. 10A5 provides a third grid with a first grid line 1035C1 of a first length (e.g., 5-9 mm), a second grid line 1035C2 of a second length (e.g., 3-8 mm), a third grid line 1035C3 of a third length, and a fourth grid line 1035C4 of a fourth length (e.g., 4-7 mm); and FIG. 10A6 provides a fourth grid with a first grid line 1035D1 of a first length (e.g., 4-7 mm), a second grid line 1035D2 of a second length (e.g., 3-7 mm), a third grid line 1035D3 of a third length (e.g., 2.5-7.5 mm), and a fourth grid line 1035D4 of a fourth length (e.g., 3.5-7.5 mm). One or more the lengths of grid lines 1035 may be used to determine one or more dimensions of an extracted tooth and/or a shape and/or size of an exterior edge, or outline, of the extracted tooth and/or respective cross section.

Centerline 1090 may be determined by drawing a line (e.g., a best fit line) and/or a curve (e.g., a best fit curve) between approximate geometric center points 1040A, 1040B, 1040C, and 1040D from the top of the coronal section to the apex of preliminary model 1001 using, for example, regression analysis and/or best-fit analysis. In addition, each of FIGS. 10A3-10A6 show an approximate exterior shape, or outline, of the preliminary model of the extracted tooth root at the respective cross-section point of the preliminary model of the extracted tooth root.

In some embodiments, tooth centerline 1090 may be a curved line (e.g., a non-linear line, a line that deviates from being straight along its length, and/or or a line that deviates from straightness in a smooth continuous fashion) or portion thereof (e.g., an arc). In some embodiments, a shape (e.g., degree of deviation from straightness along a length) of a curve of tooth centerline 1090 may be defined by a function, or equation, that may be developed via execution of a mathematical process performed using, for example, position information for approximate geometric center point(s) 1040A, 1040B, 1040C, and/or 1040D. Exemplary mathematical processes that may be performed include, but are not limited to, a regression analysis of position information for approximate geometric center point(s) 1040A, 1040B, 1040C, and/or 1040D to generate a function that defines a shape and/or degree of curvature of tooth centerline 1090 so that tooth centerline 1090 closely aligns with, or overlaps, the position of approximate geometric center point(s) 1040A, 1040B, 1040C, and/or 1040D along its length.

Figure 11A:
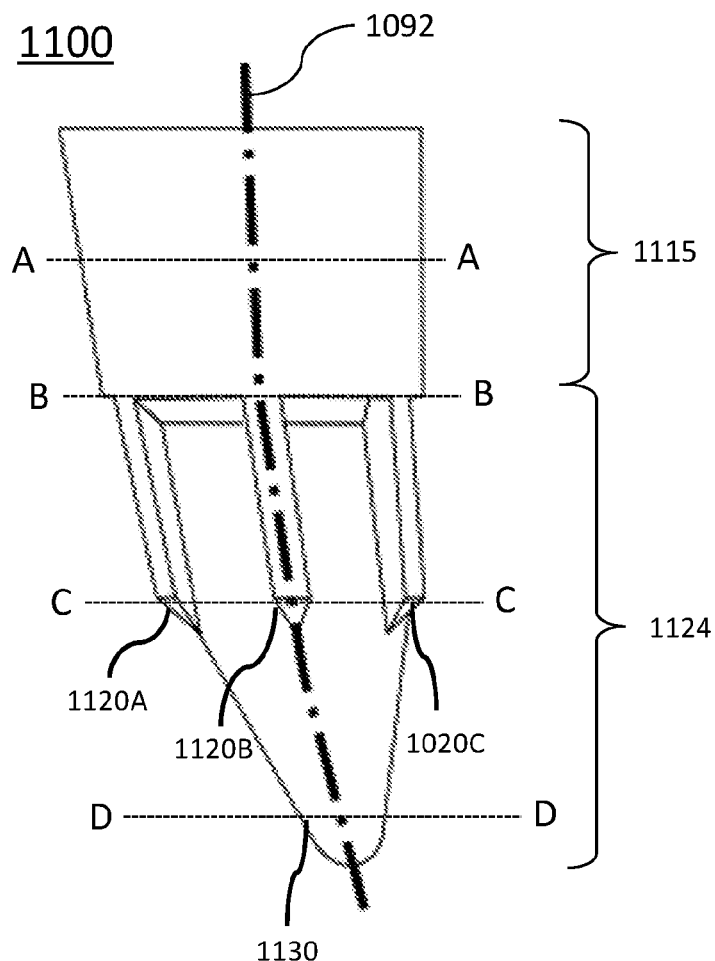
FIG. 11A provides a mesio-distal view of a core base model with a curved buccal/lingual centerline, consistent with some embodiments of the present invention.
Figure 11B:
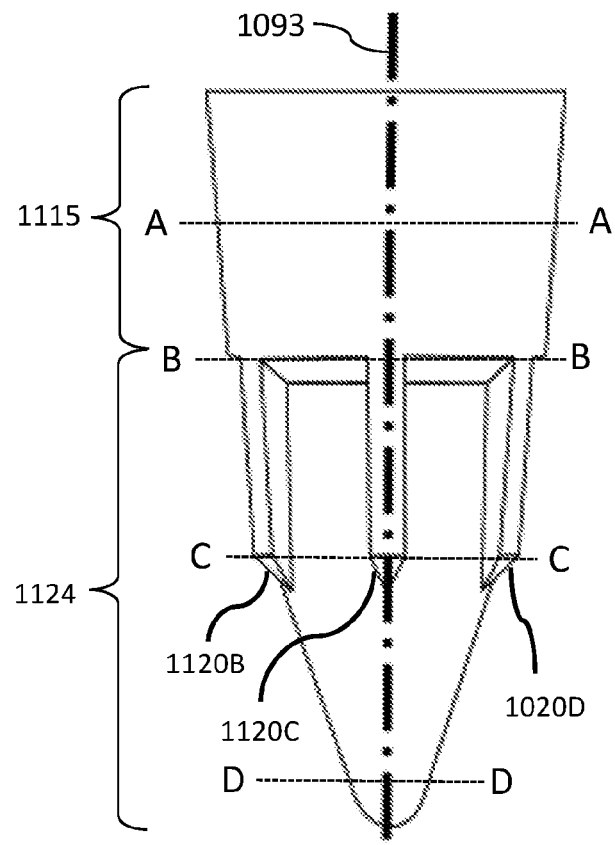
FIG. 11B provides a buccal/lingual view of the core base model of FIG. 11A, consistent with some embodiments of the present invention.

FIG. 10B1 provides a mesial/distal view a third curved-tooth model 1002 and FIG. 11B2 provides a buccal/lingual view of third curved-tooth model 1002. Curved-tooth model 1002 shows how combined diaphyseal/apical section 1024A has been modified to decrease its circumference/width along its length to accommodate application of a porous surface in a manner similar to porous surface space 544 as shown in, for example, FIGS. 5E1 and/or 5E2, to create modified combined diaphyseal/apical section 1024B. Second curved-tooth model 1001 may be transformed to third curved-tooth model 1002 via, for example, execution of step 335 described above with regard to process 300 and the generation of fifth model 507. In some embodiments, transforming second curved-tooth model 1001 into third curved-tooth model 1002 may also include execution of steps 320, 325, and/or 330.

FIG. 11A provides a mesial/distal view and FIG. 11B provides a buccal/lingual view of a core base model 1100 with a core centerline 1092 that matches and/or is defined by tooth centerline 1090. Additionally, or alternatively, a shape of core centerline 1092 may be defined and/or parameterized using other factors including, but not limited to, structural considerations and having a degree of curvature for an implant that does not potentially cause damage to an alveolar socket upon implantation.

Core base model 1100 has a coronal section 1115 and a combined diaphyseal/apical section 1124. Core base model 1100 may be similar to core base model 601 and may include a plurality of struts 1120A, 1120B, and 1120C (as shown in FIG. 11A) and 1120D (as shown in FIG. 11B) that are arranged around a circumference of a core center 1130 and extend vertically down (as oriented in FIGS. 11A and 11B) core center 1130. Struts 1120A, 1120B, 1120C, and/or 1120D may resemble struts 620A, 620B, 620C, 620D, 620E, and/or 620F.

FIGS. 11A and 11B also provide four horizontal cross-sectional lines A-A, B-B, C-C, and D-D positioned along the length of core base model 1100 as shown in FIGS. 11A and 11B. FIG. 11A3 is a cross-section view that shows a first horizontal cross-section 1101A taken long line A-A; FIG. 11A4 corresponds to a second horizontal cross-section 1101B taken long line B-B; FIG. 11A5 corresponds to a third horizontal cross-section 1101C taken long line C-C; and FIG. 11A6 corresponds to a fourth horizontal cross-section 1101D taken long line D-D. Each of FIGS. 11A3-11A6 show an approximate geometric center point 1140 of the cross section of the first model, wherein approximate geometric center point point, midpoint, centroid, 1140A corresponds to an approximate geometric center point for first cross-section 1101A; approximate geometric center point 1140B corresponds to an approximate geometric center point for second cross-section 1101B; approximate geometric center point 1140C corresponds to an approximate geometric center point for third cross-section 1101C; and approximate geometric center point 1140D corresponds to an approximate geometric center point for fourth cross-section 1101D. Buccal/lingual centerline line 1190 and/or mesial/distal centerline line 1191 may be determined by drawing a line (e.g., a best fit line) and/or a curve (e.g., a best fit curve) between approximate geometric center points 1140A, 1140B, 1140C, and 1140D from the top of the coronal section to the apex of first model 1101.

Figure 11C:
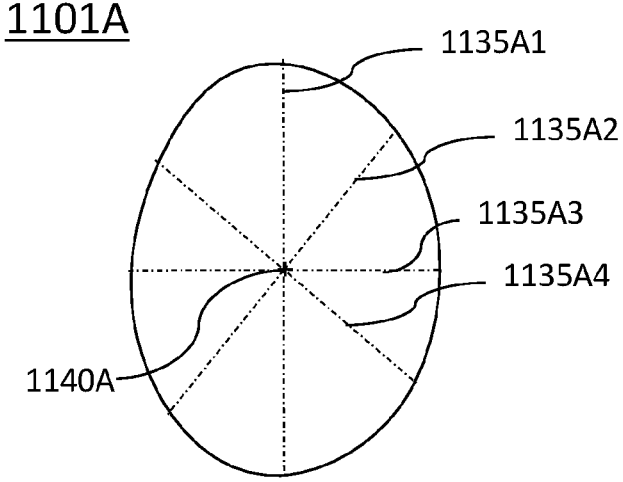
FIG. 11C provides a cross section view of a first cross section of the core model of FIGS. 11A and 11B, consistent with some embodiments of the present invention.
Figure 11D:
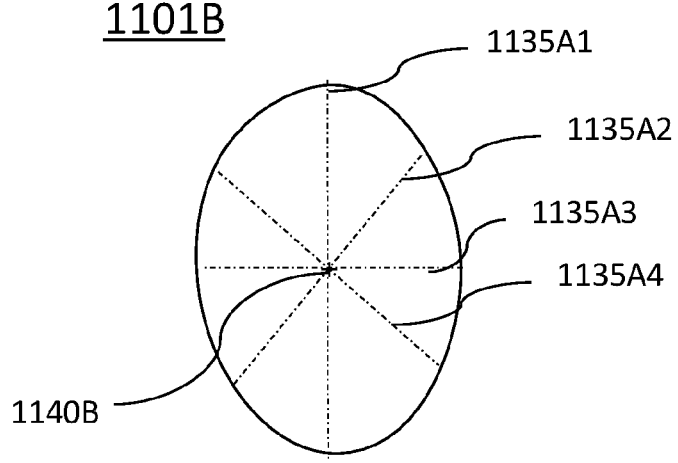
FIG. 11D provides a cross section view of a second cross section of the core model of FIGS. 11A and 11B, consistent with some embodiments of the present invention.
Figure 11E:
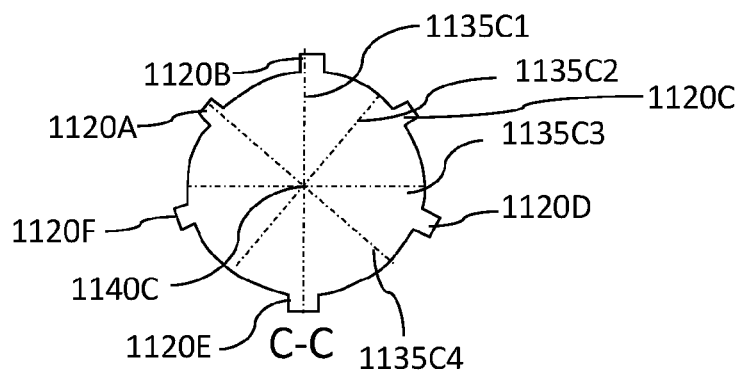
FIG. 11E provides a cross section view of a third cross section of the core model of FIGS. 11A and 11B, consistent with some embodiments of the present invention.
Figure 11F:
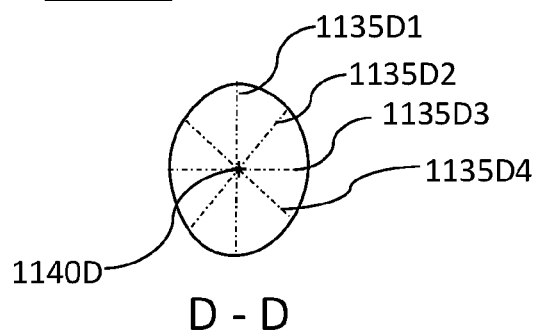
FIG. 11F provides a cross section view of a fourth cross section of the core model of FIGS. 11A and 11B, consistent with some embodiments of the present invention.

FIGS. 11A3-11A6 also show a polar grid superimposed upon horizontal cross-sections 1101A-1101D, respectively, with a midpoint (i.e., where the grid lines on the polar grid intersect) on the polar grid aligned with the approximate geometric center point 1140 of the respective cross section. The polar grids of FIGS. 11C-11F each include four grid lines 1135, with each gridline 1135 being positioned at an angle of approximately 45 degrees relative to an adjacent grid A dimension, length, or magnitude, of each grid line 1135 may indicate a length of a diameter of second model of the extracted tooth root taken along the respective grid line 1135. For example, FIG. 11C provides a first grid with a first grid line 1135A1 of a first length (e.g., 6-10 mm), a second grid line 1135A2 of a second length (e.g., 4.5-9 mm), a third grid line 1135A3 of a third length (e.g., 3-8.5 mm), and a fourth grid line 1135A4 of a fourth length (e.g., 4.5-8 mm); FIG. 11D provides a second grid with a first grid line 1135B1 of a first length (e.g., 5-10 mm), a second grid line 1135B2 of a second length (e.g., 3.5-9 mm), a third grid line 1135B3 of a third length (e.g., 1.5-8 mm), and a fourth grid line 1135B4 of a fourth length (e.g., 3.5-8 mm); FIG. 11E provides a third grid with a first grid line 1135C1 of a first length (e.g., 5-9 mm), a second grid line 1135C2 of a second length (e.g., 2-7 mm), a third grid line 1135C3 of a third length (e.g., 1-6 mm), and a fourth grid line 1135C4 of a fourth length (e.g., 2-5.5 mm); and FIG. 11F provides a fourth grid with a first grid line 1135D1 of a first length (e.g., 2-5 mm), a second grid line 1135D2 of a second length (e.g., 3-5.5 mm), a third grid line 1135D3 of a third length (e.g., 2-7 mm), and a fourth grid line 1135D4 of a fourth length (e.g., 2-7 mm).

One or more lengths of grid lines 1135 may be used to define one or more dimensions of core base model 1100 and/or a shape and/or size of an exterior edge, or outline, of core base model 1100 and/or a cross section thereof. In some embodiments, an exterior shape of the cross sections 1001A and 1001B and a magnitude for the grid lines of the first and second grids for the second model (shown in FIGS. 10A3 and 10A4) may be similar to the exterior shape of first and second cross sections 1101A and 1101B and a magnitude for the grid lines of the first and second grids for the core base model 1100 shown in FIGS. 11C and 11D and, at times, the size and shape of core base model 1100 at positions corresponding to first and/or second cross sections 1101A and 1101B.

An exterior shape of third cross section 1101C shows the shape and position of six struts 1120A, 1120B, 1120C, 1120D, 1120E, and 1120F as positioned around the exterior edge of core base model 1100 along with the shape and outline of portions of core base model 1100 that do not have struts 1120 protruding therefrom. A length of some of the grid lines 1135 for the third grid of third cross section 1101C may be smaller than the corresponding shape and/or length of grid lines 1035 for the third grid of the third cross section 1001C of second model 1000 so that core model 1100 may provide a recessed space in which a porous layer may be applied and/or added to the model while keeping the exterior profile of the implant model within the limits of an exterior profile or geometry of an extracted tooth root the implant model is designed to replace (see e.g., FIGS. 7C-8C and the associated discussion). In this way, an implant manufactured by incorporating core base model 1100 (or a modified version thereof) may fit within the walls of an alvolar socket from which a tooth the implant is replacing was extracted as disclosed herein. In particular, first grid line 1135C1 of third cross section 1101C of core base model 1100 corresponds with struts 1120B and 1120E and has a length approximately equal to first grid line 1035C1, second and third grid lines 1135C2 and 1135C4 have lengths that are shorter (e.g., 0.3-3.5 mm) than second and third grid lines 1035C2 and 1035C3, respectively, and fourth grid line 1135C4 intersects only one (strut 1120A) and and has a length shorter (e.g., 0.2-3 mm) than fourth grid line 1035C4. Struts 1120A, 1120B, 1120C, 1120D, 1120E, and/or 1120F may extend to the outline of third cross section 1001C (e.g., as shown for struts 1120A and 1120C of FIG. 12A1 and struts 1120B and 1120D of FIG. 12A2, discussed below) and/or may extend only partially to the outline of third cross section 1001C (e.g., may be covered by merged core 1200 of FIG. 12A1 as with strut 1120B).

An exterior outline of fourth cross section 1101D of core base model 1100 is smaller (e.g., 0.5-3.5 mm) than a corresponding fourth exterior outline of fourth cross section 1001D of second model thereof.

In some embodiments, core centerline 1190 may be a curved line (e.g., a non-linear line, a line that deviates from being straight along its length, and/or a line that deviates from straightness in a smooth continuous fashion) or portion thereof (e.g., an arc). A shape (e.g., degree of deviation from straightness along a length) of a curve of centerline 1190 may be defined by a function, or equation, that may be developed via execution of a mathematical process performed using, for example, position information for approximate geometric center point(s) 1140A, 1140B, 1140C, and/or 1140D. Exemplary mathematical processes that may be performed include, but are not limited to, a regression analysis of position information for approximate geometric center point(s) 1140A, 1140B, 1140C, and/or 1140D to generate a function that defines a shape and/or degree of curvature of centerline 1190 so that centerline 1190 closely aligns with, or overlaps, the position of approximate geometric center point(s) 1140A, 1140B, 1140C, and/or 1140D along its length.

Additionally, or alternatively, a shape and/or curvature of core centerline 1092 may be based upon a shape and/or curvature of tooth centerline 1092.

FIG. 12A1 provides a buccal/lingual view and FIG. 12A2 provides a mesial/distal view of a merged implant model and core base 1200 (also known as "merged core"), which is model of a merging between modified model 1002 and core base model 1100. Merged core 1200 also shows a protruding portion of struts 1120A and 1120C (for FIG. 12D1) and struts 1120B and 1120D (for FIG. 12D2) within a merged core diaphyseal/apical section 1224. Merged core 1200 also has a coronal section 1215. One or more features of merged core 1200 may resemble one or more features of sixth model 702.

FIG. 13A1 provides a mesial/distal view and FIG. 13A2 provides a buccal/lingual view of a complete implant model 1300 that includes a porous surface 1330 positioned over combined diaphyseal/apical section 1224 of merged core 1200 in combined diaphyseal/apical section 1324 of complete implant model 1300. Complete implant model 1300 also includes a modeled abutment 1345 similar to modeled abutment 745, a coronal section 1315 that includes an array of coronal rings 1335, which may be similar to modeled coronal rings 735, and a transgingival section 1340, which may be similar to transgingival section 740.

Figure 15A:
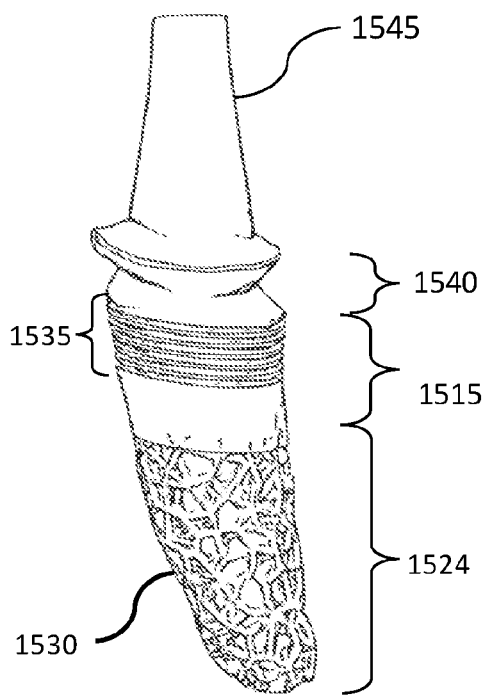
FIG. 15A provides a buccal/lingual side view of an exemplary root-analog dental implant fabricated using one or more design processes and/or design process features described herein, consistent with some embodiments of the present invention.
Figure 15B:
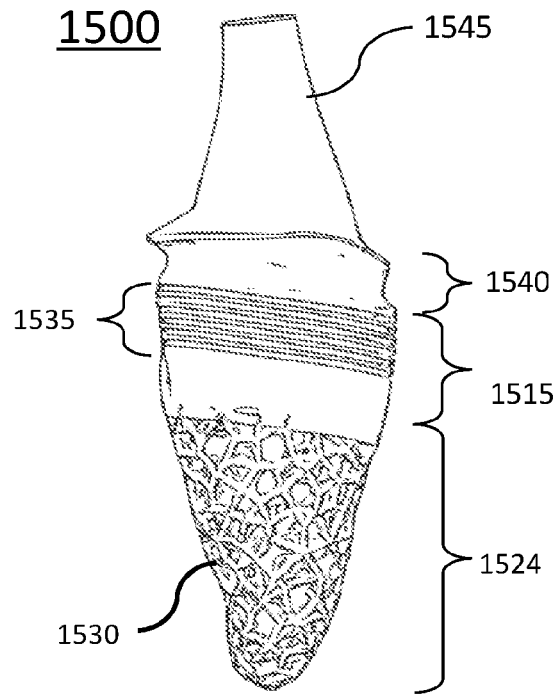
FIG. 15B provides a mesio-distal side view of the exemplary root-analog dental implant, of FIG. 15A consistent with some embodiments of the present invention.

FIG. 14A1 provides a mesial/distal view and FIG. 14A2 provides a buccal/lingual view of a modeled system 1400 that includes complete implant model 1300 and a modeled crown 1414 positioned on top of abutment 1345. Complete implant model 1300 and/or modeled system 1400 may be translated into a set of instructions used for the manufacture of a root-analog dental implant via, for example, as disclosed herein and/or execution of step 390. One example of how instructions for the manufacturing of a root-analog dental implant may be used to manufacture a root-analog dental implant is shown in FIGS. 15A and 15B, wherein FIG. 15A provides a buccal/lingual view of a root-analog dental implant 1500 and FIG. 15B provides a mesial/distal view of root-analog dental implant 1500 manufactured using instructions based on complete implant model 1300. Root-analog dental implant 1500 includes a porous surface 1530 (which corresponds to porous surface 1330) in a combined diaphyseal/apical section 1524 of root-analog dental implant 1500. Root-analog dental implant 1500 also includes an abutment 1545, which corresponds to modeled abutment 1345, a coronal section 1515 that includes an array of coronal rings 1535, which correspond to coronal section 1315 and array of coronal rings 1335, respectively. Root-analog dental implant 1500 also includes a transgingival section 1540 that corresponds to transgingival section 1340.

Additionally, or alternatively, in some embodiments, one or more of the cores disclosed herein may have a horizontal cross-section that has an irregular shape that is similar to, but smaller than, an irregular shape of a corresponding horizontal cross-section of the extracted tooth root. The irregular shape of the core may be similar to an anatomical shape of the extracted tooth root at the corresponding horizontal cross section of the extracted tooth root. In some embodiments, all horizontal cross sections of the core will have an irregular shape that corresponds to an irregular shape of the corresponding horizontal cross-section of the extracted tooth root. In some instances, the core(s) may be designed and/or manufactured so that a vertical length of the core is divided into a first series of horizontal cross-sections and the vertical length of the extracted tooth root is divided into a second series of horizontal cross-sections, further wherein each horizontal cross-section of the first series has a shape that is similar to and smaller than a corresponding horizontal cross-section of the second series.

Additionally, or alternatively, in some embodiments, one or more of the cores disclosed herein may have a centerline that is configured, arranged, and/or defined to follow and/or correspond to a centerline of the extracted tooth root. The centerline of the core may be approximately vertically oriented and having a curvature (or degree of curvature) similar to a curvature (or degree of curvature) of the extracted tooth and/or is similar to an anatomic centerline of the extracted tooth root. In some cases, the curvature may be non-linear.

Additionally, or alternatively, in some embodiments, one or more of the cores disclosed herein may have a central non-linear curvature line that may be configured, designed, and/or defined to follow and/or correspond to a central non-linear curvature line of the extracted tooth root. The central non-linear curvature line of the core may be approximately vertically oriented and the central non-linear curvature line of the extracted tooth root may also be approximately vertically oriented. In some instances, the curvature of the core may be defined by a series of midpoints arranged along a vertical length of the core, each midpoint corresponding to a midpoint of a horizontal cross-section of the core at a different position along the vertical length of the core and the curvature of the extracted tooth root may be defined by a series of midpoints arranged along a vertical length of the extracted tooth root, each midpoint of the core may correspond to a midpoint of a horizontal cross-section of the extracted tooth root positioned along the vertical length of the core and extracted tooth root, respectively.

Additionally, or alternatively, in some embodiments, one or more of the cores disclosed herein may have a curvature that may be configured, designed, and/or defined to correspond to and/or follow a curvature of the extracted tooth root, the curvature of the core may be approximately vertically oriented and the curvature of the extracted tooth root may be approximately vertically oriented.

Hence, root-analog dental implants and methods for designing and manufacturing same have been herein disclosed. The methods for designing and manufacturing the root-analog dental implants may be adapted to accommodate many situations and extracted tooth-root type and geometry so that the root-analog dental implants designed and manufactured as disclosed herein may be customized to individual situations with regard to an extracted tooth as well as, for example, clinician and/or patient preferences for implant type and/or configuration thereof.

We claim:

1. A root portion of a root-analog dental implant, the root portion of the root-analog dental implant being configured to fit within an alveolar socket of an extracted tooth root, the root portion comprising:
   a core configured to provide mechanical strength for the root-analog dental implant, a curvature of a centerline of the core being configured to follow a curvature of a centerline of the extracted tooth root, the centerline of the core being positioned in an approximately vertically oriented center of the core and the centerline of the extracted tooth root being positioned in an approximately vertically oriented center of the tooth root;
   a porous surface positioned on a portion of the core, wherein an exterior geometry of the porous surface is configured to fit within the alveolar socket; and
   a strut configured to provide mechanical strength for the root-analog dental implant, the strut extending from an external surface of the core into the porous surface along a portion of a length of the core.

2. The root portion of a root-analog dental implant of claim 1, wherein an external surface of the strut fits within the exterior geometry of the porous surface.

3. The root portion of a root-analog dental implant of claim 1, wherein the porous surface includes a plurality of interconnected and overlapping elements.

4. The root portion of a root-analog dental implant of claim 1, wherein the porous surface includes a plurality of interconnected and overlapping elements at least some of the plurality of interconnected and overlapping elements having a surface roughness.

5. The root portion of a root-analog dental implant of claim 1, wherein the porous surface includes a plurality of protrusions.

6. The root portion of a root-analog dental implant of claim 1, wherein the porous surface includes a plurality of cavities.

7. The root portion of a root-analog dental implant of claim 1, wherein a thickness of the porous surface varies along a length of the core.

8. The root portion of a root-analog dental implant of claim 1, wherein a thickness of the strut is variable along a length of the core.

9. The root portion of a root-analog dental implant of claim 1, further comprising a plurality of struts.

10. The root portion of a root-analog dental implant of claim 1, wherein a shape of the strut is responsive to a shape of curvature of a centerline of the core.

11. The root portion of a root-analog dental implant of claim 1, wherein root portion of the root-analog dental implant includes a plurality of struts and the core has a lingual side, a buccal side, a mesial side, and a distal side, further wherein more struts of the plurality of struts extend from the lingual side and the distal side than extend from the mesial side and the distal side.

12. The root portion of a root-analog dental implant of claim 1, wherein the alveolar socket is unmodified when the root-analog dental implant is inserted therein.

13. The root portion of a root-analog dental implant of claim 1, wherein the core is designed using a template core.

14. The root portion of a root-analog dental implant of claim 1, wherein the implant is manufactured using an additive manufacturing process.

15. The root portion of a root-analog dental implant of claim 1, further comprising a coronal section positioned proximate to the core, the coronal section having surface texturing configured to engage with a crest of the alveolar socket.

16. A root portion of a root-analog dental implant configured to fit within an alveolar socket of an extracted tooth root, the root portion comprising:

a core configured to provide structural and mechanical support for the root-analog dental implant, a curvature of a centerline of the core being configured to follow a curvature of a centerline of the extracted tooth root the centerline of the core being positioned in an approximately vertically oriented center of the core and the centerline of the extracted tooth root being positioned in an approximately vertically oriented center of the tooth root;

a porous surface positioned on a portion of the core, wherein an exterior geometry of the porous surface is configured to fit within an unmodified alveolar socket; and a plurality of vertically oriented struts extending from the core into the porous surface.

17. The root portion of a root-analog dental implant of claim 16, wherein the porous surface includes a plurality of interconnected overlapping elements.

18. The root portion of a root-analog dental implant of claim 16, wherein the porous surface includes a plurality of cavities.

19. The root portion of a root-analog dental implant of claim 16, wherein the porous surface thickness varies both circumferentially and along the centerline of the core.

20. The root portion of a root-analog dental implant of claim 16, wherein a thickness of the porous surface is responsive to a shape of curvature of a centerline of the core.

* * * * *